US012724963B2

(12) United States Patent
Smus et al.

(10) Patent No.: US 12,724,963 B2
(45) Date of Patent: Sep. 1, 2026

(54) SUMMARIZATION BASED ON TIMING DATA

(71) Applicant: Google LLC, Mountain View, CA (US)

(72) Inventors: Boris Smus, Seattle, WA (US); Vikas Bahirwani, San Francisco, CA (US); Ruofei Du, San Francisco, CA (US); Christopher Ross, Brooklyn, NY (US); Alex Olwal, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/315,113

(22) Filed: May 10, 2023

(65) Prior Publication Data

US 2023/0367960 A1 Nov. 16, 2023

Related U.S. Application Data

(60) Provisional application No. 63/364,478, filed on May 10, 2022.

(51) Int. Cl.

| | |
|---|---|
| ***G06F 40/20*** | (2020.01) |
| ***G06F 3/0485*** | (2022.01) |
| ***G06F 16/34*** | (2019.01) |
| ***G06F 40/166*** | (2020.01) |
| ***G06F 40/30*** | (2020.01) |
| ***G06F 40/35*** | (2020.01) |
| ***G06F 40/40*** | (2020.01) |
| ***G06F 40/47*** | (2020.01) |
| ***G06F 40/58*** | (2020.01) |
| ***G10L 15/18*** | (2013.01) |
| ***G10L 15/22*** | (2006.01) |
| ***G10L 15/26*** | (2006.01) |

(52) U.S. Cl.

CPC ............ *G06F 40/20* (2020.01); *G06F 3/0485* (2013.01); *G06F 16/345* (2019.01); *G06F 40/166* (2020.01); *G06F 40/30* (2020.01); *G06F 40/35* (2020.01); *G06F 40/40* (2020.01); *G06F 40/47* (2020.01); *G06F 40/58* (2020.01); *G10L 15/1815* (2013.01); *G10L 15/22* (2013.01); *G10L 15/26* (2013.01)

(58) Field of Classification Search

CPC ......... G06F 40/20; G06F 40/166; G10L 15/26

See application file for complete search history.

(56) References Cited

U.S. PATENT DOCUMENTS

| | | | | |
|---|---|---|---|---|
| 6,172,675 | B1 * | 1/2001 | Ahmad ................ | G11B 27/034<br>715/251 |
| 10,878,819 | B1 * | 12/2020 | Chavez ................... | G10L 15/25 |
| 2012/0197630 | A1 * | 8/2012 | Lyons .................. | G06F 16/345<br>704/9 |
| 2019/0019511 | A1 * | 1/2019 | Kawano .................. | G10L 15/10 |
| 2019/0129920 | A1 * | 5/2019 | Bainer .................... | G06F 40/30 |

(Continued)

*Primary Examiner* — Stephen S Hong
*Assistant Examiner* — Darrin Hope
(74) *Attorney, Agent, or Firm* — Brake Hughes Bellermann LLP

(57) ABSTRACT

A method performed by a computing system comprises generating text from audio data and determining an end portion of the text to include in a summarization of the text based on a length of a portion of the audio data from which the text was generated and which ends with a proposed end portion and a time value associated with the proposed end portion, the proposed end portion including a word from the text.

20 Claims, 23 Drawing Sheets

(56) References Cited

U.S. PATENT DOCUMENTS

| | | | | |
|---|---|---|---|---|
| 2019/0228769 | A1* | 7/2019 | Suzuki | G06F 40/30 |
| 2019/0362251 | A1* | 11/2019 | Deselaers | G06V 30/32 |
| 2020/0357408 | A1* | 11/2020 | Boekweg | G10L 15/26 |
| 2021/0266473 | A1* | 8/2021 | Engelke | G06F 40/169 |
| 2022/0020376 | A1* | 1/2022 | Garg | G06F 40/216 |
| 2022/0038577 | A1* | 2/2022 | Rosenberg | G06F 40/30 |
| 2022/0392434 | A1* | 12/2022 | Asi | G06N 20/00 |

* cited by examiner

1000
Generate text based on audio data
1002
Generate summary based on text and contextual data
1004

1050
Generate text based on audio data
1052
Replace general term with specific term based on contextual data
1054
Generate summary
1056

1070
Generate text based on audio data
1072
Generate summary
1074
Replace general term with specific term based on contextual data
1076

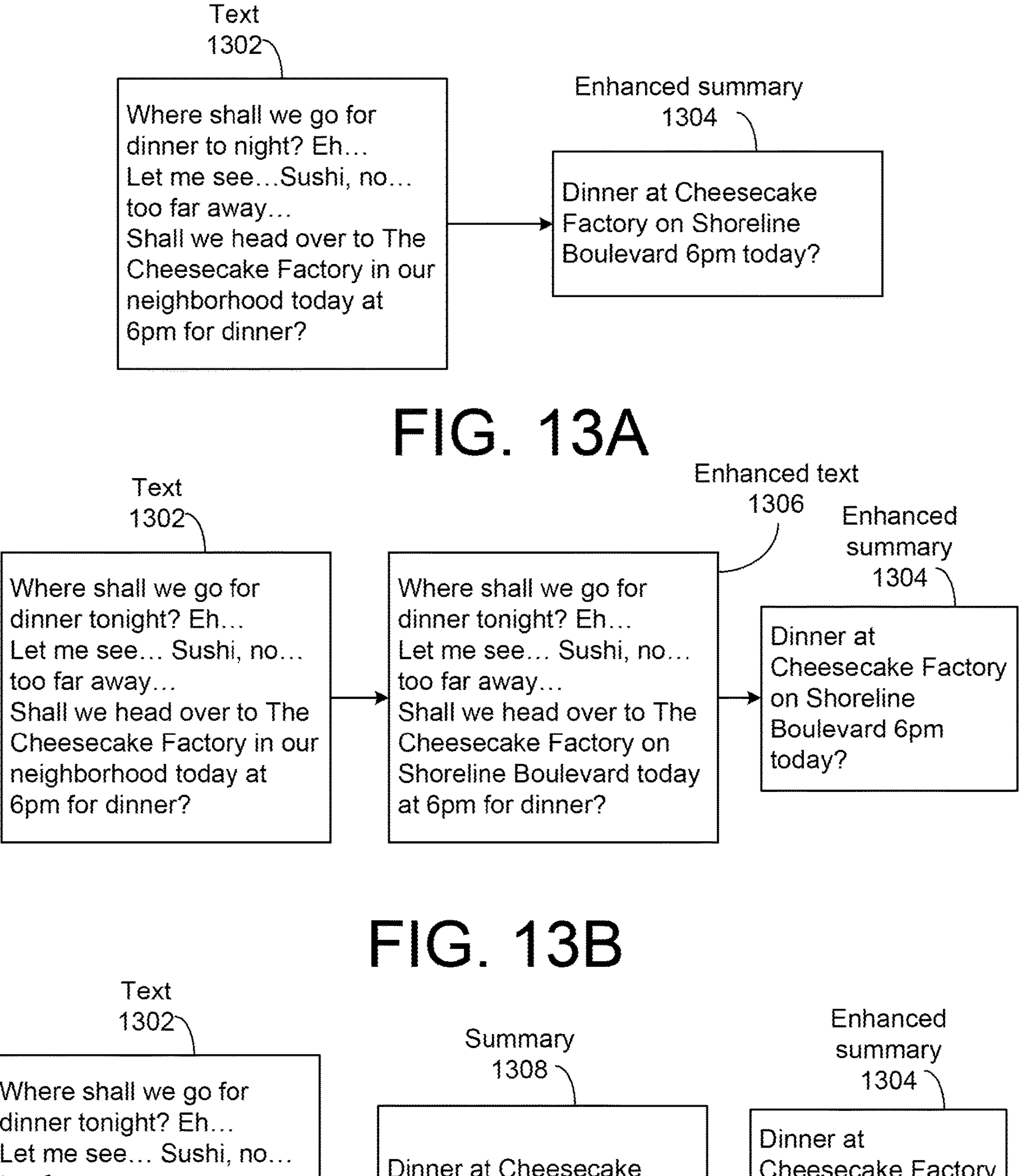
Text
1302
Where shall we go for dinner to night? Eh…
Let me see…Sushi, no…
too far away…
Shall we head over to The Cheesecake Factory in our neighborhood today at 6pm for dinner?
Enhanced summary
1304
Dinner at Cheesecake Factory on Shoreline Boulevard 6pm today?
FIG. 13A
Text
1302
Where shall we go for dinner tonight? Eh…
Let me see… Sushi, no…
too far away…
Shall we head over to The Cheesecake Factory in our neighborhood today at 6pm for dinner?
Enhanced text
1306
Where shall we go for dinner tonight? Eh…
Let me see… Sushi, no…
too far away…
Shall we head over to The Cheesecake Factory on Shoreline Boulevard today at 6pm for dinner?
Enhanced summary
1304
Dinner at Cheesecake Factory on Shoreline Boulevard 6pm today?
FIG. 13B
Text
1302
Where shall we go for dinner tonight? Eh…
Let me see… Sushi, no…
too far away…
Shall we head over to The Cheesecake Factory in our neighborhood today at 6pm for dinner?
Summary
1308
Dinner at Cheesecake Factory in our neighborhood 6pm today?
Enhanced summary
1304
Dinner at Cheesecake Factory on Shoreline Boulevard 6pm today?
FIG. 13C Text
1602
What is the name of your cat?
Image
1604
Cat
1606

Text
1612
It's Lili
Summary text
1618
Lili
Image
1614
Cat
1616

Text
1622
Ah, how cute she is!
Summary text
1618
Lili
Cat
1626
Emoji
1628
Image
1624

SUMMARIZATION BASED ON TIMING DATA

CROSS-REFERENCE TO RELATED APPLICATION

This application claims priority to U.S. Provisional Patent Application No. 63/364,478, filed on May 10, 2022, entitled "SUMMARIZATION FOR WEARABLE DEVICES", the disclosure of which is incorporated by reference herein in its entirety.

TECHNICAL FIELD

This description relates to summarization using machine learning (ML) models.

BACKGROUND

A volume of text, such as a document or an article, often includes content that is not useful to, or desired by, a consumer of the volume of text. Additionally, or alternatively, a user may not wish to devote time (or may not have sufficient time) to consume an entirety of a volume of text.

SUMMARY

A computing system determines when to perform a summary independently of a request from a user. The determination of when to perform the summary determines a final word or end portion within a sequence of words (e.g., transcribed text) to include in a summarization. The determination of the final word or end portion is based on a length of a portion of speech that is unsummarized, and a time value associated with the final word or end portion. The time value can include a pause in speech after the final word or end portion.

A method performed by a computing system comprises generating text from audio data and determining an end portion of the text to include in a summarization of the text based on a length of a portion of the audio data from which the text was generated and which ends with a proposed end portion and a time value associated with the proposed end portion, the proposed end portion including a word from the text. The generated text may be represented b electronic data (such as text data). The method allows the computing system to provide a fitting summary of text data in an efficient and automatic manner.

A non-transitory computer-readable storage medium comprises instructions stored thereon that, when executed by at least one processor, are configured to cause a computing system to generate text from audio data and determine an end portion of the text to include in a summarization of the text based on a length of a portion of the audio data from which the text was generated and which ends with a proposed end portion and a time value associated with the proposed end portion, the proposed end portion including a word from the text.

A computing system comprises at least one processor and a non-transitory computer-readable storage medium comprising instructions stored thereon. When executed by the at least one processor, the instructions are configured to cause the computing system to generate text from audio data and determine an end portion of the text to include in a summarization of the text based on a length of a portion of the audio data from which the text was generated and which ends with a proposed end portion and a time value associated with the proposed end portion, the proposed end portion including a word from the text.

A method performed by a computing system comprises generating text from audio data and determining whether a proposed end portion of the text is an end portion of the text based on a duration of a pause after the proposed end portion satisfying a pause duration threshold, the pause duration threshold being less for greater lengths of the text that end with the proposed end portion.

A non-transitory computer-readable storage medium comprises instructions stored thereon that, when executed by at least one processor, are configured to cause a computing system to generate text from audio data and determine whether a proposed end portion of the text is an end portion of the text based on a duration of a pause after the proposed end portion satisfying a pause duration threshold, the pause duration threshold being less for greater lengths of the text that end with the proposed end portion.

A computing system comprises at least one processor and a non-transitory computer-readable storage medium comprising instructions stored thereon. When executed by the at least one processor, the instructions are configured to cause the computing system to generate text from audio data and determine whether a proposed end portion of the text is an end portion of the text based on a duration of a pause after the proposed end portion satisfying a pause duration threshold, the pause duration threshold being less for greater lengths of the text that end with the proposed end portion.

A computing system generates a summary of information included in text with additional, or more specific, information based on contextual information that is not included in the text. The inclusion of additional or more specific information based on contextual information may make further searches redundant and thus may contribute to saving computer and/or network resources.

The details of one or more implementations are set forth in the accompanying drawings and the description below. Other features will be apparent from the description and drawings, and from the claims.

BRIEF DESCRIPTION OF THE DRAWINGS

FIG. 13A shows text and an enhanced summary of the text according to an example.

FIG. 13B shows text, enhanced text, and an enhanced summary of the text according to an example.

FIG. 13C shows text, a summary of the text, and an enhanced summary of the text according to an example.

DETAILED DESCRIPTION

Figure 1:
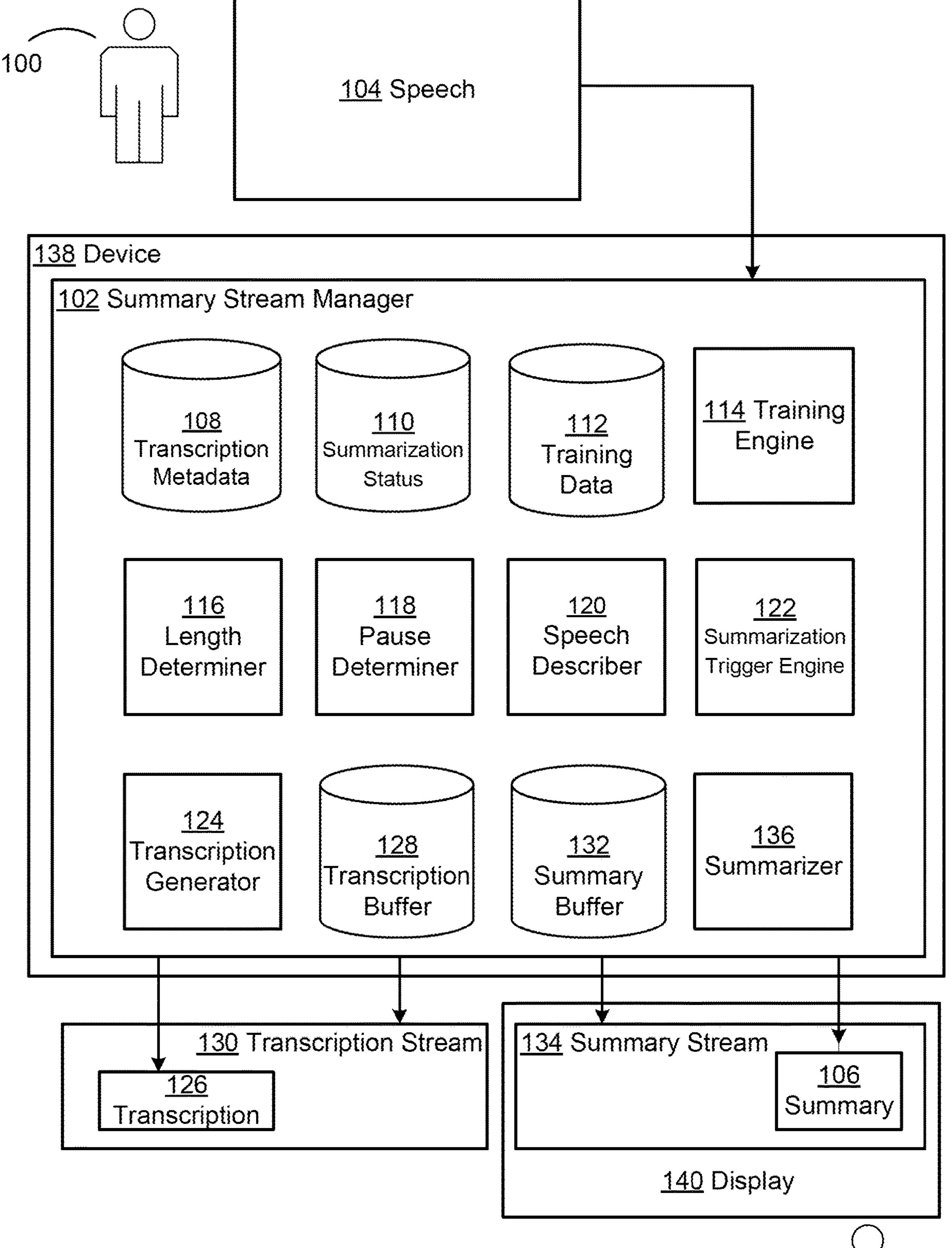
FIG. 1 is a block diagram of a system for determining when to summarize text.

Summarization generally refers to techniques for attempting to reduce a volume of text to obtain a reduced text volume that retains most information of the volume of text within a summary. Accordingly, a user may consume information in a more efficient and desirable manner. For example, a machine learning model may be trained to input text and output a summary of the text. In the outputted summarized text, the number of words is reduced as compared with the input text, but a meaning of (or number of concepts or ideas expressed in) the input text is maintained in the outputted summarized text.

Described systems and techniques enable timely summaries of spoken content. Transcribed speech is summarized at appropriate points, such as at and/or before pauses of the speech, changes in topics of the speech, changes in persons speaking, and/or quality of the speech (or confidence level of the transcription).

Described techniques may be implemented for virtually any type of spoken input text. For example, automatic speech recognition (ASR), or other transcription techniques, may be used to provide a live transcription of detected speech, which may then be provided or available to a user as a transcription stream. Then, described techniques may be used to simultaneously provide a corresponding live summarization stream, i.e., to provide the summarization stream in parallel with the transcription stream. The presentation summarization stream can make understanding the content of the speech easier for the user than a transcription that includes each word that was spoken.

For example, a user wearing smartglasses or a smartwatch, or using a smartphone, may be provided with either or both of a transcription stream and a summarization stream while listening to a speaker. In other examples, a user watching a video or participating in a video conference may be provided with either/both a transcription stream and a summarization stream.

Described techniques may be helpful, for example, when a user is deaf or hard of hearing, as the user may be provided with the summary stream visually on a display. Similarly, when the user is attempting to converse with a speaker in a foreign language, the user may be provided with the summary stream in the user's native language.

Described techniques thus overcome various shortcomings and deficiencies of existing summarization techniques, while also enabling new implementations and use cases. For example, existing summarization techniques may reduce input text excessively, may not reduce input text enough, may include irrelevant text, or may include inaccurate information. In scenarios referenced above, in which a transcription stream and a summarization stream are desired to be provided in parallel, existing summarization techniques (in addition to the shortcomings just mentioned) may be unable to generate a desirable summary quickly enough, or may attempt to generate summaries at inopportune times (e.g., before a speaker has finished discussing a topic). Still further, existing techniques may generate a summary that is too lengthy (or otherwise maladapted) to be displayed effectively on an available display area of a device being used (e.g., smartglasses).

In contrast, described techniques solve the above problems, and other problems, by, e.g., analyzing spoken input and determining when to summarize the text and/or which portion(s) of the text to summarize. Consequently, described techniques are well-suited to generate dynamic, real-time summaries, while a speaker is speaking, and in conjunction with a live transcription that is also produced and available to a user. As a result, the user may be provided with a fluid interaction with the speaker, while described techniques facilitate an understanding of the interaction by the user. Summarizing appropriate portions of the text facilitates the user understanding the spoken input.

FIG. 1 is a block diagram of a system for determining when to perform a summary. In the example of FIG. 1, a summary stream manager 102 processes speech 104 (audio data, also referred to as spoken input) of a speaker 100 to generate a summary 106. The summary 106 can be considered summarized text. The speech 104 can be represented and/or stored as audio data. In some examples, the summary 106 is provided to a user 101 as part of a live summary stream 134 (a data stream). The speech 104 can include virtually any spoken words or other spoken input. For example, the speech 104 may be a lecture, a speech, talk, a dialogue, an interview, a conversation, or any other spoken-word interaction of two or more participants. The spoken-word interaction can include both (or more than two) participants talking at various times, or only one participant talking while the other participant(s) listens. Such interactions may be largely one-sided (a monologue), such as in the case of a lecture, or may be an equal give-and-take between the speaker 100 and the user 101.

In some examples, a conversation may be conducted between the speaker 100 and the user 101, and the conversation may be facilitated by the summarization manager 102. In some examples, the speaker 100 represents a lecturer, while the user 101 represents a lecture attendee, so that the summary stream manager 102 facilitates utility of the lecture to the user 101. The speaker 100 and the user 101 may be co-located and conducting an in-person conversation, or may be remote from one another and communicating via web conference.

In some examples, the speaker 100 may record the speech 104 at a first time, and the user 101 may view (and receive the summary 106 of) the recorded audio and/or video at a later time. In this sense, the term 'live conversation' should be understood to be primarily from the perspective of the user 101. In some examples, the user 101 may listen live to a video of the speaker 100 that was previously recorded, and be provided with the type of live, dynamically-adjusted summary stream 134 described herein.

In some examples, FIG. 1 illustrates an ability of the summary stream manager 102 to provide the summary 106 in a stand-alone or static manner, in response to a discrete instance of the speech 104 (e.g., summarizing audio of a single recorded video). At the same time, FIG. 1 also illustrates an ability of the summary stream manager 102 to receive speech of the speaker 100 over a first time interval and output the summary 106 to the user 101, and then to repeat such speech-to-summary operations over a second and subsequent time interval(s) to summarize appropriate portions of the speech 104, as described in detail herein with reference to the summary stream 134. In other words, as shown and described, the summary 106 may be understood to represent one or more discrete summaries of corresponding speech of the speaker 100 within a time interval of a larger time period or time window of a conversation.

As also described in detail, below, the summary stream manager 102 may be implemented in conjunction with any suitable device 138, such as a head-mounted device, a handheld computing device, smartglasses, earbuds, or a smartwatch. For example, the summary stream manager 102 may be implemented in conjunction with one or more such devices in which a microphone or other input device is used to receive the speech 104, and an audio output, visual display (e.g., a display 140 in FIG. 1), and/or other output device(s) is used to render or provide the summary 106 and the summary stream 134.

The summary stream manager 102 is illustrated in the simplified example of FIG. 1 as a single component that includes multiple sub-components. As also described below, however, the summary stream manager 102 may be implemented using multiple devices in communication with one another, such as a local computing device (e.g. head-mounted device, smartphone, or smartglasses in communication with a remote server).

In some examples, summary stream manager 102 includes and/or stores transcription metadata 108. In some examples, the transcription metadata 108 are generated by transcription generator 124, described below, in association with the transcription 126.

In some examples, the stored transcription metadata 108 includes time values associated with words and/or text transcribed from the speech 104. The time values can also be considered timing data. The time values can be associated with words included in a transcription 126, described below. In some examples, the time value associated with a word represents a duration of a pause before the word was spoken. The duration of the pause (or pause duration) can be measured from a last detected sound (or ending of a sound) of the word (e.g., a prior word) to a first detected sound (or beginning of a sound) of a subsequent word. In some examples, the time value associated with a word represents a duration of a pause after the word was spoken and/or before the next word was spoken. In some examples, the time value associated with a word represents an absolute time at which the speaker 100 began or ended speaking the word, or time relative to a beginning of the speech 104 at which the speaker 100 began or finished speaking the word. In some examples, a pause and/or time values associated with a word can be based on a difference between the absolute time and/or relative time associated with the word and the absolute time and/or relative time associated with the subsequent or previous word.

In some examples, the transcription metadata 108 includes topics associated with sequences of words within the transcription 126. The topics can include, for example, work, leisure activity, persons, places, or more specific variants of these topics, as non-limiting examples. The topics can be associated with sequences of words and/or portions of the text and/or transcription 126. In some examples, a speech describer 120, described below, determines topics of interest associated with sequences of words and/or portions of the text and/or transcription 126. In some examples, the summary stream manager 102 can determine that the summarization should be performed when the topic changes, and/or at the end of a portion of text or sequence of words for which an associated topic is different than a subsequent sequence of words or portion of text. The stored transcription metadata 108 can indicate changes of topics within the transcription 126.

In some examples, the stored transcription metadata 108 includes speakers associated with sequences of words and/or portions of the text within the transcription 126. In some examples, two or more persons can alternate speaking within the speech 104. In some examples, the speech describer 120, described below, determines a speaker associated with particular sequences of words and/or portions of the text within the transcription 126. The stored transcription metadata 108 can indicate changes of speakers within the transcription 126.

In some examples, the stored transcription metadata 108 includes a quality and/or confidence level of the speech 104. The stored transcription metadata 108 can include the quality and/or confidence level associated with portions of the transcription 126, sequences of words within the transcription 126, and/or individual words within the transcription 126.

In some examples, the stored transcription metadata 108 includes characteristics of the speech 104. For example, the stored transcription metadata 108 can include a rate, a tonality, a volume, a pitch, an emphasis, or any other characteristic of the speech 104. The stored transcription metadata 108 can include the speaker 100 individually or as a class/type of speaker. The stored transcription metadata 108 can also identify a language being spoken by the speaker 100.

In some examples, the summary stream manager 102 stores a summarization status 110 of the transcription 126 and/or portions of the transcription 126. The summarization status 110 indicate whether, and/or which, portions of the transcription 126 have been summarized. The summarization status 110 can indicate whether portions of the transcription 126, sequences of words within the transcription 126 and/or words within the transcription 126 are summarized (i.e. have been summarized) or unsummarized (i. e. have not been summarized).

Training data 112 generally represents any training data that may be processed by a training engine 114 to train one or more machine learning (ML) models, as described herein. The training data 112 may represent one or more available repositories of labeled training data used to train such ML models, and/or may represent training data compiled by a designer of the summary stream manager 102.

In some examples, the training data 112 include contexts in which a user, such as the user 101, manually or otherwise requests a summary of speech 104 and/or transcription 126. The training data 112 can be based on previous (such as test) users who train the model, and/or can be based on a current user to improve the model for the current user. The training data 112 can include requests for summarization when the summary stream manager 102 did not perform a summarization automatically and/or independently of user request. The training data 112 can include a type and/or degree of the error, which may be used by the training engine 114 in a subsequent training iteration to adjust weights or other parameters to determine when to summarize the speech 104 and/or transcription 126, and/or when to perform a summarization. Over multiple iterations, the weights or other parameters may thus be adjusted by the training engine 114 to cause the summary stream manager 102, once deployed, to summarize portions of speech with an acceptable level of accuracy and/or optimize points of summarization for a particular user.

In some examples, the summary stream manager 102 includes a length determiner 116. The length determiner 116 determines lengths of portions of, and/or sequences of words within, the speech 104 and/or transcription 126. In some examples, the length determiner 116 determines lengths of portions of, and/or sequences of words within, the speech 104 and/or transcription 126 that are unsummarized (i.e. have not been summarized). In some examples, the length determiner 116 determines the length based on a time duration of a portion and/or sequence of words within the speech 104. In some examples, the length determiner 116 determines the length based on a number of words within a portion and/or sequence of words within the transcription 126.

In some examples, the summary stream manager 102 includes a pause determiner 118. The pause determiner 118 determines the existence of and durations of pauses associated with words included in the transcription 126. The pause determiner 118 can determine the existence of and durations of pauses based on the time values associated with the words that are stored in the stored transcription metadata 108. The pause determiner 118 can store the determined pauses in the stored transcription metadata 108.

The pauses (or pause durations or durations of pauses) associated with words can be times before the word during which no word (or human speech) is spoken, times after the word during which no word (or human speech) is spoken, time differences between the time associated with the word and the time associated with a previous word, time differences between the time associated with the word and the time associated with a subsequent word, time differences between a beginning of a word and an ending of a previous word time, or time differences between an end of a word and a beginning of a subsequent word, as non-limiting examples.

In some examples, the summary stream manager 102 includes a speech describer 120. The speech describer 120 determines features of the speech 104 and/or transcription 126 that are stored as stored transcription metadata 108. The speech describer 120 can determine a topic of portions of, and/or sequences of words within, the speech 104 and/or the transcription 126 based on words included in the transcription 126 (such as by performing natural language understanding techniques). The speech describer 120 can determine who the speaker is of a portion of and/or sequences of words included in the transcription 126 based on, for example, voice tones, intonations, accents, and/or pauses.

In some examples, the speech describer 120 determines the quality of the speech 104 and/or transcription 126 based on a confidence level of a portion the transcription 126, and/or a confidence level of a sequence of words within the transcription 126. In some examples, the speech describer 120 determines the quality and/or confidence level of the portion or sequence of words based on a value received from the transcription generator 124. The transcription generator 124 can indicate, to the speech describer 120 while transcribing the speech 104, a quality and/or confidence level associated with portions of the transcription 126 and/or sequences of words.

The speech describer 120 can be configured to receive the speech 104, e.g., via a microphone or other input of the device 138, and process the speech 104 (audio data) to determine relevant speech characteristics (as reflected by the audio data representing the speech) that are included in the stored transcription metadata 108. For example, the speech describer 120 can calculate or otherwise determine a rate, a tonality, a volume, a pitch, an emphasis, or any other characteristic of the speech 104. The speech describer 120 also may identify the speaker 100 individually or as a class/type of speaker. For example, the speech describer 120 may identify the speaker 100 as a friend of the user 101, or as a work colleague or teacher of the user 101. The speech describer 120 may also identify a language being spoken by the speaker 100.

In some examples, the summary stream manager 102 includes a summarization trigger engine 122. The summarization trigger engine 122 determines when the summary stream manager 102 will perform and/or initiate a summarization of the transcription 126 and/or portions of or sequences of words within the transcription 126. In some examples, the summarization trigger engine 122 determines an end portion of text included in the transcription 126 to include in a summarization and/or to summarize. The end portion of text can be a final word of a sequence of words within the transcription 126. In some examples, the summarization trigger engine 122 determines whether a proposed (e.g., potential, candidate) end portion (or proposed final word) is or will be an end portion (or final word) in a portion of text to be summarized.

In some examples, the summarization trigger engine 122 manages characteristics of a summary stream 134 relative to, or in conjunction with, a transcription stream 130. In some examples, the summarization trigger engine 122 determines whether or when to invoke the summarizer 136 to generate the summary 106 based on characteristics of the transcription stream 130. For example, the summarization trigger engine 122 may detect sentence endings, pauses in speech, or a rate (or other characteristic) of the audio to determine whether/when to invoke the summarizer 136.

The summarization trigger engine 122 can determine that the summary stream manager 102 will perform the summarization of, and/or summarize, the portions of or sequences of words within, the speech 104 and/or transcription 126 that end with an end portion or final word based on any combination of signals and/or values. In some examples, the signals and/or values based on which the summarization trigger engine 122 determines that the portion or sequence of words will end with the end portion or final word includes the length (as determined by the length determiner 116) of the portion of speech 104 or sequence of words that ends with a proposed end portion (or proposed final word). In some examples, the signals and/or values based on which the summarization trigger engine 122 determines that the portion or sequence of words will end with the end portion or final word includes the time value (such as pause or pause duration) associated with the proposed end portion (such as the proposed final word) of the portion of speech 104 or sequence of words. In some examples, the signals and/or values based on which the summarization trigger engine 122 determines that the portion or sequence of words will end with the end portion or final word includes a punctuation mark at or immediately following the proposed end portion (or proposed final word). In some examples, the signals and/or values based on which the summarization trigger engine 122 determines that the portion or sequence of words will end with the end portion or final word includes a change in speaker after the proposed end portion (such as the proposed end portion being spoken by a first person and a subsequent portion and/or word being spoken by a second person). In some examples, the signals and/or values based on which the summarization trigger engine 122 determines that the portion or sequence of words will end with the end portion or final word includes a change in topic after the proposed end portion (such as the proposed end portion being associated with a first topic and a subsequent portion and/or word being associated with a second topic).

In some examples, the proposed end portion can be a portion and/or word of the speech 104 and/or transcription 126 that the summarization trigger engine 122 considers for the end portion and/or final word within a summarization. In some examples, the summarization trigger engine 122 considers multiple proposed end portions to determine which portion and/or word should be the end portion and/or final word within a summarization. In some examples, the summarization trigger engine 122 considers proposed end portions sequentially (such as starting with a first word or other predetermined ordinal number within unsummarized text), such as considering portions and/or words in chronological order, until determining that a proposed end portion should be the end portion and/or final word within a summarization. In some examples, the summarization trigger engine 122 considers multiple proposed end portions within unsummairzed text and selects the proposed end portion with a best score to the be the end portion and/or final word within a summarization. In some examples, the proposed end portion is a portion of the audio data and/or speech 104. In some example, the proposed end portion is a portion and/or word included in the text and/or transcription 126.

In some examples, the summarization trigger engine 122 determines that the summary stream manager 102 should summarize a portion of the speech 104 and/or transcription 126 based on a length of the portion of the speech 104 and/or transcription 126 that ends with the proposed end portion (such as a proposed final word) and a time value associated with the proposed end portion (such as the proposed final word). In some examples, the portion of the speech that the summarization trigger engine 122 determines should be summarized is an unsummarized portion of the speech 104 and/or transcription 126 that begins immediately after a last summarized portion of the speech 104 and/or transcription 126. In some examples, the time value associated with the proposed end portion is a duration of a pause after the proposed end portion. In some examples, the time value associated with the proposed end portion is a duration of time between the end proposed portion and a subsequent unsummarized portion of the speech 104 and/or transcription 126 that immediately follows the end portion (the subsequent unsummarized portion can be a beginning of a subsequent word in the speech).

In some examples, the summarization trigger engine 122 determines that the summarizer 136 should summarize the portion of the speech 104 and/or transcription 126 based on the proposed end portion ending with, and/or being immediately followed by, a punctuation mark. In some examples, different punctuation marks have different values and/or weights for determining whether the portion that ends with the proposed end portion should be summarized. For example, a question mark could be the most likely punctuation mark to cause the summarization trigger engine 122 to trigger a summary because a question mark indicates that a speaker or topic may change. In some examples, an exclamation point may be the next most likely punctuation mark to cause the summarization trigger engine 122 to trigger a summary because an exclamation point emphasizes the preceding sentence. In some examples, a period may be the next most likely punctuation mark to cause the summarization trigger engine 122 to trigger a summary because a period ends the preceding sentence. In some examples, a semicolon may be the next most likely punctuation mark to cause the summarization trigger engine 122 to trigger a summary because a semicolon indicates connected ideas that could form separate sentences. In some examples, a comma may be the least likely punctuation mark to cause the summarization trigger engine 122 to trigger a summary because a comma simply pauses a sentence. In some examples, the summarization trigger engine 122 can trigger a summary after an answer to a question (which may be indicated by a question mark) has been provided. The answer to the question may have been provided by the same person who asked the question (in an example of a rhetorical question) or by a different person than the person who asked the question.

In some examples, the summarization trigger engine 122 determines that the summarizer 136 should summarize the portion of the speech 104 and/or transcription 126 based on the portion that ends with the proposed end portion being spoken by a first speaker and an immediately subsequent portion of the speech 104 and/or transcription 126 being spoken by a second speaker, the second speaker being different than the first speaker. The summarization based on a change of speakers can be based on changes of speakers often discussing different topics, and/or a desirability of having summaries of what was spoken by each speaker.

In some examples, the summarization trigger engine 122 determines that the summarizer 136 should summarize the portion of the speech 104 and/or transcription 126 based on the portion that ends with the proposed end portion being about a first topic and an immediately subsequent portion of the speech 104 and/or transcription 126 being about a second topic, the second topic being different than the first topic. The summarization based on a change of topics can be based on a desirability of having summaries of each topic.

In some examples, the summarization trigger engine 122 determines that the summarizer 136 should summarize the portion of the speech 104 and/or transcription 126 based on a quality of the transcription, and/or a quality of a transcription of speech immediately after the portion that ends with the proposed end portion. A lower quality of the transcription increases the likelihood that the summarization trigger engine 122 will determine that the summarizer 136 should summarize the portion of the speech 104 and/or transcription 126. It may be desirable to summarize a portion of the speech 104 and/or transcription 126 while the accuracy and/or confidence of the transcription 126 is still high, to avoid an inaccurate summary based on an inaccurate transcription.

In some examples, the longer the portion of the speech 104 and/or transcription 126 that ends with the proposed end portion, the more likely that the summarization trigger engine 122 will determine that the summarizer 136 should summarize the portion. In some examples, if the portion of the speech 104 and/or transcription 126 is relatively short, the summarization trigger engine 122 will not determine that the summarizer 136 should summarize the portion unless a pause after the portion is relatively long. In some examples, when the portion becomes relatively longer, the summarization trigger engine 122 can determine that the summarizer 136 should summarize the portion with a relatively shorter pause after the portion. In some examples, the summarization trigger engine 122 determines that the summarizer 136 should summarize a portion of the speech 104 and/or transcription 126 for shorter lengths of the portion when the punctuation at the end of the portion and/or immediately after the portion is a question mark than other punctuation marks. In some examples, the less likely the punctuation mark is to cause the summarization trigger engine 122 to determine that the summarizer 136 should perform a summary, the longer the portion of the speech 104 and/or transcription 126 will be before the summarization trigger engine 122 determines that the summarizer 136 should summarize the speech 104 and/or transcription 126.

In some examples, the summarization trigger engine 122 determines that the summarizer 136 should summarize the speech 104 and/or transcription 126 when a summarization trigger value satisfies a trigger condition, such as meeting or exceeding a threshold value. In some examples, the summarization trigger value increases as the length of the unsummarized portion of the speech 104 and/or transcription 126 increases. In some examples, the summarization trigger value increases for higher pause durations after the proposed end portion and decreases for lower pause durations after the proposed end portion. In some examples, the summarization trigger value increases when the speaker changes. In some examples, the summarization trigger value increases when the topic changes. In some examples, the summarization trigger value increases when the proposed end portion includes and/or is immediately followed by a punctuation mark. In some examples, the increase to the summarization trigger value is based on the type of punctuation mark, such as a question mark increasing the summarization trigger value the most, an exclamation point increasing the summarization trigger value the next most, a period increasing the summarization trigger value the next most, a semicolon increasing the summarization trigger value the next most, and a comma increasing the summarization trigger value the least of the punctuation marks. In some examples, the summarization trigger value increases when a quality of transcription of the speech 104 immediately following the proposed end portion declines, causing the portion ending with the proposed end portion to be more likely to be summarized if the subsequent speech is difficult to transcribe.

In some examples, the summarization trigger engine 122 determines that a summarization should be performed based on a voice or body motion of the user 101 suggesting that the user 101 is interested in understanding what was previously spoken. In some examples, the summarization trigger engine 122 determines that a summarization should be performed based on a rate of speech being sufficiently fast that reading the transcription 126 would be difficult (such as the rate of speech and/or number of words per unit of time meeting or exceeding a speech speed threshold).

In some examples, the summary stream manager 102 includes a transcription generator 124. The transcription generator 124 converts the spoken words of the speech 104 to transcribed text, shown in FIG. 1 as a transcription 126. The transcribed text can include one or multiple text strings. For example, the transcription generator 124 may include an automatic speech recognition (ASR) engine or a speech-to-text (STT) engine.

The transcription generator 124 may include many different approaches to generating text, including additional processing of the generated text. For example, the transcription generator 124 may provide timestamps for generated text (which can be the time values associated with the words and/or portions of the text), a confidence level (which can be included in the transcription metadata 108) in generated text, and inferred punctuation (which can be included in the transcription metadata 108) of the generated text. For example, the transcription generator 124 may also utilize natural language understanding (NLU) and/or natural language processing (NLP) models, or related techniques, to identify semantic information (e.g., sentences or phrases), identify a topic, or otherwise provide metadata for the generated text.

The transcription generator 124 may provide various other types of information in conjunction with transcribed text, perhaps utilizing related hardware/software. For example, the transcription generator 124 may analyze an input audio stream to distinguish between different speakers, or to characterize a duration, pitch, speed, or volume of input audio, or other audio characteristics, which can be stored in the transcription metadata 108.

Thus, the transcription 126 may represent an entirety of transcribed audio, such as a transcribed lecture, and may include, or provide access to, one or more of the types of data and/or metadata just referenced. In some examples, the transcription generator 124 may receive an audio file of a recorded lecture and output the transcription 126 and transcription metadata 108. In such examples, the transcription metadata 108 and transcription 126 may be used as input text to one or more of the length determiner 116, the pause determiner 118, the speech describer 120, and/or the summarizer 136.

In some examples, the transcription generator 124 may utilize a transcription buffer 128 to output a transcription stream 130. That is, for example, the transcription generator 124 may process a live conversation, discussion, or other speech, in real time and while the speech is happening. The transcription 126 thus represents a transcription of a segment or instance of transcribed text within a time interval that occurs within a larger time period or time window of a conversation. For example, the summary 106 may represent a summarization of the transcription 126 (and/or portions of the transcription 126), where the transcription 126 represents a transcript of a portion of the speech 104, e.g., a first 10 seconds of the speech 104.

For example, while the speaker 100 is speaking, the transcription generator 124 may output transcribed text to be stored in the transcription buffer 128. The transcribed text (text data) may be designated as intermediate or final text within the transcription buffer 128, before being available as the transcription 126 and/or transcription stream 130. For example, the transcription generator 124 may detect the end of a sentence, a switch in speakers, a pause of pre-defined length, or other detected audio characteristic to designate a final transcription to be included in the transcription stream 130. In other examples, the transcription generator 124 may wait until the end of a defined or detected time interval to designate a final transcription of audio.

Words can be considered portions of the transcription 126. In some examples, a final word of text can be considered an end portion of text (or an end portion of a portion of text) included in the transcription 126.

The transcription stream 130 (a data stream) may thus be processed by a summarizer 136 to populate a summary buffer 132 and otherwise output the summary 106 and/or summary stream 134 (a data stream). The summarizer 136 may represent any trained model or algorithm designed to perform summarization. Summarization, as performed by the summarizer 136, generally refers to techniques for reducing a volume of text to obtain a reduced text volume that retains most information of the volume of text within a summary.

In some examples, the summarizer 136 may be implemented as a sequence-to-sequence generative large learning model (LLM). In some examples, the speech describer 120, the summarization trigger engine 122, and the summarizer 136 may be trained independently, or may be trained together in groups of two or more.

In further examples, the summary stream manager 102 controls various display characteristics with which the transcription stream 130 and/or the summary stream 134 is presented to the user 101. In some examples, the stream manager 102 may provide the user 101 with an option to view either or both (e.g., toggle between) the transcription stream 130 and the summary stream 134.

The stream manager 102 may also be configured to display various indicators related to the transcription stream 130 and the summary stream 134. For example, the stream manager 102 may display a summarization indicator that informs the user 101 that a current portion of the summary stream 134 is being generated, while the summarizer 136 is processing a corresponding portion of the transcription stream 130.

In some examples, the stream manager 102 controls a size, spacing, font, format, and/or speed (e.g., scrolling speed) of the transcription stream 130 and the summary stream 134. Additionally, the stream manager 102 may provide additional processing of the summary stream 134. For example, the stream manager 102 may identify and extract actionable content within the summary stream 134, such as calendar items, emails, or phone calls. In some implementations, the stream manager 102 may be configured to facilitate or enact corresponding actions, such as generating a calendar item, or sending an email or text message, based on content of the summary stream 134.

Although the transcription buffer 128 and the summary buffer 132 are described herein as memories used to provide short-term storage of, respectively, the transcription stream 130 and the summary stream 134, it will be appreciated that the same or other suitable memory may be used for longer-term storage of some or all of the transcription stream 130 and the summary stream 134. For example, the user 101 may wish to capture a summary of a lecture that the user 101 attends for later review. In these or similar situations, multiple instances or versions of the summary 106 may be provided, and the user 101 may be provided with an ability to select a most-desired summary for long term storage.

In FIG. 1, the transcription stream 130 is shown separately from the summary stream 134, and from the display 140. However, as noted above, the transcription stream 130 may be displayed on the display concurrently with, or instead of, the summary stream 134. Moreover, the transcription stream 130 and the summary stream 134 may be implemented as a single (e.g., interwoven) stream of captions. That is, for example, the transcription stream 130 may be displayed for a period of time, and then a summary request may be received via an input device, and a corresponding summary (e.g., the summary 106) may be generated and displayed. Put another way, an output stream of the display 140 may alternate between displaying the transcription stream 130 and the summary stream 134.

In the simplified example of the stream manager 102, the various sub-components 108-136 are each illustrated in the singular, but should be understood to represent at least one instance of each sub-component. For example, two or more training engines, represented by the training engine 114, may be used to implement the various types of training used to train and deploy the speech describer 120, summarization trigger engine and/or the summarizer 136.

In FIG. 1, the summary stream manager 102 is illustrated as being implemented and executed using a device 138. For example, the device 138 may represent a handheld computing device, such as a smartphone, or a wearable computing device, such as smartglasses, smart earbuds, or a smartwatch. The device 138 can be considered a computing system.

The device 138 may also represent cloud or network resources in communication with a local device, such as one or more of the devices just referenced. For example, the various types of training data and the training engine 114 may be implemented remotely from the user 101 operating a local device, while a remainder of the illustrated components of the summarization manager are implemented at one or more of the local devices.

The summary 106 and/or the summary stream 134 are illustrated as being output to a display 140. For example, the display 140 may be a display of the device 138, or may represent a display of a separate device(s) that is in communication with the device 138. For example, the device 138 may represent a smartphone, and the display 140 may be a display of the smartphone itself, or of smartglasses or a smartwatch worn by the user 101 and in wireless communication with the device 138.

In FIG. 1, the transcription stream 130 is shown separately from the summary stream 134, and from the display 140. However, as noted above, the transcription stream 130 may be displayed on the display concurrently with, or instead of, the summary stream 134. Moreover, the transcription stream 130 and the summary stream 134 may be implemented as a single (e.g., interwoven) stream of captions. That is, for example, the transcription stream 130 may be displayed for a period of time, and then a summary request may be received via an input device, and a corresponding summary (e.g., the summary 106) may be generated and displayed. Put another way, an output stream of the display 140 may alternate between displaying the transcription stream 130 and the summary stream 134.

More detailed examples of devices, displays, and network architectures are provided below, e.g., with respect to FIGS. 17, 18A, and 18B. In addition, the summary 106 and the summary stream 134 (as well as the transcription 126 and the transcription stream 130) may be output via audio, e.g., using the types of smart earbuds referenced above.

Figure 2:
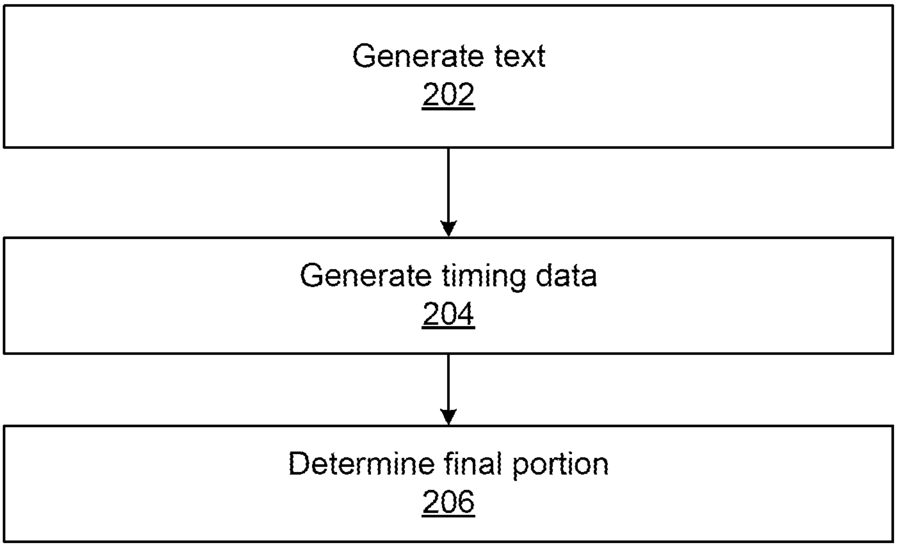
FIG. 2 is a flowchart illustrating example operations of the system of FIG. 1.

FIG. 2 is a flowchart illustrating example operations of the system of FIG. 1. The summary stream manager 102 generates text (202). In some examples, the generated text is considered a data stream. The summary stream manager 102 generates the text (202) based on the received speech 104. The text includes a sequence of words. In some examples, the text also includes punctuation marks, such as question marks (?), exclamation points (!), periods (.), semicolons (;), and/or commas (,).

The summary stream manager 102 generates timing data and/or time values (204). The timing data and/or time values are associated with the generated text and/or with words or portions included in the generated text. The timing data and/or time values can be included in the transcription metadata 108. In some examples, the timing data and/or time values includes pauses after associated words, durations of pauses after associated words, durations of times between associated words and subsequent words that immediately follow the associated words.

The summary stream manager 102 determines an end portion of the generated text to summarize and/or include in a summarization (206). The end portion can include a final word within a sequence of words to summarize and/or include in the summarization. In some examples, the end portion or final word is a recently transcribed word and/or most-recently transcribed word. In some examples, the summary stream manager 102 determines the end portion based on a length of the portion of speech that ends with a proposed end portion (such as a proposed final word) and a time value associated with the end portion. In some examples, the time value includes a duration of a pause after the proposed end portion and/or a duration of time between the proposed end portion and a subsequent portion (such as a subsequent word) within the speech 104 and/or transcription 126. In some examples, the portion of the speech 104 and/or transcription 126 for which the summary stream manager 102 determines the proposed end portion is an unsummarized portion of the speech 104 and/or transcription 126 and/or a portion of the speech 104 and/or transcription 126 that has not been summarized by the summary stream manager 102.

In some examples, the length of the portion of speech that ends with the proposed end portion is a time duration of the portion of the speech 104 that corresponds to the portion of the speech. In some examples, the length of the portion of speech that ends with the proposed end portion is a number of words included in the text transcribed from the portion of the speech. In some examples, the length of the portion of speech that ends with the proposed end portion is based on the words included in the text transcribed from the portion of the speech. In some examples, the length of the portion of speech that ends with the proposed end portion is based on a number of syllables included in the text transcribed from the portion of the speech. In some examples, the length of the portion of speech that ends with the proposed end portion is based on a number of syllables and words (to reflect time associated with pauses between words) included in the text transcribed from the portion of the speech.

In some examples, the determination of the end portion is based on a punctuation mark included in the text, with the punctuation mark immediately following a final and/or last word included in the proposed end portion of the text. Punctuation marks indicating questions (such as question marks) or emphasis (such as exclamation points) can indicate that a summary should be performed.

In some examples, the determination of the end portion is based on a change of speakers, such as the proposed end portion having been spoken by a first portion and subsequent words and/or text being spoken by a second person, the second person being different than the first person. Separately summarizing portions of text and/or speech that were spoken by different persons can be helpful to understand what was spoken by each person. Separately summarizing portions of text and/or speech that were spoken by different persons can also help the summary stream manager 102 to generate more accurate summarizations.

In some examples, the determination of the end portion is based on a change of topics, such as the text included in the proposed end portion being related to a first topic and text subsequent to the proposed end portion being related to a second topic, the second topic being different than the first topic. Separately summarizing portions of text and/or speech that are related to different topics can be helpful to understand the discussions of each of the different topics that were discussed. Separately summarizing portions of text and/or speech that are related to different topics can also help the summary stream manager 102 to generate more accurate summarizations.

Figure 3:
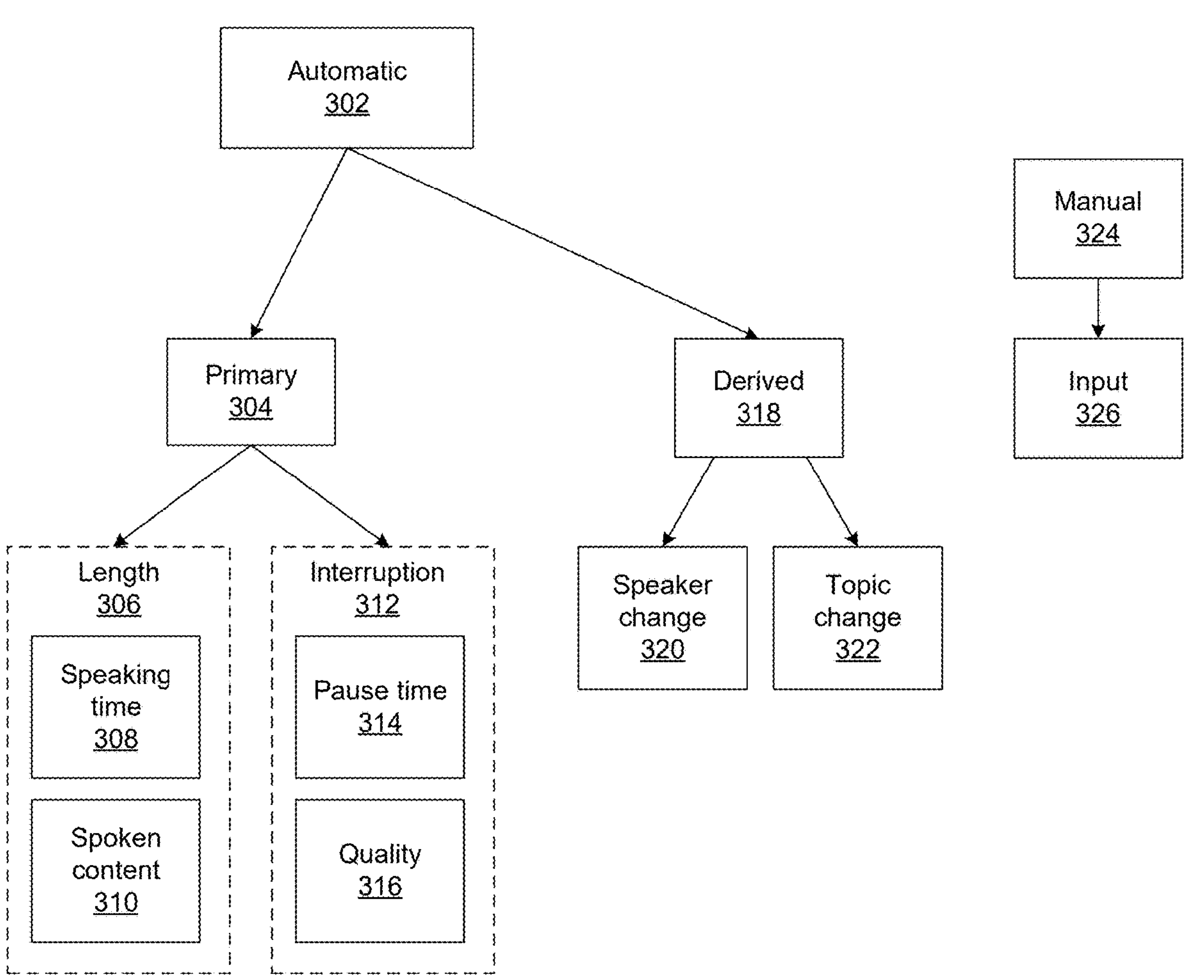
FIG. 3 is a diagram illustrating signals processed by the system of FIG. 1 to determine when to summarize text.

FIG. 3 is a diagram illustrating signals processed by the system of FIG. 1 to determine when to summarize text. In some examples, the signals can be divided into automatic signals 302, that cause the summary stream manager 102 to perform summarization automatically, without user input, and/or independently of user input, and manual signals 324, that cause the summary stream manager 102 to perform summarization in response to user input.

In some examples, the automatic signals 302 are divided into primary signals 304 and derived signals 318. In some examples, the primary signals 304 include directly measurable values, such as length 306 of the speech 104 and interruptions 312 of the speech 104.

The length 306 can be quantified as either speaking time 308 of the portion of speech 104 to be summarized or spoken content 310. The length 306 can be determined by the length determiner 116 described above with respect to FIG. 1. The speaking time 308 can include a duration of time corresponding to the portion of speech 104 to be summarized. The spoken content 310 can be based on the text included in the portion of speech 104 to be summarized, and can be based on a number of words or a number of syllables in the portion of speech 104 to be summarized, as non-limiting examples. The greater the length 306 of the portion of speech 104 to be summarized, the more likely that the summary stream manager 102 will determine that the portion of speech 104 should be summarized without adding additional portions to the portion of speech 104.

The interruptions 312 can include interruptions to the speech 104, such as pauses (quantified as pause time 314) or measures of quality 316. The longer the pause time 314 after the portion of speech 104 to be summarized, the more likely that the summary stream manager 102 will determine that the portion of speech 104 should be summarized without adding additional portions to the portion of speech 104. The quality 316 can include a quality and/or confidence level of the transcription 126. The lower the quality 316 of transcription 126 of the speech 104 immediately following a particular proposed end portion of a portion of the speech 104 to be summarized, the more likely the summary stream manager 102 is to determine that the proposed end portion should be the end portion of the portion of the speech 104 to be summarized. In some examples, the summary stream manager 102 determines that the proposed end portion should be the end portion of the speech 104 to be summarized based on a low confidence level (such as a confidence level falling below a confidence threshold) of transcribing speech subsequent to the proposed end portion.

In some examples, the derived signals 318 are signals that are based on interpretations of the speech 104 performed by the summary stream manager 102. In some examples, the derived signals 318 are signals that are based on interpretations of the speech 104 performed by the speech describer 120. In some examples, the derived signals 318 include a speaker change 320 and/or a topic change 322. In some examples, a speaker change 320 and/or topic change 322 after the proposed end portion of the portion of the speech 104 that the summary stream manager 102 is determining whether to summarize increases the likelihood that the summary stream manager 102 will summarize the portion of the speech 104. In some examples, a determination of the speaker change 320 is based on the proposed end portion of the speech 104 having a first speaker and a subsequent portion of the speech 104 having a second speaker, the second speaker being different than the first speaker. In some examples, the determination of the topic change 322 is based on the proposed end portion of the speech 104 having a first topic and a subsequent portion of the speech 104 having a second topic, the second topic being different than the first topic.

The manual signals 324 can represent input and/or request by the user 101 to perform a summary and/or summarize the unsummarized portion of the speech 104 and/or transcription 126. The manual signals 324 can include input 326 from the user 101, such as gestures captured by a camera and recognized by the device 138, the user 101 pressing or tapping a button or portion of a text screen, or auditory input, as non-limiting examples.

Figure 4:
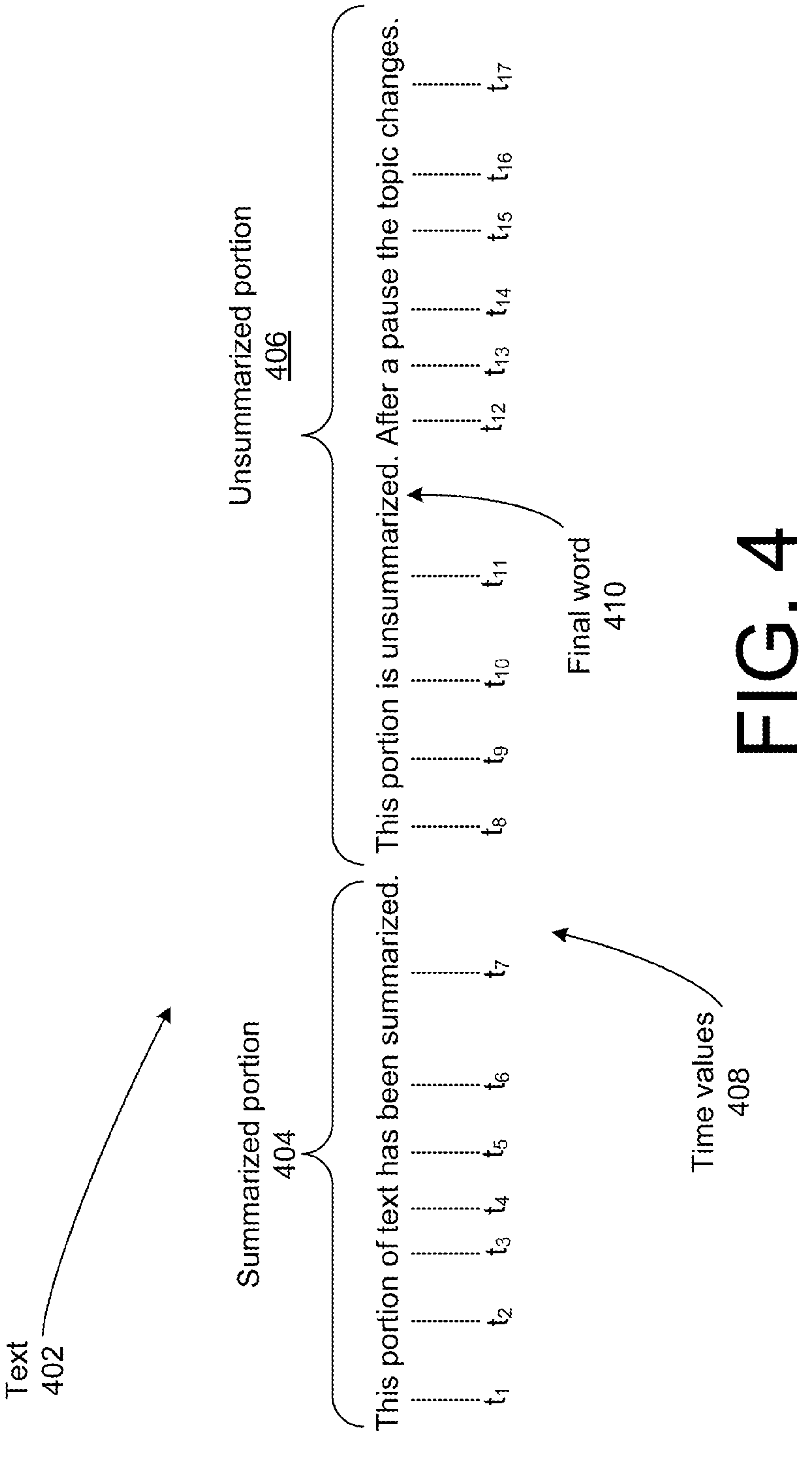
FIG. 4 is a diagram showing text and time values associated with the text.

FIG. 4 is a diagram showing text 402 and time values 408 associated with the text 402. In some examples, the text 402 includes a sequence of words. In some examples, the text 402 is included in the transcription 126. In some examples, the text 402 includes a sequence of words included in the transcription 126.

In some examples, the time values 408 include absolute time values (such as times of day) or relative time values (such as time since a beginning of the speech 104 and/or time since a beginning of an unsummarized portion of the speech 104) when the words are spoken. In some examples, the time values 408 represent durations of pauses after the words and/or between a given word and a subsequent word (such as a duration of silence and/or no sound recognized as speech between the given word and the subsequent word). In some examples, the pause duration (or pause time 314) can be determined based on a time value associated with a word included in the text 402. In some examples, the pause duration is determined based on the time value associated with the word included in the text 402 and a time value associated with a subsequent word included in the text 402 (such as by subtracting the time value associated with the word from the time value associated with the subsequent word). In some examples, the time values 408 for each word in the text include a beginning time at which the word began to be spoken. In some examples, the time values 408 for each word in the text include an ending time at which the word ceased or ended being spoken. In some examples, the time values 408 for each word in the text include a pause duration that the pause determiner 118 calculates by subtracting the ending time of the word from the beginning time of the subsequent word.

In some examples, each word within the text 402 is associated with one time value 408. In the example shown in FIG. 4, the first instance of the word, "This" is associated with time value $t_1$, the first instance of the word, "portion" is associated with time value $t_2$, the word, "of" is associated with time value $t_3$, the word, "text" is associated with time value $t_4$, the word, "has" is associated with time value $t_5$, the word, "been" is associated with time value $t_6$, the word, "summarized" is associated with time value $t_7$, the second instance of the word, "This" is associated with time value $t_8$, the second instance of the word, "portion" is associated with time value $t_9$, the word, "is" is associated with time value $t_{10}$, the word, "unsummarized" is associated with time value $t_{11}$, the word, "After" is associated with time value $t_{12}$, the word, "a" is associated with time value $t_{13}$, the word, "pause" is associated with time value $t_{14}$, the word, "the" is associated with time value $t_{15}$, the word, "topic" is associated with time value $t_{16}$, and the word, "changes" is associated with time value $t_{17}$.

In some examples, the text 402 includes punctuation marks associated with and/or immediately following specific words in the text 402. In the example shown in FIG. 4, the text 402 includes periods associated with and/or immediately following the words, "summarized," "unsummarized," and, "changes."

In some examples, the text 402 includes a summarized portion 404 and an unsummarized portion 406. The summarized portion 404 includes text that has already been summarized. The summarization trigger engine 122 does not need to determine when, and/or a final portion of, to summarize the summarized portion 404. The summarization trigger engine 122 determines an end portion of (such as a final word within) the unsummarized portion 406 to determine a portion of the text 402 to summarize.

In the example shown in FIG. 4, the summarization trigger engine 122 determines whether a proposed end portion, the word, "unsummarized," should be the end portion and/or final word. The summarization trigger engine 122 may have also considered other and/or previous words, such as, "This," "portion,", and, "is," as proposed end portions, and determined that the other and/or previous words should not be the end portion and/or final word 410.

In the example shown in FIG. 4, the summarization trigger engine 122 determines whether the proposed end portion, which can be the word, "unsummarized," should be the end portion and/or final word 410 within the unsummarized portion 406 of the speech 104 and/or transcription 126 to summarize. The summarization trigger engine 122 can determine whether the proposed end portion, the word, "unsummarized" should be the end portion and/or final word 410 within the unsummarized portion 406 of the speech 104 and/or transcription 126 to summarize based, for example, on the length of the unsummarized portion 406 from the second instance of the word, "This," at $t_8$ (that is a beginning portion of and/or a first word in the unsummarized portion 406) to the word, "unsummarized," at $t_{11}$, a pause duration after the word, "unsummarized," and/or between the word, "unsummarized" and the immediately following word, "After," the existence of the punctuation mark (a period) after and/or associated with the word, "unsummarized," and/or whether the speaker or topic changed after the word, "unsummarized," as non-limiting examples.

Figure 5:
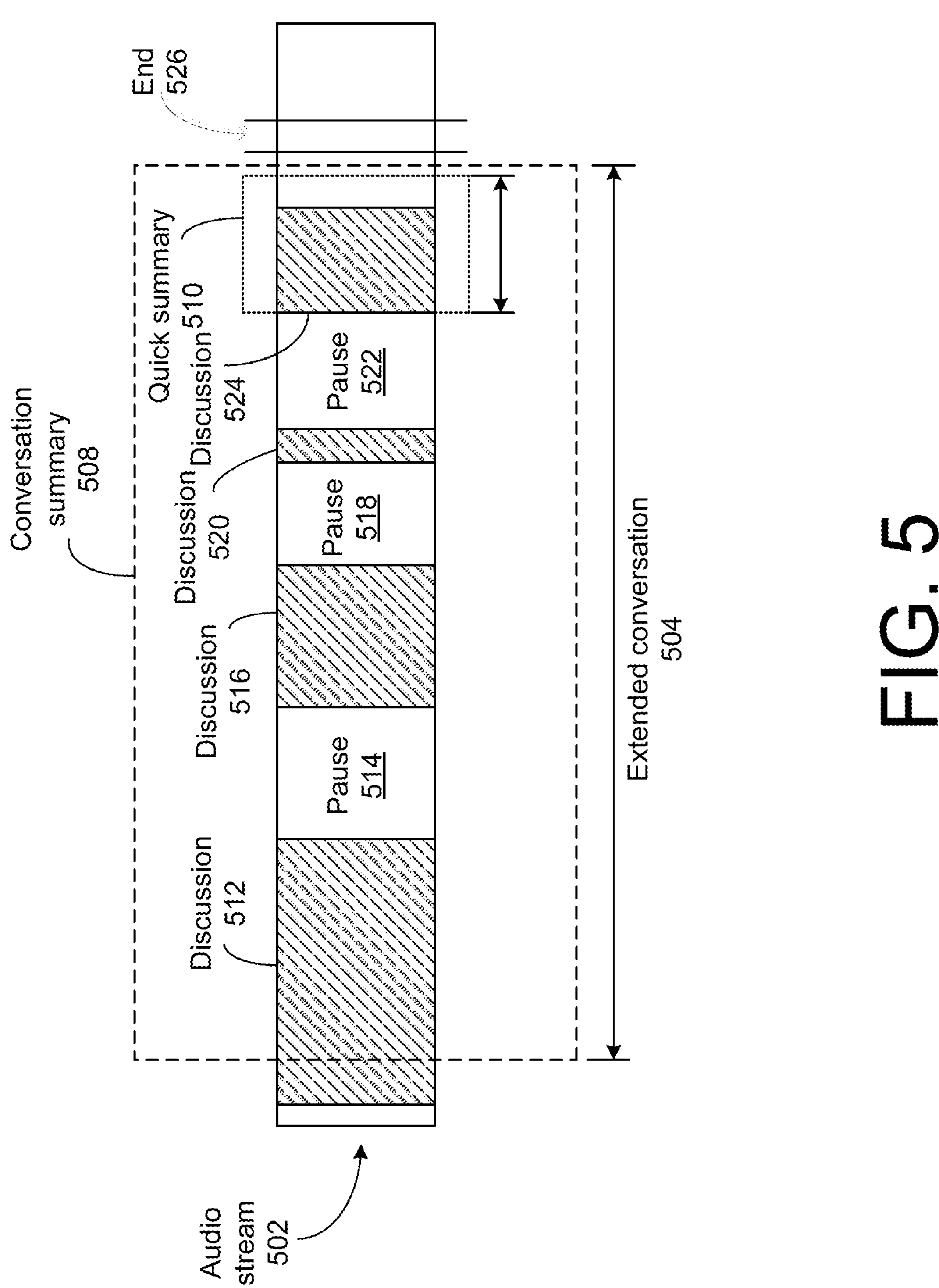
FIG. 5 illustrates an audio stream that is summarized.

FIG. 5 illustrates an audio stream 502 that is summarized. The shaded portions indicate times during which words were spoken, and the empty portions indicate pauses during which no words were spoken.

In the example shown in FIG. 5, the audio stream 502 includes an extended conversation 504 that lasted twenty minutes. In some examples, the summarizer 136 summarizes an entire conversation (such as the extended conversation 504) and additionally summarizes portions of a conversation (such as a last discussion 524). In the example shown in FIG. 5, the summarization trigger engine 122 causes the summarizer 136 to generate a conversation summary 508 that summarizes the extended conversation 504. The conversation summary 508 summarizes the entire extended conversation 504. In the example shown in FIG. 5, the summarization trigger engine 122 causes the summarizer 136 to generate a quick summary 510 that summarizes the last discussion 524 within the extended conversation 504.

In the example shown in FIG. 5, the extended conversation 504 includes a first discussion 512 that lasts one hundred seconds, a pause 514 after the first discussion 512, a second discussion 516 after the pause 514 that lasts forty seconds, a pause 518 after the second discussion 516, a third discussion 520 after the pause 518 that lasts twenty seconds, a pause 522 after the third discussion 520, and the last discussion 524 after the pause 522. The conversation summary 508 is based on the extended conversation 504 up until an end 526 of the extended conversation 504. In the example shown in FIG. 5, the duration of time of the extended conversation 504 prompts the summarization trigger engine 122 to cause the summarizer 136 to generate the conversation summary 508.

Figure 6A:
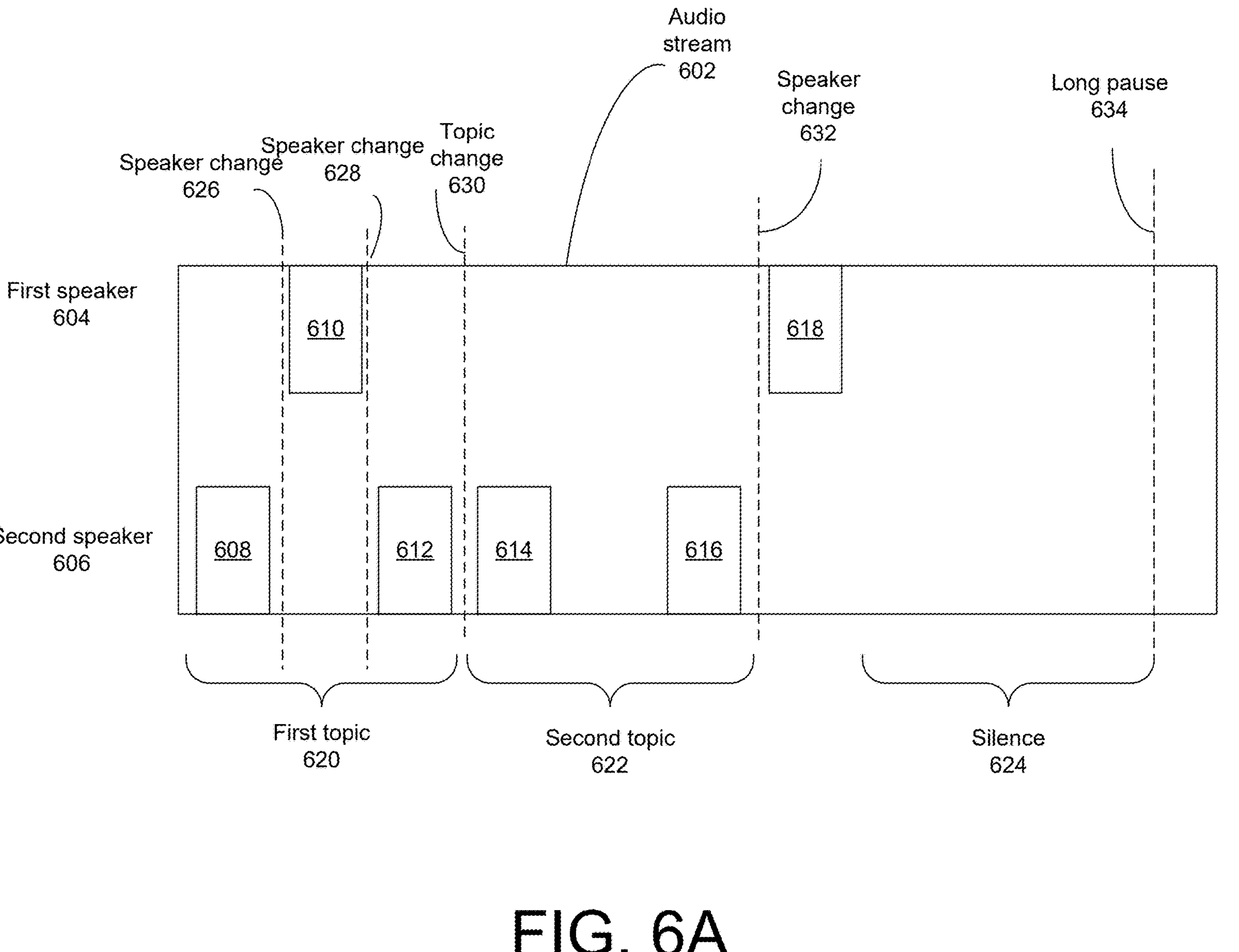
FIG. 6A shows an audio stream and features of the audio stream based on which the system of FIG. 1 determines when to summarize text.

FIG. 6A shows an audio stream 602 and features of the audio stream 602 based on which the system of FIG. 1 determines when to summarize text. The audio stream 602 includes continuous speech and/or sequences of words spoken by a first speaker 604 and a second speaker 606. In the example shown in FIG. 6A, the first speaker 604 spoke blocks 610 and 618 of continuous speech, and the second speaker 606 spoke blocks 608, 612, 614, and 616 of continuous speech. In the example diagram shown in FIG. 6A, the widths of the blocks 608, 610, 612, 614, 616, 618 indicate lengths and/or durations of the speech. In the example shown in FIG. 6A, horizontal spaces and/or distances between the blocks 608, 610, 612, 614, 616, 618 indicate pauses. The horizontal distances between the blocks 608, 610, 612, 614, 616, 618 indicate lengths and/or durations of pauses. A long pause 634, representing silence 624, occurs after a block 618 of continuous speech spoken by the first speaker 604, until the summary stream manager 102 determines that a long pause 634 occurred.

Speaker changes occur between blocks of continuous speech by different speakers, such as between blocks of continuous speech by the first speaker 604 and the second speaker 606. In the example shown in FIG. 6A, a speaker change 626 occurs between the block 608 of continuous speech spoken by the second speaker 606 and the block 610 of continuous speech spoken by the first speaker 604. In the example shown in FIG. 6A, another speaker change 628 occurs between the block 610 of continuous text spoken by the first speaker 604 and the block 612 of continuous speech spoken by the second speaker 606. In the example shown in FIG. 6A, another speaker change 632 occurs between the block 616 of continuous speech spoken by the second speaker 606 and the block 618 of continuous speech spoken by the first speaker 604.

Topic changes occur between blocks of continuous speech that are related to different topics. In the example shown in FIG. 6A, the blocks 608, 610, 612 of continuous speech are related to a first topic 620. In the example shown in FIG. 6A, the blocks 614, 616 of continuous speech are related to a second topic 622. The second topic 622 is different than the first topic 620. The topics 620, 622 may have been determined by the speech describer 120. The topics 620, 622 could include, for example, work, appointments such as dinner, other activities (such as sporting events), or finance, as non-limiting examples.

Figure 6B:
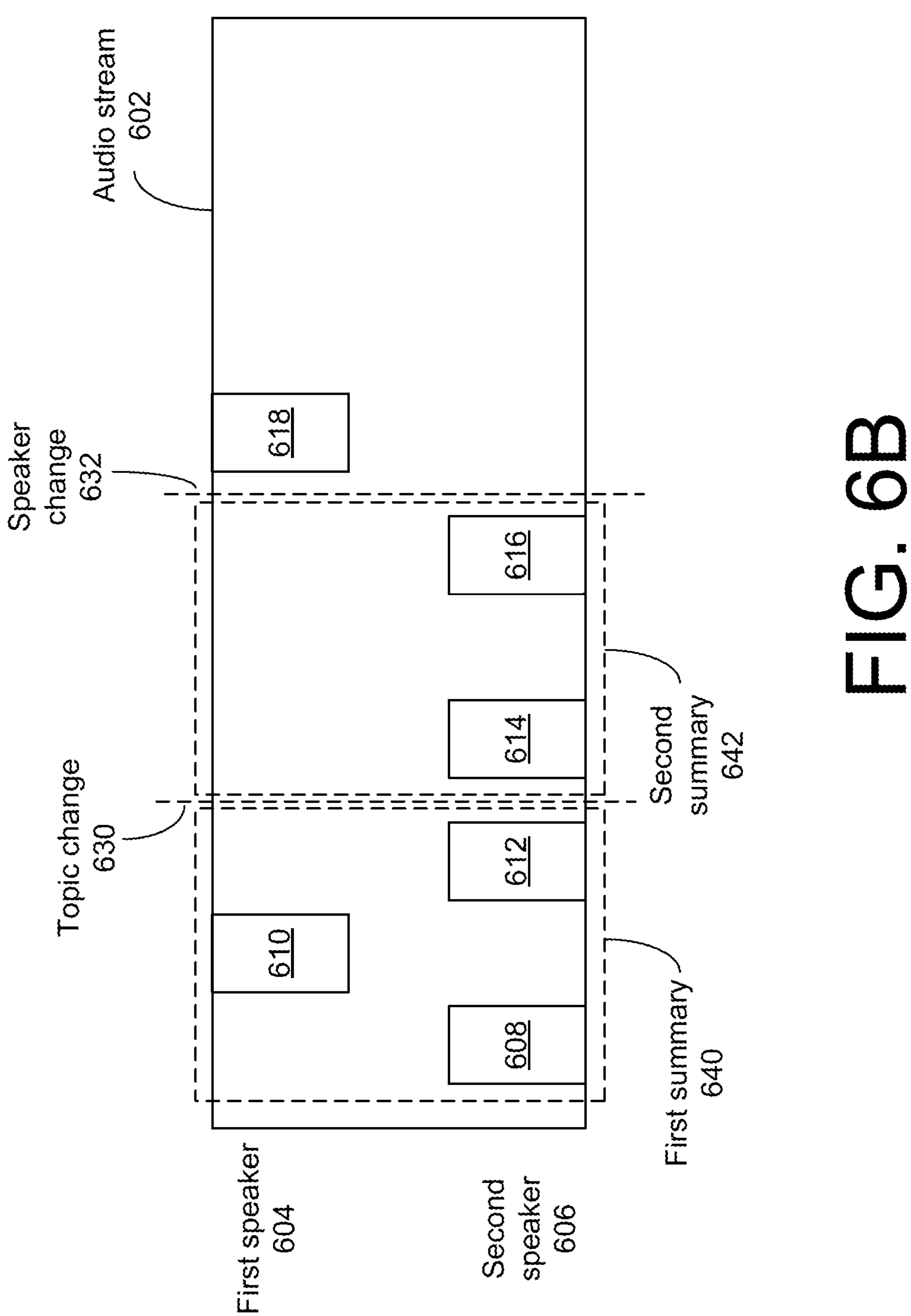
FIG. 6B shows the audio stream of FIG. 6A and portions of the audio stream that are summarized.

FIG. 6B shows the audio stream 602 of FIG. 6A and portions of the audio stream 602 that are summarized. In the example shown in FIG. 6A, the summarization trigger engine 122 causes the summarizer 136 to summarize the speech 104 and/or transcription 126 included in and/or represented by blocks 608, 610, 612 of spoken text as a first summary 640 based on the topic change 630 that occurred after the last block 612 of continuous speech that is included in the first summary 640. In the example shown in FIG. 6B, the summarization trigger engine 122 causes the summarizer 136 to summarize the speech 104 and/or transcription 126 included in and/or represented by blocks 614, 616 of spoken text as a second summary 642 based on the speaker change 632 that occurred after the last block 616 of continuous speech that is included in the second summary 642.

Figure 7A:
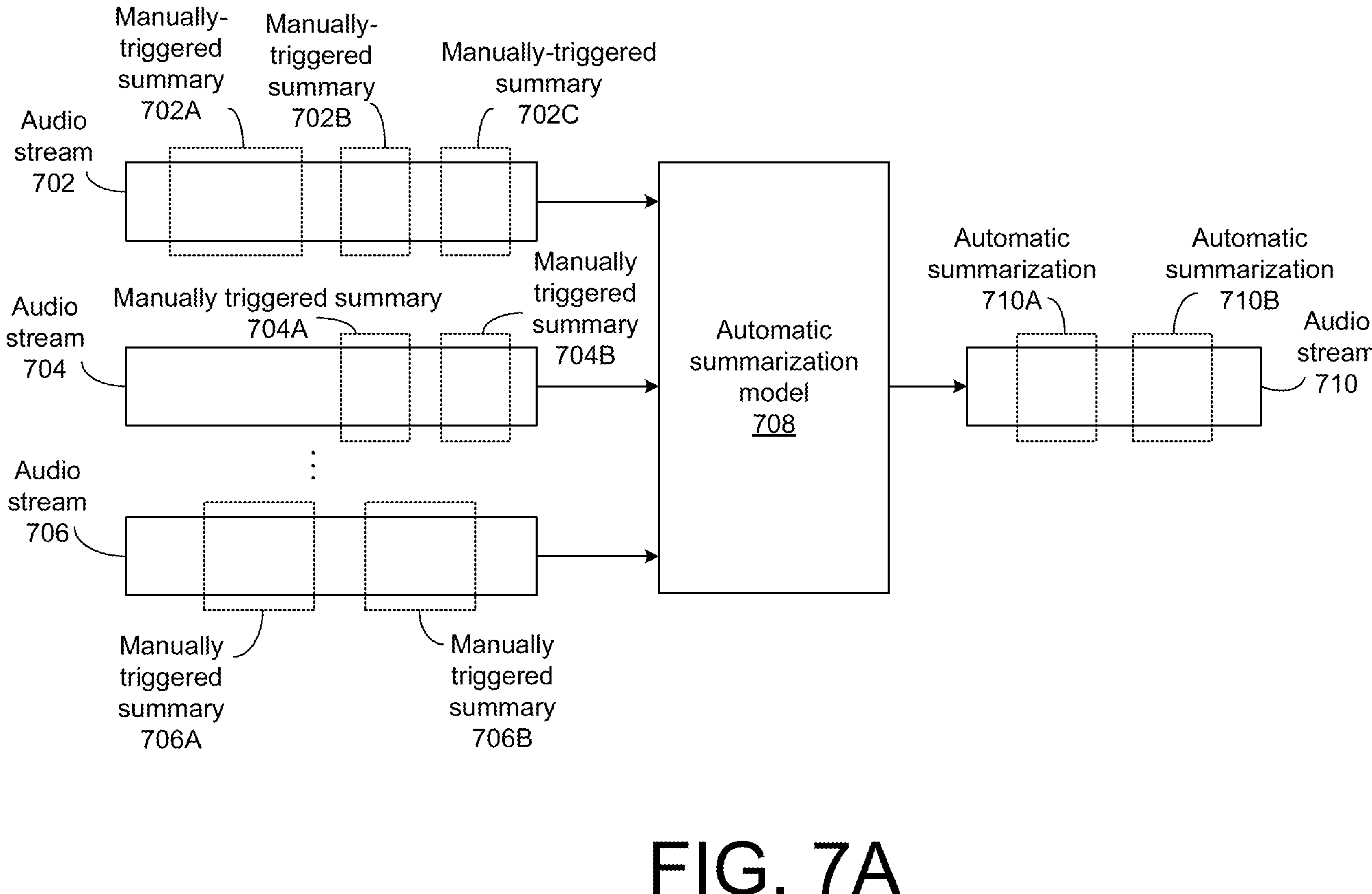
FIG. 7A shows manually triggered summaries of text, an automatic summarization model, and an audio stream with portions summarized by the automatic summarization model.

FIG. 7A shows manually triggered summaries of text, an automatic summarization model 708, and an audio stream 710 with portions summarized by the automatic summarization model 708. A training system can provide audio streams 702, 704, 706 to test users and give the test users the option to manually trigger summaries of text transcribed from the audio streams 704, 704, 706.

The test users can manually trigger the summaries by gesture input, pressing buttons, input into a touchscreen, or audio input, as non-limiting examples. The test users triggering manual summaries of the audio streams 702, 704, 706 can be different test users, the same users, or multiple test users can trigger manual summaries of each of the audio streams 702, 704, 706. In the example shown in FIG. 7A, at least one test user triggered manual summaries 702A, 702B, and 702C of audio stream 702. In the example shown in FIG. 7A, at least one test user triggered manual summaries 704A, 704B of audio stream 704. In the example shown in FIG. 7A, at least one test user triggered manual summaries 706A, 706B of audio stream 706.

The automatic summarization model 708 receives the audio streams 702, 704, 706 and/or transcriptions of the audio streams 702, 704, 706 and associated transcription metadata (the transcription metadata can have similar features to the stored transcription metadata 108 described above) and the manual triggers of the summaries received from the test users. The context of the manual triggers can be stored in the training data 112. Based on the received audio streams 702, 704, 706 and/or transcriptions of the audio streams 702, 704, 706 and associated transcription metadata and the manual triggers, the automatic summarization model 708 generates weights and/or parameters to determine when to perform automatic summarizations independently of user input. Based on the generated weights and/or parameters, the automatic summarization model 708 performs and/or requests automatic summarizations 710A, 710B of portions of a new audio stream 710. The trained automatic summarization model 708 can have similar features to the summarization trigger engine 122.

Figure 7B:
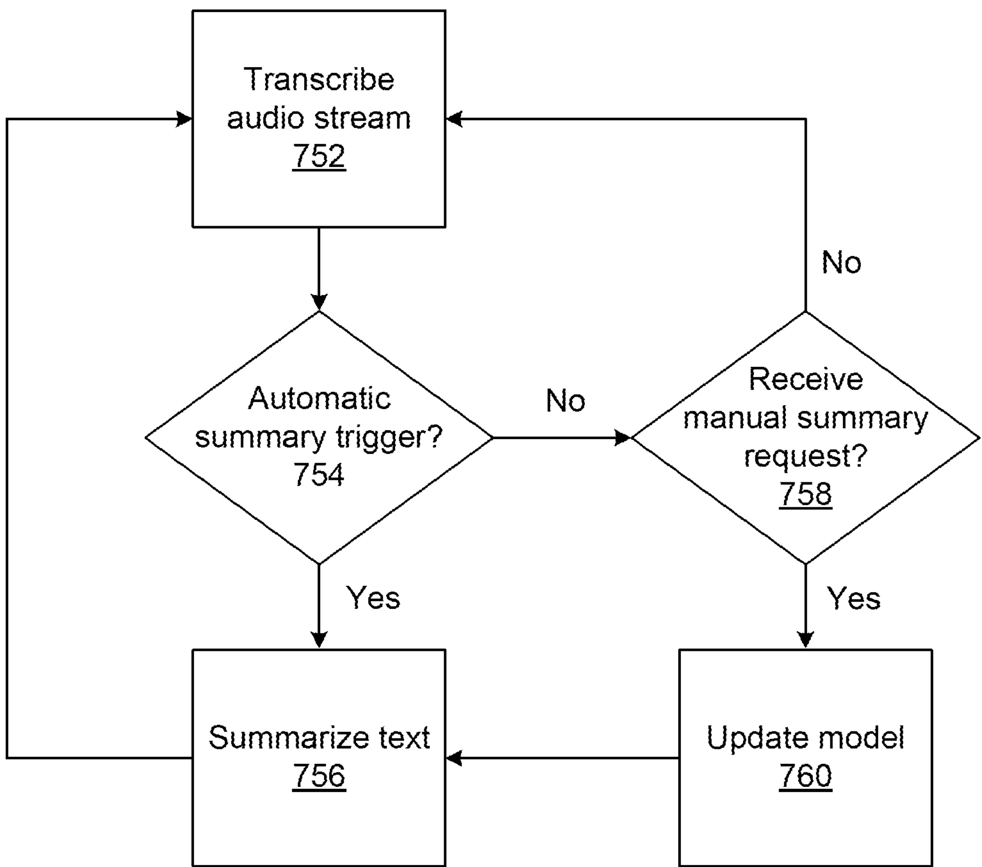
FIG. 7B shows a flowchart with a method for updating the automatic summarization model based on manual summary requests.

FIG. 7B shows a flowchart with a method for updating the automatic summarization model 708 based on manual summary requests. The method can be performed by the automatic summarization model 708 and/or the summary stream manager 102.

In some examples, the method includes transcribing an audio stream (752). The transcribing the audio stream (752) can be performed, for example, by the transcription generator 124.

In some examples, the method includes determining whether an automatic summary is triggered (754). The determination of whether an automatic summary is triggered (754) can be based on the training of the automatic summarization model 708 and features of received speech 104, such as a length of an unsummarized portion of the speech 104 included in the audio stream, time values (such as durations of pauses) associated with a proposed end portion of the speech 104, whether a topic of the speech 104 changes, whether a speaker of the speech 104 changes, or a quality or confidence level of the transcription 126 of the speech 104, as non-limiting examples. If the automatic summarization model 708 and/or summarization trigger engine 122 determines that an automatic summarization should be triggered, then the summarizer 136 summarizes the text (756), and the summary stream manager 102 and/or automatic summarization model 708 continues transcribing the audio stream (752).

If the automatic summarization model 708 and/or summarization trigger engine 122 determines that an automatic summarization should not be triggered, then the automatic summarization model 708 and/or summary stream manager 102 determines whether a manual summary request has been received (758). A manual summary request can be received via captured gesture, button input, touchscreen input, or audio input, as non-limiting examples. If the automatic summarization model 708 and/or summary stream manager 102 determines that a manual summary request has not been received, then no summarization will be performed, and the automatic summarization model 708 and/or summary stream manager 102 will continue transcribing the audio stream (752).

If the automatic summarization model 708 and/or summary stream manager 102 determines that a manual summary request has been received, then the automatic summarization model 708 is updated (760). The automatic summarization model 708 can be updated by changing weights and/or parameters to increase a likelihood of triggering an automatic summarization under circumstances similar to the circumstances under which the manual summary request was received. The context of the manual summary request can be stored in the training data 112. After updating the automatic summarization model 708 (760), the automatic summarization model 708 and/or summary stream manager 102 can summarize the text (756) and continue transcribing the audio stream (752).

Figure 8A:
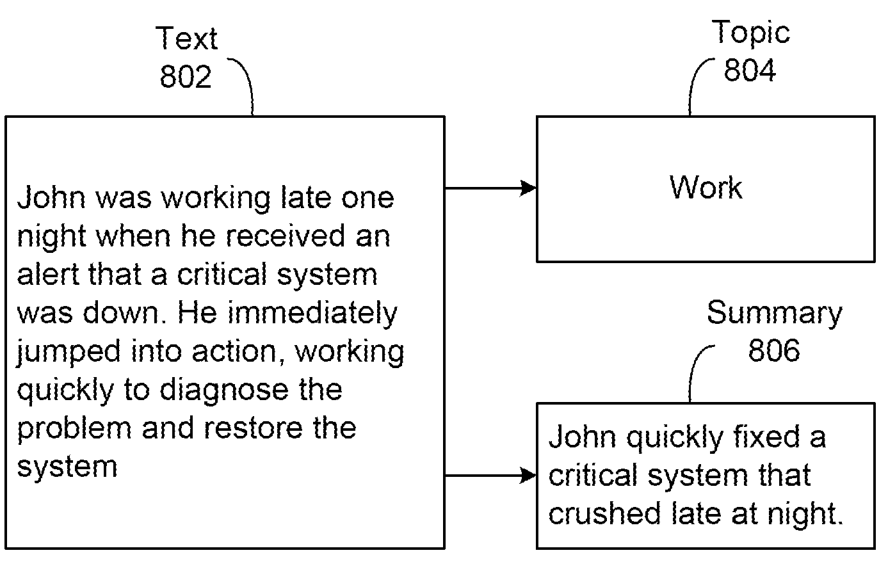
FIG. 8A shows a first example of an end portion of speech at which the system of FIG. 1 determined to summarize text.

FIG. 8A shows a first example of an end portion of speech at which the system of FIG. 1 determined to summarize text. In some examples, the text 802 is considered a text string. In some examples, the text 802 is considered an unsummarized text string. In this example, the speech describer 120 analyzes the text 802, "John was working late one night when he received an alert that a critical system was down. He immediately jumped into action, working quickly to diagnose the problem and restore the system," and determines that a topic 804 of the text 802 is work. Based on the speech describer 120 determining that the topic 804 of the text 802 is work, the summarization trigger engine 122 determines that the end portion (or final word) of the text to summarize should be the second instance of the word, "system," and the summarizer 136 summarizes the text 802 as the summary 806, "John quickly fixed a critical system that crashed late at night."

Figure 8B:
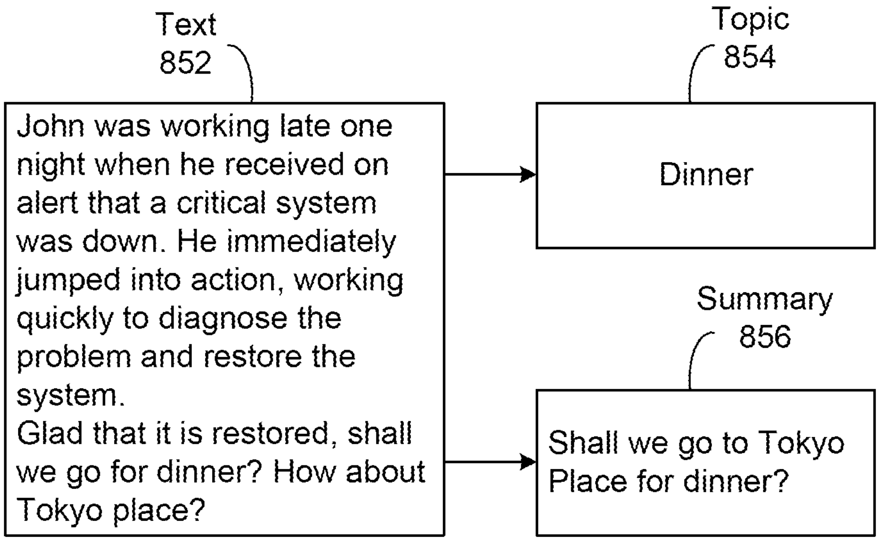
FIG. 8B shows a second example of an end portion of speech at which the system of FIG. 1 determined to summarize text.

FIG. 8B shows a second example of an end portion of speech at which the system of FIG. 1 determined to summarize text. In some examples, the text 852 is considered a text string. In some examples, the text 852 is considered an unsummarized text string. In this example, the speech describer 120 analyzes the text 852, "John was working late one night when he received an alert that a critical system was down. He immediately jumped into action, working quickly to diagnose the problem and restore the system. Glad that it is restored, shall we go for dinner? How about Tokyo Place?," and determines that a topic 854 of the text 852 is dinner. Based on the speech describer 120 determining that the topic 854 of the text 852 is dinner, the summarization trigger engine 122 determines that the end portion (or final word) of the text to summarize should be, "Place," and the summarizer 136 summarizes the text 852 as the summary 856, "Shall we go to Tokyo Place for Dinner?"

Example 1: A method performed by a computing system, the method comprising: generating text from audio data; and determining an end portion of the text to include in a summarization of the text based on: a length of a portion of the audio data from which the text was generated and which ends with a proposed end portion; and a time value associated with the proposed end portion, the proposed end portion including a word from the text.

Example 2: The method of example 1, further comprising summarizing the portion of the audio data from which the text was generated and ends with the end portion.

Example 3: The method of either of examples 1 or 2, further comprising receiving the audio data via a microphone.

Example 4: The method of any of the preceding examples, wherein the length of the audio data from which the text was generated and which ends with the proposed end portion includes a time duration of the portion of the audio data.

Example 5: The method of any of the preceding examples, wherein the length of the audio data from which the text was generated and which ends with the proposed end portion includes a number of words included in the text transcribed from the portion of the audio data.

Example 6: The method of any of examples 1-4, wherein the length of the audio data from which the text was generated and which ends with the proposed end portion is based on the text transcribed from the portion of the audio data.

Example 7: The method of any of the preceding examples, wherein the time value associated with the proposed end portion includes a duration of a pause after the end portion.

Example 8: The method of any of examples 1-6, wherein the time value associated with the proposed end portion includes a duration of time between the proposed end portion and a subsequent portion of the text that immediately follows the proposed end portion.

Example 9: The method of any of the preceding examples, wherein the determination of the end portion is further based on a punctuation mark included in the text, the punctuation mark immediately following the proposed end portion.

Example 10: The method of any of the preceding examples, wherein the determination of the end portion is further based on a determination that the proposed end portion was spoken by a first person, and a subsequent portion that immediately follows the proposed end portion was spoken by a second person, the second person being different than the first person.

Example 11: The method of any of the preceding examples, wherein the determination of the end portion is further based on a determination that the text that is unsummarized and ends with the proposed end portion is related to a first topic and that text that is subsequent to the proposed end portion is related to a second topic, the first topic being different than the second topic.

Example 12: The method of any of the preceding examples, wherein the determination of the end portion is further based on a low confidence level of transcribing speech subsequent to the text that is unsummarized and ends with the proposed end portion.

Example 13: The method of any of the preceding examples, wherein the computing system is a head-mounted device.

Example 14: The method of any of the preceding examples, further comprising presenting the summarized text on a display.

Example 15: A method performed by a computing system, the method comprising: generating text from audio data; and determining whether a proposed end portion of the text is an end portion of the text based on a duration of a pause after the proposed end portion satisfying a pause duration threshold, the pause duration threshold being less for greater lengths of the text that end with the proposed end portion.

Example 16: The method of example 15, wherein the pause duration threshold is less for greater lengths of the text that end with the proposed end portion.

Example 17: The method of either of examples 15 or 16, wherein the text that ends with the proposed end portion is unsummarized.

Example 18: The method of any of examples 15-17, further comprising: determining that the proposed end portion of the text is the end portion; and summarizing the text that ends with the end portion.

Example 19: A non-transitory computer-readable storage medium comprising instructions stored thereon that, when executed by at least one processor, are configured to cause a computing system to perform the method of any of the preceding examples.

Example 20: A computing system comprising: at least one processor; and a non-transitory computer-readable storage medium comprising instructions stored thereon that, when executed by the at least one processor, are configured to cause the computing system to perform the method of any of examples 1-17.

Described systems and techniques enable summaries of spoken content with specific information (and/or specific terms) that complements general terms included in the spoken content. Transcribed speech is summarized with specific terms replacing general terms. In some examples, the specific terms include more words than the general terms. For example, if a speaker refers generally to, "the restaurant we went to last week," the summary can include the specific name, and possibly the address, of the restaurant that the speaker and listener (or user) went to the previous week. The summary with general terms replaced by specific terms can be considered an enhanced summary.

In some examples, the general terms can be replaced with specific terms based on contextual data. In some examples, the contextual input and/or contextual data include textual information associated with the user such as a calendar item and/or an electronic communication. In some examples, the contextual input and/or contextual data include measured information such as a location history, a present location, or a rate of speed or measured motion. In some examples, the contextual input and/or contextual data include processed information such as a captured image, a recognized object, and/or a recognized activity, as non-limiting examples. "Contextual data" may be information associated with a user stored in a database or any other storage entity and may be retrieved from the database or the storage entity by the computing system.

Described techniques may be implemented for virtually any type of spoken input text. For example, automatic speech recognition (ASR), or other transcription techniques, may be used to provide a live transcription of detected speech, which may then be provided or available to a user as a transcription stream. Then, described techniques may be used to simultaneously provide a corresponding live summarization stream, i.e., to provide the summarization stream in parallel with the transcription stream. The presentation summarization stream can make understanding the content of the speech easier for the user than a transcription that includes each word that was spoken.

For example, a user wearing smartglasses or a smartwatch, or using a smartphone, may be provided with either or both of a transcription stream and a summarization stream while listening to a speaker. In other examples, a user watching a video or participating in a video conference may be provided with either/both a transcription stream and a summarization stream.

Described techniques may be helpful, for example, when a user is deaf or hard of hearing, as the user may be provided with the summary stream visually on a display. Similarly, when the user is attempting to converse with a speaker in a foreign language, the user may be provided with the summary stream in the user's native language.

Described techniques thus overcome various shortcomings and deficiencies of existing summarization techniques, while also enabling new implementations and use cases. For example, existing summarization techniques may reduce input text excessively, may not reduce input text enough, may include irrelevant text, or may include inaccurate information. In scenarios referenced above, in which a transcription stream and a summarization stream are desired to be provided in parallel, existing summarization techniques (in addition to the shortcomings just mentioned) may be unable to generate a desirable summary. For example, a summary may refer to a person, place, or thing generally, and the user may not remember the specific person, place, or thing. A specific reference to the person, place, or thing may have been previously included in spoken speech, for example, but not included in a previous summary. Or a speaker may not realize that the listener and/or user may not remember the specific person, place, or thing to which the speaker is referring in general terms.

In contrast, described techniques solve the above problems, and other problems, by, e.g., analyzing spoken input and providing additional or more specific information in the summary than was included in the spoken input. Consequently, described techniques are well-suited to generate dynamic, real-time summaries, while a speaker is speaking, and in conjunction with a live transcription that is also produced and available to a user. As a result, the user may be provided with a fluid interaction with the speaker, while described techniques facilitate an understanding of the interaction by the user. Summarizing appropriate portions of the text and replacing general terms with specific terms facilitates the user understanding the spoken input.

Figure 9:
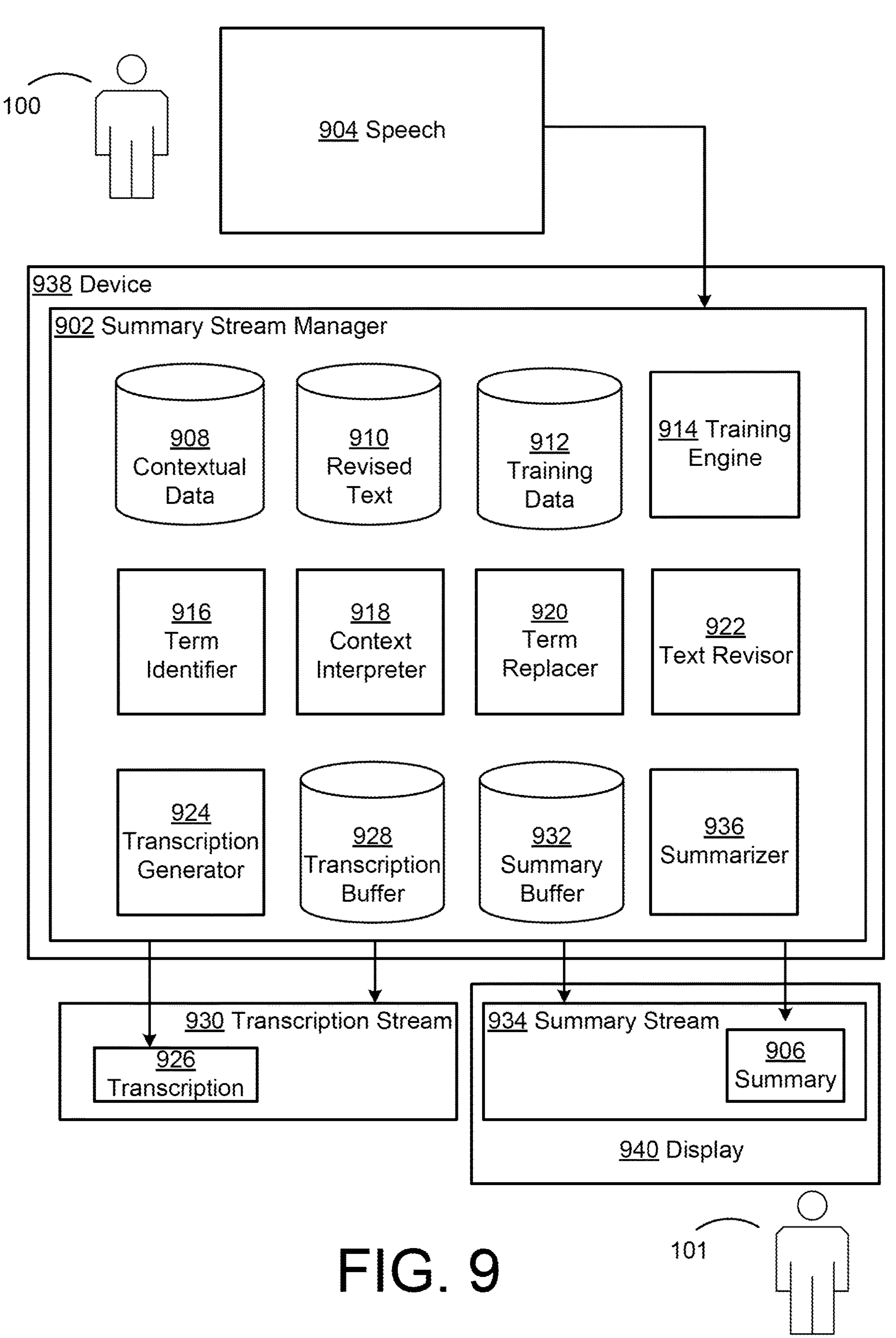
FIG. 9 is a block diagram of a system for determining when to summarize text.

FIG. 9 is a block diagram of a system for determining when to perform a summary. The system of FIG. 9 can have similar features to the system of FIG. 1. In the example of FIG. 9, a summary stream manager 902 processes speech 904 (audio data, also referred to as spoken input) of a speaker 100 to generate a summary 906. The summary 906 can be considered summarized text. The speech 904 can be represented and/or stored as audio data. In some examples, the summary 906 is provided to a user 101 as part of a live summary stream 934 (a data stream). The speech 904 (audio data) can include virtually any spoken words or other spoken input. For example, the speech 904 may be a lecture, a speech, talk, a dialogue, an interview, a conversation, or any other spoken-word interaction of two or more participants. The spoken-word interaction can include both (or more than two) participants talking at various times, or only one participant talking while the other participant(s) listens. Such interactions may be largely one-sided (a monologue), such as in the case of a lecture, or may be an equal give-and-take between the speaker 100 and the user 101.

In some examples, a conversation may be conducted between the speaker 100 and the user 101, and the conversation may be facilitated by the stream manager 902. In some examples, the speaker 100 represents a lecturer, while the user 101 represents a lecture attendee, so that the summary stream manager 902 facilitates utility of the lecture to the user 101. The speaker 100 and the user 101 may be co-located and conducting an in-person conversation, or may be remote from one another and communicating via web conference.

In some examples, the speaker 100 may record the speech 904 at a first time, and the user 101 may view (and receive the summary 906 of) the recorded audio and/or video at a later time. In this sense, the term 'live conversation' should be understood to be primarily from the perspective of the user 101. In some examples, the user 101 may listen live to a video of the speaker 100 that was previously recorded, and be provided with the type of live, dynamically-adjusted summary stream 934 described herein.

In some examples, FIG. 9 illustrates an ability of the summary stream manager 902 to provide the summary 906 in a stand-alone or static manner, in response to a discrete instance of the speech 904 (e.g., summarizing audio of a single recorded video). At the same time, FIG. 9 also illustrates an ability of the summary stream manager 902 to receive speech of the speaker 100 over a first time interval and output the summary 906 to the user 101, and then to repeat such speech-to-summary operations over a second and subsequent time interval(s) to summarize appropriate portions of the speech 904, as described in detail herein with reference to the summary stream 934. In other words, as shown and described, the summary 906 may be understood to represent one or more discrete summaries of corresponding speech of the speaker 100 within a time interval of a larger time period or time window of a conversation.

As also described in detail, below, the summary stream manager 902 may be implemented in conjunction with any suitable device 938, such as a head-mounted device, a handheld computing device, smartglasses, earbuds, or a smartwatch. For example, the summary stream manager 902 may be implemented in conjunction with one or more such devices in which a microphone or other input device is used to receive the speech 904, and an audio output, visual display (e.g., a display 940 in FIG. 9), and/or other output device(s) is used to render or provide the summary 906 and the summary stream 934. The device 938 described herein is an example of a computing system, which can be a local computing system. The methods, functions, and/or techniques described herein can be performed by a local computing system, a remote computing system (such as a server) in communication with the device 938, and/or distributed between a local computing system and a remote computing system.

The summary stream manager 902 is illustrated in the simplified example of FIG. 9 as a single component that includes multiple sub-components. As also described below, however, the summary stream manager 902 may be implemented using multiple devices in communication with one another, such as a local computing device (e.g. head-mounted device, smartphone, or smartglasses in communication with a remote server).

In some examples, summary stream manager 902 includes and/or stores contextual data 908. In some examples, the contextual data 908 are generated by a context interpreter 918, described below.

In some examples, the contextual input and/or contextual data 908 can include textual information associated with the user such as a calendar item and/or an electronic communication. In some examples, a calendar item associated with the user (such as a calendar item stored on the user's electronic calendar) includes text that includes a description of an event, a date or data range, a time or time range, a location, and/or other participants of the event. In some examples, electronic communication includes emails, text messages, chats, and/or transcriptions of telephone calls or voicemails. In some examples, the electronic communication includes a time of the communication (such as when the electronic communication was sent), a sender of the electronic communication, a recipient of the electronic communication, and/or the textual content of the electronic communication.

In some examples, the contextual input and/or contextual data 908 can include measured information such as a location history, a present location, or a rate of speed or measured motion. In some examples, the measured information includes location information associated with the user 101. The measured information can be measured and/or determined by devices and/or components included in the device 938, such as a Global Positioning System (GPS) unit, a Bluetooth positioning unit, an Institute for Electrical and Electronics Engineers (IEEE) 802.11 ("Wireless Fidelity") positioning unit, an Ultra WideBand (UWB) Positioning unit, an ultrasound localization unit, and/or a mobile positioning unit.

In some examples, the contextual input and/or contextual data can include processed information such as a captured image, a recognized object, and/or a recognized activity, as non-limiting examples. In some examples, the device 938 includes a camera that captures videos and/or photographs. The captured videos and/or photographs can be stored in association with dates, times, and/or locations that the videos and/or photographs were captured. In some examples, the context interpreter 918 recognizes objects and/or activities (such as a type of animal or shape and/or a type of exercise). In some examples, the context interpreter stores the recognized object and/or activity in the contextual data 908. In some examples, the context interpreter stores the recognized object and/or activity in association with the date, time, and/or location in the contextual data 908.

In some examples, the contextual data 908 includes characteristics of the speech 904 and/or previous spoken words (as reflected by the audio data representing the speech). For example, the contextual data 908 can include a rate, a tonality, a volume, a pitch, an emphasis, or any other characteristic of the speech 904 and/or previous spoken words. The contextual data 908 can include the speaker 100 (and/or previous speaker) individually or as a class/type of speaker. The contextual data 908 can also identify a language being spoken by the speaker 100 and/or previous speaker.

In some examples, the summary stream manager 902 stores revised text 910. In some examples, the revised text 910 is a revised version of the transcription 926 and/or portions of the transcription 926. The revised text 910 can also be considered enhanced text. The revised text 910 can include the transcription 926 and/or a portion of the transcription 926 with general terms included in the transcription 926 replaced with more specific terms. In some examples, the revised text 910 is a revised summary that is a revised version of the summary 906. The revised text 910 can include the summary 906 with general terms included in the summary 906 replaced with more specific terms.

In some examples, the specific term included in the revised text 910 includes a hyperlink. The hyperlink can include an address and/or pointer to an Internet host and/or webpage that presents information about the person, place, or thing referred to by the general term and/or specific term. For example, if the general term and/or specific term refers to a restaurant, the hyperlink included in the specific term can include an address and/or pointer to an Internet host and/or webpage that presents information about the particular restaurant referred to in the general term and/or specific term.

In some examples, the summary stream manager 902 includes training data 912. Training data 912 generally represents any training data that may be processed by a training engine 914 to train one or more machine learning (ML) models, as described herein. The training data 912 may represent one or more available repositories of labeled training data used to train such ML models, and/or may represent training data compiled by a designer of the summary stream manager 902.

In some examples, the training data 912 include contexts in which a user, such as the user 101, manually or otherwise requests clarification of general terms within a summary of speech 904 and/or transcription 926. In some examples, the training data 912 include contexts in which a user, such as the user 101, manually or otherwise searched for information that would clarify general terms within a summary of speech 904 and/or transcription 926. The training data 912 can be based on previous (such as test) users who train the model, and/or can be based on a current user to improve the model for the current user. The training data 912 can include requests for clarification (or specific terms) of general terms when the summary stream manager 902 did not replace general terms with specific terms automatically and/or independently of user request. The training data 912 can include a type and/or degree of the error, which may be used by a training engine 914 in a subsequent training iteration to adjust weights or other parameters to determine when to replace general terms with specific terms. Over multiple iterations, the weights or other parameters may thus be adjusted by the training engine 914 to cause the summary stream manager 902, once deployed, to replace general terms with specific terms within a transcription 926 and/or summary 906 with an acceptable level of accuracy for a particular user.

In some examples, the summary stream manager 902 includes a term identifier 916. In some examples, the term identifier 916 identifies terms within the transcription 926 and/or summary 906 that are candidates for replacement. The terms can include references to persons, places, or things such as, "that guy," "the restaurant," or, "the social." In some examples, the term identifier 916 identifies general terms within the transcription 926 and/or summary 906. In some examples, general terms within the transcription 926 and/or summary 906 are terms and/or sequences of words that the summary stream manager 902 can replace with specific terms by taking contextual data 908 into account.

In some examples, general terms include at least one word from a list of words stored by the summary stream manager 902. In some examples, the list of words includes words that refer to persons, places, or things generally and which could be replaced by proper nouns or specific dates. In some examples, the list of words includes pronouns. In some examples, the list of words includes terms that stand in the place of nouns, dates, times, and/or events that would be understood if additional context information, such as contextual information stored in the contextual data 908, were taken into account.

In some examples, the list of words includes words that have been found to have been included in sentences to which another person responds with a sentence that includes a request for clarification. In some examples, the list of words includes words that have been found to have been included in sentences that prompt responses that include the word, "who," where," "what," or, "when." In some examples, the general terms include terms that have been found to have been included in sentences to which another person responds with a sentence that includes a request for clarification. In some examples, the general terms include general terms that have been found to have been included in sentences that prompt responses that include the word, "who," where," "what," or, "when."

In some examples, the summary stream manager 902 includes a context interpreter 918. In some examples, the context interpreter 918 interprets and/or determines contextual information associated with the user 101. In some examples, the context interpreter 918 generates and stores the contextual data 908.

In some examples, the context interpreter 918 stores textual information, such as calendar items and/or electronic communication, in the contextual data 908 in association with the user 101. In some examples, the context interpreter 918 stores the textual information in association with times, locations, and/or other users.

In some examples, the context interpreter 918 stores measured information such as a location history, a present location, or a rate of speed or measured motion in the contextual data 908 in association with the user 101. In some examples, the measured information includes location information associated with the user 101.

In some examples, the context interpreter 918 processes and/or stores processed information such as a captured image, a recognized object, and/or a recognized activity, as non-limiting examples. In some examples, the device 938 includes a camera that captures videos and/or photographs. The context interpreter 918 can store captured videos and/or photographs in association with dates, times, and/or locations that the videos and/or photographs were captured. In some examples, the context interpreter 918 recognizes objects and/or activities (such as a type of animal or shape and/or a type of exercise). In some examples, the context interpreter 918 stores the recognized object and/or activity in the contextual data 908. In some examples, the context interpreter 918 stores the recognized object and/or activity in association with the date, time, and/or location in the contextual data 908.

In some examples, the context interpreter 918 determines characteristics of the speech 904 and/or previous spoken words. For example, the context interpreter 918 can determine a rate, a tonality, a volume, a pitch, an emphasis, or any other characteristic of the speech 904 and/or previous spoken words. The context interpreter 918 can determine that a term or word is a candidate for replacement based on characteristics of the speech when the term or word is spoken. In some examples, if the context interpreter 918 determines that a term or word has been emphasized in the speech 904, the context interpreter 918 can determine that the term or word that was emphasized is a general term that should be replaced with a specific term.

In some examples, the context interpreter 918 determines that the speech 904 includes a general term that should be replaced with a specific term based on a voice or body motion of the user 101 suggesting that the user 101 is interested in further information about what has been spoken. The voice or body motion of the user 101 indicating a lack of understanding or context can indicate to the context interpreter 918 that the user 101 desires more information than was included in the speech 904 and/or transcription 926. The context interpreter 918 can respond to the voice or body motion indicating the lack of understanding or context by finding a term in the transcription 926 that can be treated as a general term and be replaced by a specific term.

In some examples, the context interpreter 918 searches the contextual data 908 to find contextual data to generate a specific term to replace a general term. In some examples, the contextual data is data that is relevant to the general term. In some examples, the contextual data is data that satisfies a relevance threshold with respect to the general term. The context interpreter 918 may, for example, perform a search query of the contextual data 908 with the general term as a search query, and if data stored in the contextual data 908 satisfies a relevance threshold, the context interpreter 918 will generate a specific term based on the contextual data that satisfies the relevance threshold. In some examples, the contextual data is data that describes and/or provides additional details regarding the general term. The contextual data could, for example, provide an address or other description of a place referred to by the general term. In some examples, the contextual data is data that indicates a specific example of the general term. For example, the general term could refer to a type of place (such as a "restaurant") and the contextual data could identify a particular restaurant.

In some examples, the context interpreter 918 determines specific terms to replace the general terms. In some examples, the context interpreter 918 determines specific terms to replace the general terms based on the context of the general terms. In some examples, the context of the general terms includes the transcription 926 and/or summary 906 that includes a general term. The transcription 926 and/or summary 906 can include words and/or terms other than the general term to be replaced with the specific term. The words and/or terms in the transcription 926 and/or summary 906 other than the general term can be considered part of the context of the general term. In some examples, the context interpreter 918 searches the contextual data 908 for a specific term (or contextual information based on which to generate a specific term) to replace the general term based on the general term and the words and/or terms in the transcription 926 and/or summary 906 other than the general term.

In some examples, the context interpreter 918 searches the contextual data 908 for information to supplement and/or replace the general term. In some examples, the context interpreter 918 finds a specific term and/or specific information that matches a classification of the general term. In some examples, the context interpreter 918 finds a specific term and/or specific information that matches the classification of the general term and is described by and/or referred to by words and/or terms in the transcription 926 and/or summary 906 other than the general term. For example, if the transcription 926 and/or summary 906 is, "Let's go to the restaurant we went to last weekend," the general term is, "the restaurant," and the words that provide contextual information other than the general term are, "we went to last weekend." In some examples, the context interpreter 918 searches the contextual data 908 for a restaurant that the user 101 and/or the speaker 100 went to and/or were located in the previous weekend. The context interpreter 918 can find the restaurant that the user 101 and/or the speaker 100 went to and/or were located in the previous weekend by searching through previous electronic communications identifying a restaurant the previous weekend, a calendar item identifying a restaurant the previous weekend, and/or location history of the user 101 indicating that the user 101 was at a restaurant the previous weekend. In some examples, the context interpreter 918 finds the specific term, such as the name of the restaurant and/or address of the restaurant.

In some examples, the context interpreter 918 can determine who the speaker is of a portion of and/or sequences of words included in the transcription 926 based on, for example, voice tones, intonations, accents, and/or pauses. The context interpreter 918 can determine the specific term based in part on the determined speaker. For example, if the speech 904 includes the statement, "Let's go to my house," the general term could be, "my house," and the specific term could be either an address stored in the user's 101 contacts or the contextual data 908, or, "[name of speaker]'s house."

In some examples, the summary stream manager 902 includes a term replacer 920. The term replacer 920 determines that the general term will be replaced with the specific term found and/or determined by the context interpreter 918. In some examples, the term replacer 920 modifies the grammar, conjugation, or other phrasing of the specific term to match the phrasing of the general term and enable the general term to be replaced with the specific term while maintaining correct grammar in the resulting sentence and/or phrase.

In some examples, the summary stream manager 902 includes a text revisor 922. The text revisor 922 revises the transcription 926 and/or the summary 906 by replacing the general term with the specific term. The text revisor 922 can generate a revised text and/or revised summary by replacing the general term with the specific term.

In some examples, the summary stream manager 902 includes a transcription generator 924. The transcription generator 924 converts the spoken words of the speech 904 to transcribed text, shown in FIG. 9 as a transcription 926. The transcribed text can include one or multiple text strings. For example, the transcription generator 924 may include an automatic speech recognition (ASR) engine or a speech-to-text (STT) engine.

The transcription generator 924 may include many different approaches to generating text, including additional processing of the generated text. For example, the transcription generator 924 may provide timestamps for generated text (which can be included in the contextual data 908), a confidence level in generated text, and inferred punctuation (which can be included in the contextual data 908) of the generated text. For example, the transcription generator 924 may also utilize natural language understanding (NLU)

and/or natural language processing (NLP) models, or related techniques, to identify semantic information (e.g., sentences or phrases), identify a topic, or otherwise provide metadata for the generated text.

The transcription generator 924 may provide various other types of information in conjunction with transcribed text, perhaps utilizing related hardware/software. For example, the transcription generator 924 may analyze an input audio stream to distinguish between different speakers, or to characterize a duration, pitch, speed, or volume of input audio, or other audio characteristics, which can be stored in the contextual data 908.

Thus, the transcription 926 may represent an entirety of transcribed audio, such as a transcribed lecture, and may include, or provide access to, one or more of the types of data and/or metadata just referenced. In some examples, the transcription generator 924 may receive an audio file of a recorded lecture and output the transcription 926.

In some examples, the transcription generator 924 may utilize a transcription buffer 928 to output a transcription stream 930. That is, for example, the transcription generator 924 may process a live conversation, discussion, or other speech, in real time and while the speech is happening. The transcription 926 thus represents a transcription of a segment or instance of transcribed text within a time interval that occurs within a larger time period or time window of a conversation. For example, the summary 906 may represent a summarization of the transcription 926 (and/or portions of the transcription 926), where the transcription 926 represents a transcript of a portion of the speech 904, e.g., a first 10 seconds of the speech 904.

For example, while the speaker 100 is speaking, the transcription generator 924 may output transcribed text to be stored in the transcription buffer 928. The transcribed text may be designated as intermediate or final text within the transcription buffer 928, before being available as the transcription 926 and/or transcription stream 930. For example, the transcription generator 924 may detect the end of a sentence, a switch in speakers, a pause of pre-defined length, or other detected audio characteristic to designate a final transcription to be included in the transcription stream 930. In other examples, the transcription generator 924 may wait until the end of a defined or detected time interval to designate a final transcription of audio.

The transcription stream 930 may thus be processed by a summarizer 936 to populate a summary buffer 932 and otherwise output the summary 906 and/or summary stream 934. The summarizer 936 may represent any trained model or algorithm designed to perform summarization. Summarization, as performed by the summarizer 936, generally refers to techniques for reducing a volume of text to obtain a reduced text volume that retains most information of the volume of text within a summary. In some examples, the summary generated by the summarizer 936 is shorter than the text received by the summarizer 936.

For example, the summarizer 936 may be implemented as a sequence-to-sequence generative large learning model (LLM). In some examples, the term identifier 916, the context interpreter 918, the term replacer 920, the text revisor 922, and the summarizer 936 may be trained independently, or may be trained together in groups of two or more.

In further examples, the summary stream manager 902 controls various display characteristics with which the transcription stream 930 and/or the summary stream 934 is presented to the user 101. In some examples, the stream manager 902 may provide the user 101 with an option to view either or both (e.g., toggle between) the transcription stream 930 and the summary stream 934.

The stream manager 902 may also be configured to display various indicators related to the transcription stream 930 and the summary stream 934. For example, the stream manager 902 may display a summarization indicator that informs the user 101 that a current portion of the summary stream 934 is being generated, while the summarizer 936 is processing a corresponding portion of the transcription stream 930.

In some examples, the stream manager 902 controls a size, spacing, font, format, and/or speed (e.g., scrolling speed) of the transcription stream 930 and the summary stream 934. Additionally, the stream manager 902 may provide additional processing of the summary stream 934. For example, the stream manager 902 may identify and extract actionable content within the summary stream 934, such as calendar items, emails, or phone calls. In some implementations, the stream manager 902 may be configured to facilitate or enact corresponding actions, such as generating a calendar item, or sending an email or text message, based on content of the summary stream 934.

Although the transcription buffer 928 and the summary buffer 932 are described herein as memories used to provide short-term storage of, respectively, the transcription stream 930 and the summary stream 934, it will be appreciated that the same or other suitable memory may be used for longer-term storage of some or all of the transcription stream 930 and the summary stream 934. For example, the user 101 may wish to capture a summary of a lecture that the user 101 attends for later review. In these or similar situations, multiple instances or versions of the summary 906 may be provided, and the user 101 may be provided with an ability to select a most-desired summary for long term storage.

In FIG. 9, the transcription stream 930 is shown separately from the summary stream 934, and from the display 940. However, as noted above, the transcription stream 930 may be displayed on the display concurrently with, or instead of, the summary stream 934. Moreover, the transcription stream 930 and the summary stream 934 may be implemented as a single (e.g., interwoven) stream of captions. That is, for example, the transcription stream 930 may be displayed for a period of time, and then a summary request may be received via an input device, and a corresponding summary (e.g., the summary 906) may be generated and displayed. Put another way, an output stream of the display 940 may alternate between displaying the transcription stream 930 and the summary stream 934.

In the simplified example of the stream manager 902, the various sub-components 108-136 are each illustrated in the singular, but should be understood to represent at least one instance of each sub-component. For example, two or more training engines, represented by the training engine 914, may be used to implement the various types of training used to train and deploy the speech term identifier 916, context interpreter 918, term replacer 920, text revisor 922, and/or the summarizer 936.

In FIG. 9, the summary stream manager 902 is illustrated as being implemented and executed using a device 938. For example, the device 938 may represent a handheld computing device, such as a smartphone, or a wearable computing device, such as smartglasses, smart earbuds, or a smartwatch. The device 938 can be considered a computing system.

The device 938 may also represent cloud or network resources in communication with a local device, such as one or more of the devices just referenced. For example, the various types of training data and the training engine 914 may be implemented remotely from the user 101 operating a local device, while a remainder of the illustrated components of the summarization manager are implemented at one or more of the local devices.

The summary 906 and/or the summary stream 934 are illustrated as being output to a display 940. For example, the display 940 may be a display of the device 938, or may represent a display of a separate device(s) that is in communication with the device 938. For example, the device 938 may represent a smartphone, and the display 940 may be a display of the smartphone itself, or of smartglasses or a smartwatch worn by the user 101 and in wireless communication with the device 938.

In FIG. 9, the transcription stream 930 is shown separately from the summary stream 934, and from the display 940. However, as noted above, the transcription stream 930 may be displayed on the display concurrently with, or instead of, the summary stream 934. Moreover, the transcription stream 930 and the summary stream 934 may be implemented as a single (e.g., interwoven) stream of captions. That is, for example, the transcription stream 930 may be displayed for a period of time, and then a summary request may be received via an input device, and a corresponding summary (e.g., the summary 906) may be generated and displayed. Put another way, an output stream of the display 940 may alternate between displaying the transcription stream 930 and the summary stream 934.

More detailed examples of devices, displays, and network architectures are provided below, e.g., with respect to FIGS. 9, 10A, and 10B. In addition, the summary 906 and the summary stream 934 (as well as the transcription 926 and the transcription stream 930) may be output via audio, e.g., using the types of smart earbuds referenced above.

Figures 10A, 10B, 10C:
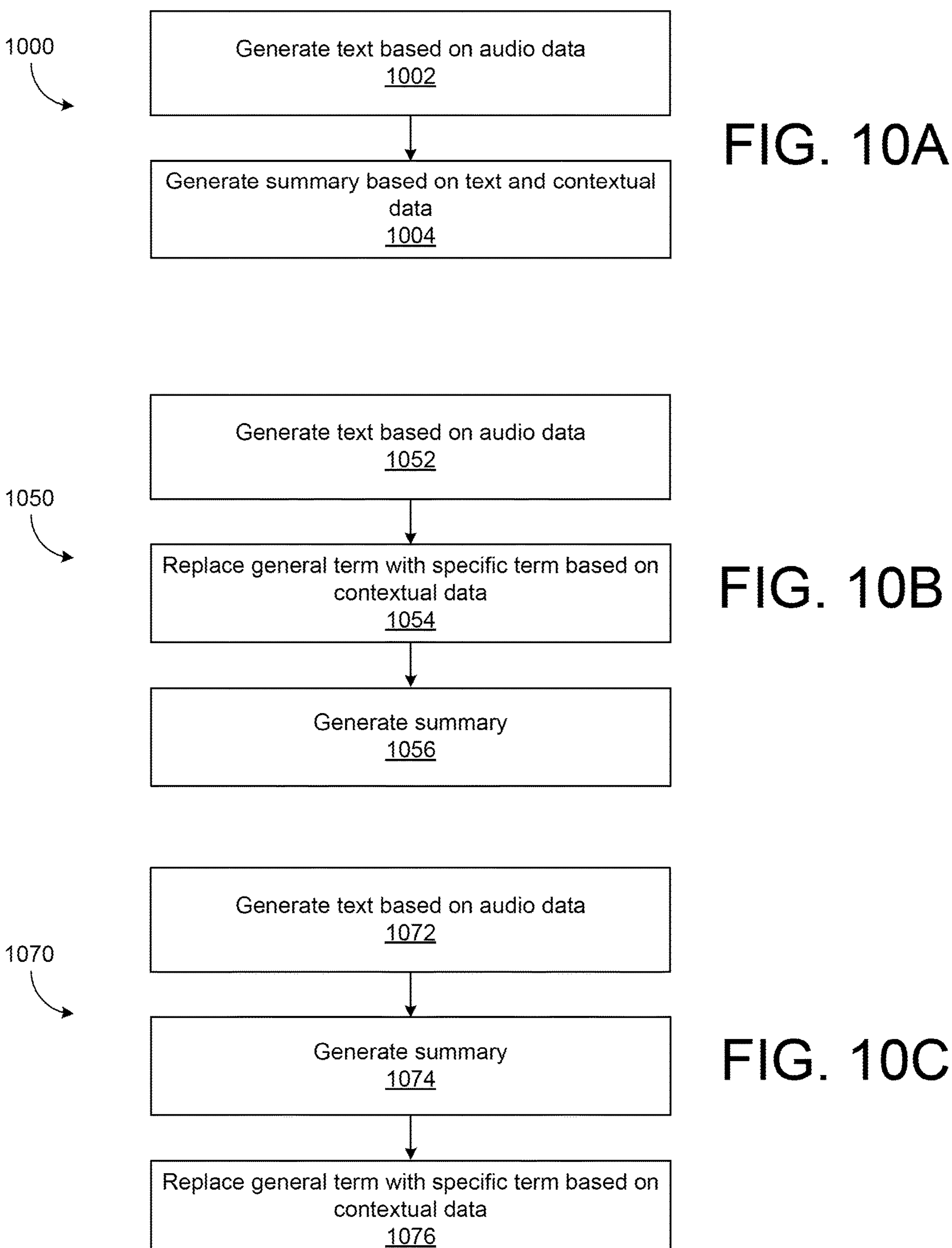
FIG. 10A is a flowchart illustrating example operations of the system of FIG. 9.
FIG. 10B is another flowchart illustrating example operations of the system of FIG. 9.
FIG. 10C is another flowchart illustrating example operations of the system of FIG. 9.

FIG. 10A is a flowchart illustrating example operations of the system of FIG. 9. The method 1000 shown in FIG. 10A includes generating text based on audio data (1002), e.g., speech data. In some examples, the transcription generator 924 generates the text based on the audio data (1002). The text can be included in the transcription 926, and the audio data can be detected based on the speech 904. The text can include a general term. In some examples, the general term includes a sequence of one or more words included in the text that refer to a non-specific person, place, or thing, but without further details and/or contextual information, a person would be unable to determine which specific person, place, or thing was being referred to. In some examples, the general term refers to a sequence of one or more words that machine learning models have found prompt a question in response. In some examples, the general term is a term for which a more specific germ, and/or additional details, are available in the contextual data 908.

In some examples, the method 1000 includes generating a summary based on the text and contextual data (1004). In some examples, the summary stream manager 902 generates the summary based on the text and contextual data (1004) by the summarizer 936 summarizing the text and the term replacer 920 replacing the general term with a specific term. The summary generated based on the text and contextual data can be considered an enhanced summary. In some examples, the text revisor 922 revises the text, either before or after the summarizer 936 performs the summary, to ensure grammatical correctness and/or readability. The method 1050 shown in FIG. 10B and the method 1070 shown in FIG. 10C are example implementations of the method 1000 shown in FIG. 10A.

In some examples, the summary is shorter than the text. In some examples, summary conveys the same concept(s) as the text in fewer words than the text. In some examples, the specific term includes more words than the general term. In some examples, the specific term has a narrower meaning than the general term. The specific term can be a specific example of the general term, such as the name of a specific restaurant when the general term referred to a restaurant. In some examples, while the summary 906 reduces the number of words that convey the concept of the speech 904, replacing the general term with the specific term increases the number of words included in the summary 906 by providing further specific details about what was expressed in the general term.

In some examples, the summary includes a hyperlink. The hyperlink can include an address and/or pointer to an Internet host and/or webpage that presents information about the person, place, or thing referred to by the general term and/or specific term. For example, if text generated at (1002) refers to a restaurant, the hyperlink included in the summary generated at (1004) can include an address and/or pointer to an Internet host and/or webpage that presents information about the particular restaurant referred to in the text and/or summary. The device 938 can respond to the user 101 selecting the hyperlink (such as by tapping or clicking on the hyperlink) by requesting a file identifies by the address and/or pointer from the Internet host.

In some examples, the contextual data is associated with the user 101. The contextual data can include any data included in the contextual data 908. In some examples, the contextual data includes a calendar item associated with the user 101. In some examples, the contextual data includes an electronic communication (such as an email or text message) associated with the user 101. In some examples, the contextual data includes a location history associated with the user 101. In some examples, the contextual data includes a present location of the device 938. In some examples, the contextual data includes an image (such as a photograph or image included in a video) captured by the device 938. In some examples, the contextual data includes an object recognized by the device 938, such as an object recognized by the context interpreter 918. In some examples, the contextual data includes motion measured by the device 938. In some examples, the contextual data includes an activity recognized by the device 938 (such as activity recognized by the context interpreter 918).

FIG. 10B is another flowchart illustrating example operations of the system of FIG. 9. The method 1050 shown in FIG. 10B includes generating text based on audio data (1052). The generation of text based on audio data (1052) can be similar to the generation of text based on audio data (1002) described above with respect to FIG. 10A. In some examples, the text includes a general term.

The method 1050 includes replacing a general term with a specific term based on the contextual data (1054). The general term is replaced within the specific term within the text. The text resulting from the replacement of the general term with the specific term can be considered an enhanced text. In some examples, the text within which the general term is replaced with the specific term is within the transcription 926 generated by the transcription generator 924. In some examples, the term replacer 920 replaces the general term with the specific term. In some examples, the text revisor 922 revises the new text, after the replacement of the general term with the specific term, to ensure that the text is grammatically correct and/or readable. The replacement of the general term with the specific term results in revised text and/or enhanced text.

The method 1050 includes generating a summary (1056). The summary is generated based on the revised text that resulted from replacing the general term with the specific term. In some examples, the summarizer 936 generates the summary based on the revised text.

FIG. 10C is another flowchart illustrating example operations of the system of FIG. 9. The method 1070 shown in FIG. 10C includes generating text based on audio data (1072). In some examples, the text includes a general term.

The method 1070 includes generating a summary (1074). The summary is generated based on the generated text. In some examples, the summarizer 936 generates the summary. The summary includes a general term. In some examples the general term is the same general term that was included in the text.

The method 1070 includes replacing a general term with a specific term based on contextual data (1076). The general term is replaced with the specific term within the summary generated at (1074). The summary resulting from the replacement of the general term with the specific term can be considered an enhanced summary. In some examples, the term identifier 916 identifies the general term within the summary. In some examples, the context interpreter 918 determines a specific term corresponding to the general term based on the contextual data 908. In some examples, the term replacer 920 replaces the general term with the specific term within the summary. In some examples, the text revisor 922 revises the summary after the general term is replaced with the specific term within the summary. In some examples, the text revisor 922 revises the summary to ensure grammatical correctness and/or readability.

Figure 11:
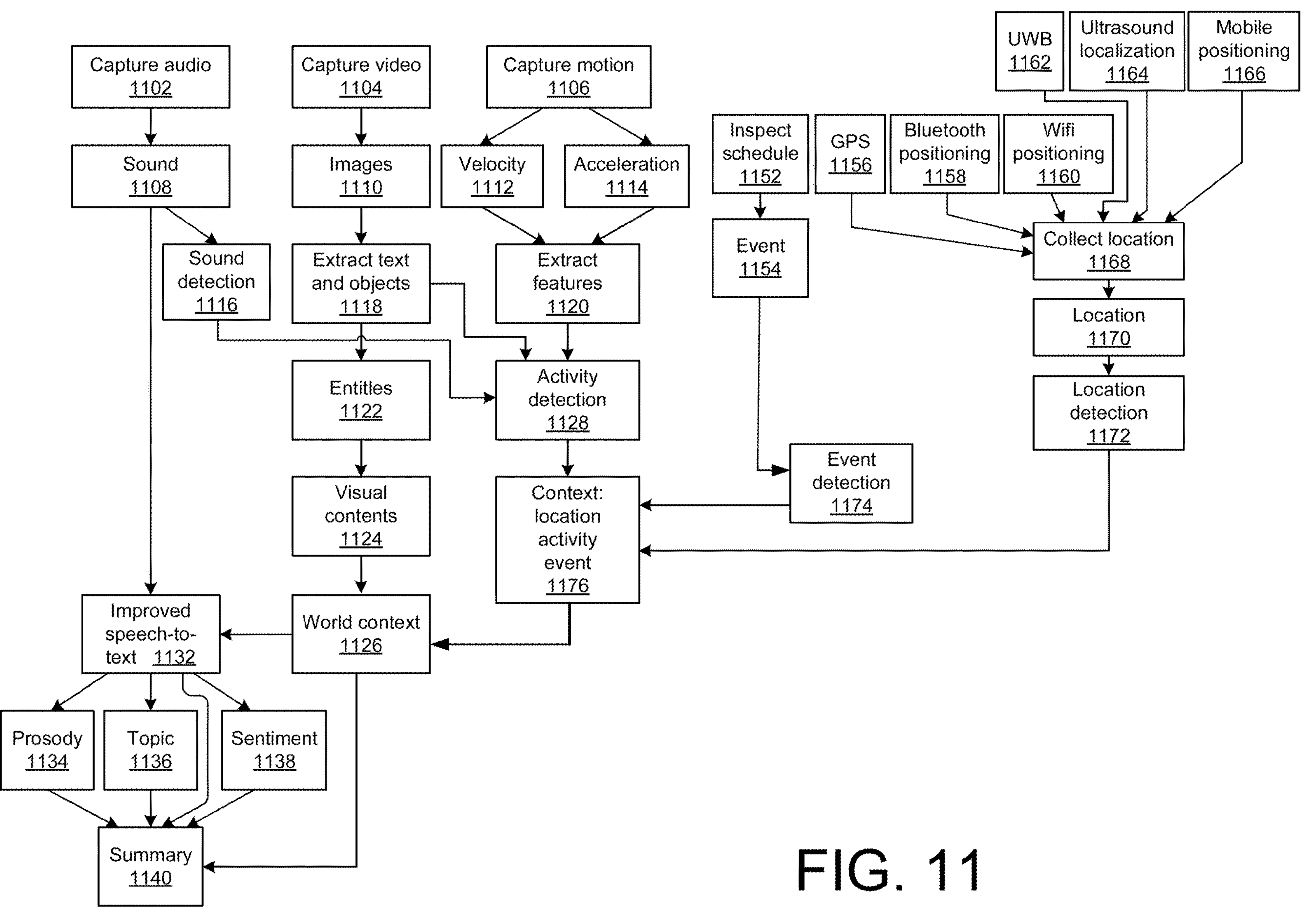
FIG. 11 is a diagram illustrating contextual information processed by the system of FIG. 9 to summarize text based on contextual information.

FIG. 11 is a diagram illustrating contextual information processed by the system of FIG. 9 to summarize text based on contextual information. In some examples, the contextual information shown in FIG. 11 is processed by the context interpreter 918 and stored in the contextual data 908.

The device 938 captures audio data (1102). The device 938 can capture audio data (1102) via one or more microphones included in the device 938. Capturing audio data (1102) can include capturing sound (1108). In some examples, the sound (1108) includes the speech 904 that the transcription generator 924 transcribes. In some examples, the sound (1108) also includes characteristics of the speech 904, such as voice tones, intonations, accents, and/or pauses. In some examples, the sound (1108) also includes environmental noise other than the speech 904, such as speech by persons other than the speaker 100, the sound of traffic, the sounds of animals, the sounds of people walking or breathing, and/or other background noises.

In some examples, the device 938 performs sound detection (1116). In some examples, the context interpreter 918 performs the sound detection (1116). In some examples, the sound detection includes determining types of sounds, such as human voices, traffic, animal sounds, sounds of people walking or breathing, and/or other background noises. In some examples, the context interpreter 918 characterizes the sound (1108).

The device 938 captures video data (1104). The device 938 can capture video data (1104) via one or more cameras included in the device 938. Capturing video data (1104) can include capturing images (1110) via the one or more cameras.

In some examples, the context interpreter 918 included in the device 938 extracts text and/or objects (1118) from the images (1110). The context interpreter 918 can, for example, perform image classification on the images (1110) to identify types within the images (1110). The context interpreter 918 can, for example, extract image data corresponding to the identified types, such as text and objects.

The context interpreter 918 can determine and/or identify entities (1122) in the images (1110) based on the extracted text and/or objects. The context interpreter 918 can, for example, determine and/or identify the entities (1122) as persons, places, types of animals, monuments, and/or recognize text included in the images (1110).

Based on the determined and/or identified entities (1122), the context interpreter 918 can determine visual contents (1124) of the images (1110). The determination of visual contents (1124) can include, for example, identifying names and/or types of objects included in the images (1110). The determination of the visual contents (1124) can generate a list or other container of identifiers or descriptions of the objects and/or text included in the images (1110).

The device 938 can capture motion (1106) of the device 938. The device 938 can capture motion (1106) of the device 938. The device 938 can capture motion (1106) by measurements performed by, for example, an accelerometer and/or inertial measurement unit (IMU) included in the device 938. In some examples, the device 938 can capture a velocity (1112) of the device 938 based on the captured motion. In some examples, the device 938 can capture acceleration (1114) of the device 938 based on the captured motion.

In some examples, the context interpreter 918 included in the device 938 extracts features (1120) based on the measured velocity (1112) and/or acceleration (1114). The features (1120) can include patterns of movement, directions, speeds, and/or changes of velocity (acceleration (1114)).

In some examples, the device 938 inspects a schedule (1152) associated with the user 101. In some examples, the schedule (1152) includes a calendar and/or calendar items associated with the user 101. The device 938 and/or context interpreter 918 can determine and/or identify events (1154) based on the schedule. The events (1154) can include descriptions of the respective events, dates, times, locations, and/or participants of the respective events (1154).

In some examples, the context interpreter 918 performs event detection (1174). In some examples, the event detection (1174) determines a type of the event (1154). The context interpreter 918 can perform the event detection in association with a transcription 926 and/or summary 906. In some examples, the event detection (1174) includes the context interpreter 918 determining whether an event (1154) stored in the contextual data 908 is relevant to the transcription 926 and/or summary 906. In some examples, the event detection (1174) includes the context interpreter 918 determining whether an event (1154) stored in the contextual data 908 corresponds to a general term included in the transcription 926 and/or summary 906.

In some examples, the device 938 receives, measures, and/or processes one or multiple location signals. In some examples, the location signals include Global Positioning System (GPS) (1156) signals. In some examples, the location signals include Bluetooth positioning (1158) signals. In some examples, the location signals include Institute for Electrical and Electronics Engineers (IEEE) 802.11 ("Wireless Fidelity") positioning (1160) signals. In some examples, the signals include Ultra WideBand (UWB) Positioning (1162) signals. In some examples, the location signals include ultrasound localization (1164) signals. In some examples, the location signals include mobile positioning (1166) signals.

In some examples, the device 938 collects location data (1168) based on the Global Positioning System (GPS) (1156) signals, Bluetooth positioning (1158) signals, 802.11 ("Wireless Fidelity") positioning (1160) signals, Ultra Wide-Band (UWB) Positioning (1162) signals, ultrasound localization (1164) signals, and/or mobile positioning (1166) signals. Based on the collected location data (1168), the device 938 determines a location 1170 of the device 938. In some examples, the device 938 performs location detection (1172) of the device 938 based on the location 1170. In some examples, the device 938 infers a location of the user 101 based on the location detection (1172).

In some examples, the context interpreter 918 detects an activity (1128) based on the sound detection (1116), the extraction of text and objects (1118), and/or the extraction of features (1120). The context interpreter 918 can determine and/or detect a type of the activity (1128) based on the sound detection (1116), the extraction of text and objects (1118), and/or the extraction of features (1120).

In some examples, the context interpreter 918 can determine a context (1176) of the transcription 926 and/or summary 906. The context interpreter 918 can determine the context (1176) based on the activity detection (1128), event detection (1174), and/or location detection (1172). In some examples, the context (1176) is associated with a present location, activity, and/or event. In some examples, the context (1176) is associated with a previous location, activity, and/or event. In some examples, the previous location, activity, and/or event can be a previous location, activity, and/or event in which the user 101 visited or participated. In some examples, the previous location, activity, and/or event can be a previous location, activity, and/or event in which the speaker 100 visited or participated.

In some examples, the context interpreter 918 determines a world context (1126) based on the visual contents (1124) and/or the context (1176). In some examples, the world context (1126) includes a description of the present scene and/or surroundings that the user 101 is located in. In some examples, the world context (1126) includes previous scenes, activities, and/or locations that are relevant to the transcription 926 and/or summary 906.

In some examples, the summary stream manager 902 performs improved speech-to-text (1132) recognition by supplementing the sound (1108) data with the world context (1126). In some examples, the summary stream manager 902 interprets ambiguous words and/or phrases in the speech 904 based on the world context (1126) (such as determining which of the homonyms, "flour" or "flower" should be included in the transcription 926 based on the world context (1126)). In some examples, the summary stream manager 902 replaces general terms in the text with specific terms based on the world context (1126).

In some examples, the summary stream manager 902 determines prosody (1134), topic (1136), and/or sentiment (1138) of the speech 904 based on the improved speech-to-text (332). In some examples, the summary stream manager 902 generates a summary (1140) based on a combination of the world context (1126), improved speech-to-text (332), prosody (1134), topic (1136), and/or sentiment (1138). In some examples, the summary stream manager 902 interprets ambiguous words and/or phrases in the speech 904 and/or the summary 906 based on the world context (1126). In some examples, the summary stream manager 902 replaces general terms in the summary 906 with specific terms based on a combination of the world context (1126), improved speech-to-text (332), prosody (1134), topic (1136), and/or sentiment (1138) to generate an enhanced summary (1140).

Figure 12A:
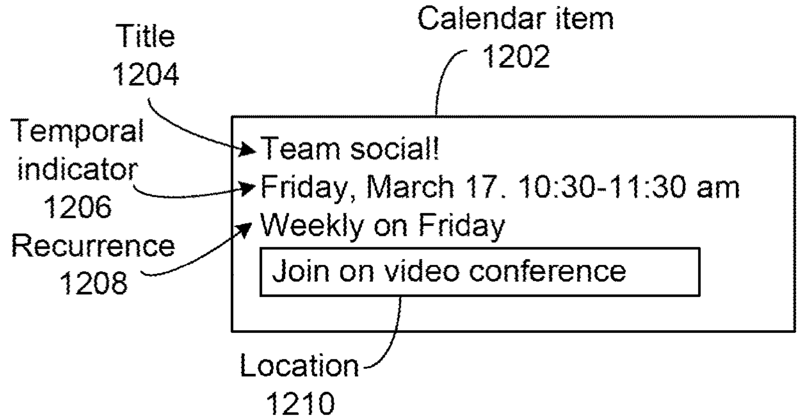
FIG. 12A shows a calendar item that can provide contextual information to the system of FIG. 9.

FIG. 12A shows a calendar item 1202 that can provide contextual information to the system of FIG. 9. In some examples, the calendar item 1202 is stored in the contextual data 908.

The calendar item 1202 can include any combination of a title 1204 (which can include text), a temporal indicator 1206 (which can include a date and/or time), a recurrence indicator 1208 (which indicates whether the event indicated by the calendar item 1202 repeats), and/or a location 1210. The calendar item 1202 can be included in a calendar associated with the user 101.

Figure 12B:
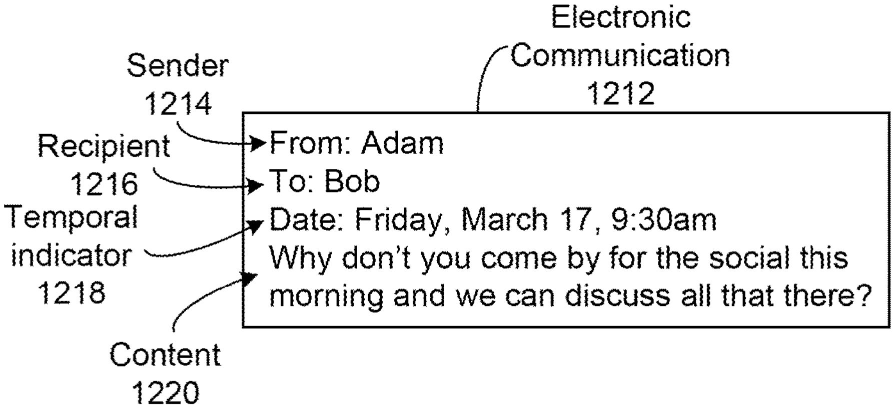
FIG. 12B shows an electronic communication that can provide contextual information to the system of FIG. 9.

FIG. 12B shows an electronic communication 1212 that can provide contextual information to the system of FIG. 9. In some examples, the electronic communication 1212 is stored in the contextual data 908. The electronic communication 1212 can include an email, a text message, or a chat message, as non-limiting examples.

The electronic communication 1212 can include any combination of a sender 1214 (which can indicate a user who sent the electronic communication 1212), a recipient 1216 (which can indicate a recipient who received the electronic communication 1212), a temporal indicator 1218 (which can include a date and/or time at which the electronic communication 1212 was sent and/or received), and/or content 1220 (which can include text).

Figure 12C:
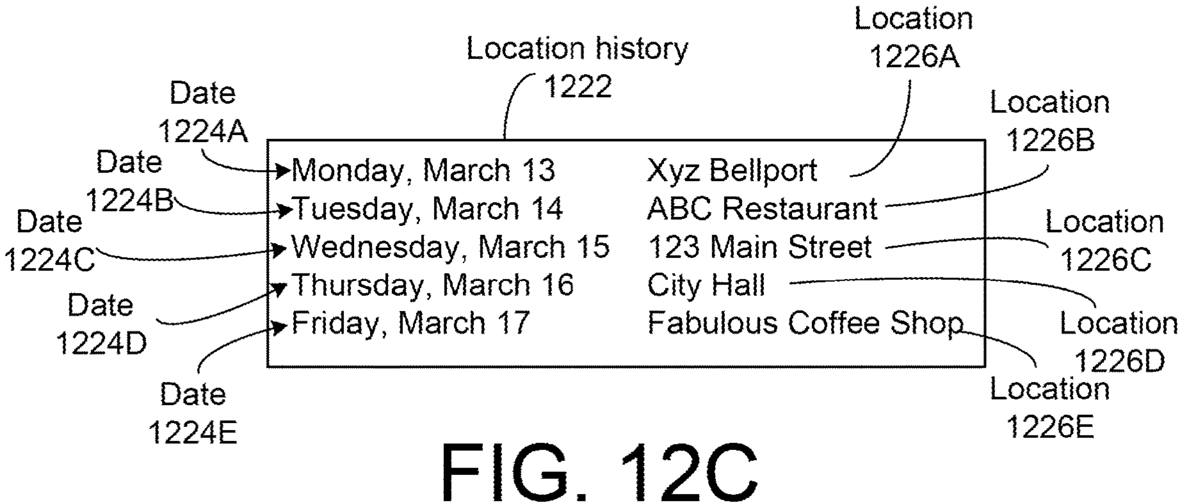
FIG. 12C shows location history that can provide contextual information to the system of FIG. 9.

FIG. 12C shows location history 1222 that can provide contextual information to the system of FIG. 9. The location history 1222 can store and/or indicate locations and dates and/or times when the user 101 was at the stored and/or indicated locations. The location history 1222 can be stored in the contextual data 908. In the example shown in FIG. 12C, the location history 1222 stores and/or indicates a first date 1224A and associated location 1226A, a second date 1224B and associated location 1226B, a third date 1224C and associated location 1226C, a fourth date 1224D and associated location 1226D, and a fifth date 1224E and associated location 1226E.

Figure 12D:
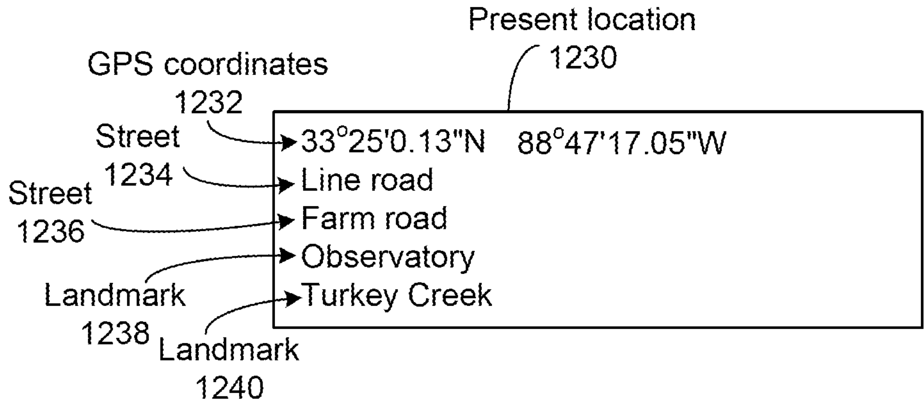
FIG. 12D shows a present location that can provide contextual information to the system of FIG. 9.

FIG. 12D shows a present location 1230 that can provide contextual information to the system of FIG. 9. The present location 1230 can be stored in the contextual data 908. In some examples, the device 938 can determine the present location 1230 based on location signals, such as Global Positioning System (GPS) (156) signals, Bluetooth positioning (1158) signals, 802.11 ("Wireless Fidelity") positioning (1160) signals, Ultra WideBand (UWB) Positioning (1162) signals, ultrasound localization (1164) signals, and/or mobile positioning (1166) signals. In some examples, the device 938 determines the present location 1230 based on location signals and one or more maps (that may be stored by the device 938 and/or another computing device in communication with the device 938).

The present location 1230 can include a specific location of the device 938 and/or user 101, and/or nearby landmarks. The present location 1230 can include any combination of GPS coordinates 1232, a first nearby street 1234, a second nearby street 1236, a first landmark 1238, and/or a second nearby landmark 1240, as non-limiting examples.

Figure 12E:
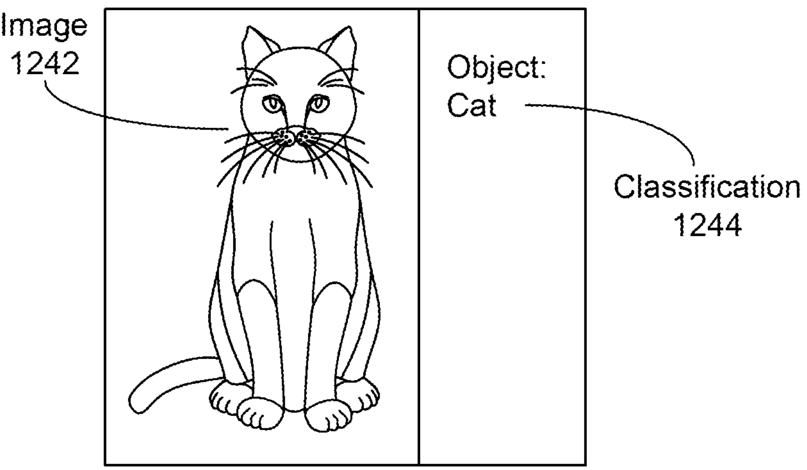
FIG. 12E shows an image and classification that can provide contextual information to the system of FIG. 9.

FIG. 12E shows an image 1242 and classification 1244 that can provide contextual information to the system of FIG. 9. In some examples, the device 938 captured the image 1242. In the example shown in FIG. 12E, the image 1242 is an image of a cat. In some examples, the context interpreter 918 classifies the image 1242. In the example shown in FIG. 12E, the context interpreter 918 classifies the image 1242 as an object that is a cat. In some examples, the context interpreter 918 stores the classification 1244 of "cat" in the contextual data 908. In some examples, the context interpreter 918 determines, based on the classification 1244 of the image 1242 as the object of cat, that a cat is (or was) present and/or nearby the location at which the image 1242 was captured.

Figure 12F:
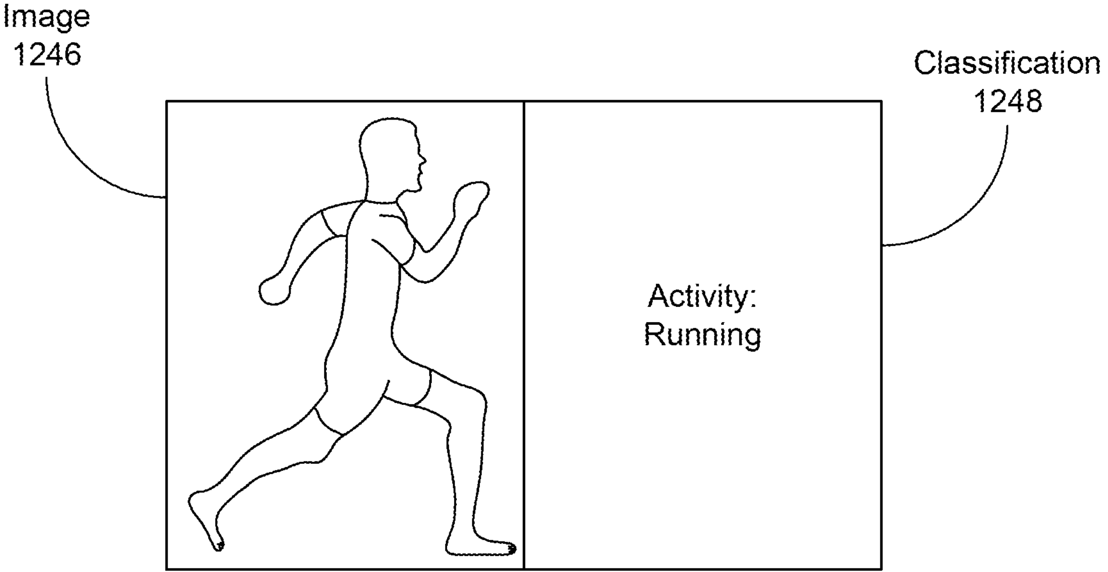
FIG. 12F shows an image and classification that can provide contextual information to the system of FIG. 9.

FIG. 12F shows an image 1246 and classification 1248 that can provide contextual information to the system of FIG. 9. In some examples, the device 938 captured the image 1246. In the example shown in FIG. 12F, the image 1246 is an image (or multiple images included in a video) of a person running. In some examples, the context interpreter 918 classifies the image 1246 (or video). In the example shown in FIG. 12F, the context interpreter 918 classifies the image 1246 (or video) as an activity of running. In some examples, the context interpreter 918 stores the classification 1248 of "running" in the contextual data 908. In some examples, the context interpreter 918 determines, based on the classification 1248 of the image 1246 as the activity of running, that running was performed at the location at which the image 1246 was captured.

FIG. 13A shows text 1302 and an enhanced summary 1304 of the text 1302 according to an example. The summary stream manager 902 generates the enhanced summary 1304 based on the text 1302 and contextual data 908. In this example, the text 1302 is, "Where shall we go for dinner tonight? Eh . . . Let me see . . . Sushi, no . . . too far away . . . Shall we head over to The Cheesecake Factory in our neighborhood today at 6 pm for dinner?" The summary stream manager 902 generates the enhanced summary 1304, "Dinner at Cheesecake Factory on Shoreline Boulevard 6 pm today?," based on the text 1302 and the contextual data 908. The contextual information and/or data based on which the summary stream manager 902 changed, "in our neighborhood" in the text 1302 to, "on Shoreline Boulevard," in the enhanced summary 1304 may include previous electronic messages between the user 101 and the speaker 100, location history of the user 101, calendar items associated with the user 101, and/or third-party mapping information identifying the address of The Cheesecake Factory that is in the neighborhood of the user 101 and the speaker 100, as non-limiting examples.

In some examples, the enhanced summary 1304 includes a hyperlink. The hyperlink can be associated with the text, "Cheesecake Factory on Shoreline Boulevard." The hyperlink can include a pointer and/or address of an Internet host and/or webpage that describes the restaurant referred to by the text, "Cheesecake Factory on Shoreline Boulevard."

In some examples, the enhanced summary 1304 includes a prompt to generate a calendar item on a calendar associated with the user 101. The prompt can be associated with the text, "6 pm today." The device 938 can respond to the user selecting the prompt, text, "6 pm today," and/or text, "Cheesecake Factory on Shoreline Boulevard," by generating the calendar item indicating dinner at Cheesecake Factory on Shoreline Boulevard at 6 pm on the present day.

FIG. 13B shows the text 1302, enhanced text 1306, and the enhanced summary 1304 of the enhanced text 1306 according to an example. In this example, the summary stream manager 902 generates the enhanced text, 506, "Where shall we go for dinner tonight? Eh . . . Let me see . . . Sushi, no . . . too far away . . . Shall we head over to The Cheesecake Factory on Shoreline Boulevard today at 6 pm for dinner?," based on the text 1302 and contextual information and/or data. In some examples, enhanced text is text for which a general term was replaced with a specific term in the transcription. The contextual information and/or data may be the same or similar contextual information and/or data based on which the summary stream manager 902 changed the text 1302 to the enhanced summary 1304 in the example of FIG. 13A.

In the example shown in FIG. 13B, the term identifier 916 identifies either, "The Cheesecake Factory in our neighborhood," or, "in our neighborhood," as a general term. In the example shown in FIG. 13B, the context interpreter 918 determines that the specific term is either, "The Cheesecake Factory on Shoreline Boulevard," or, "on Shoreline Boulevard." In the example shown in FIG. 13B, the term replacer 920 either replaces, "The Cheesecake Factory in our neighborhood," with, "The Cheesecake Factory on Shoreline Boulevard," or, "in our neighborhood," with, "on Shoreline Boulevard." In the example shown in FIG. 13B, the text revisor 922 confirms the accuracy and/or readability of, "Shall we head over to the Cheesecake Factory on Shoreline Boulevard today at 6 pm for dinner?" In the example shown in FIG. 13B, the summarizer 936 generates the enhanced summary 1304 based on the enhanced text 1306. In some examples, an enhanced summary is a summary of a transcription in which the general term has been replaced with the specific term. The general term may have been replaced with the specific term either in the transcription before the summary is performed, or in the summary after the transcription was summarized.

FIG. 13C shows the text 1302, a summary 1308 of the text, and the enhanced summary 1304 of the text 1302 according to an example. In the example shown in FIG. 13C, the summarizer 936 generates the summary, "Dinner at Cheesecake Factory in our neighborhood 6 pm today?" based on the text 1302, without taking contextual information into account. In the example shown in FIG. 13C, the summary stream manager 902 either replaces, "Cheesecake Factory in our neighborhood," with, "Cheesecake Factory on Shoreline Boulevard," or, "in our neighborhood," with, "on Shoreline Boulevard," in a similar manner to the replacement described above with respect to FIG. 13B.

Figure 14A:
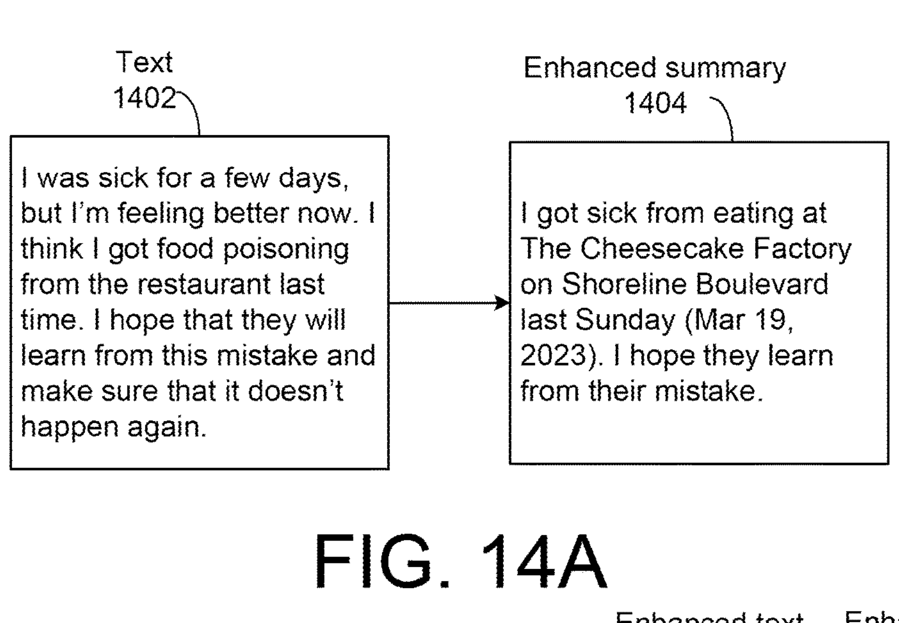
FIG. 14A shows text and an enhanced summary of the text according to an example.

FIG. 14A shows text 1402 and an enhanced summary 1404 of the text 1402 according to an example. In this example, the text 1402 is, "I was sick for a few days, but I'm feeling better now. I think I got food poisoning from the restaurant last time. I hope that they will learn from this mistake and make sure that it doesn't happen again. In this example, the enhanced summary 1404, which is a summary generated by the summary stream manager 902 based on the text 1402 and contextual information and/or data, is, "I got sick from eating at The Cheesecake Factory on Shoreline Boulevard last Sunday (Mar. 19, 2023). I hope they learn from their mistake." The contextual information and/or data based on which the summary stream manager 902 changed, "the restaurant last time" in the text 1402 to, "The Cheesecake Factory On Shoreline Boulevard last Sunday (Mar. 19, 2023)," in the enhanced summary 1304 may include previous electronic messages between the user 101 and the speaker 100, location history of the user 101, calendar items associated with the user 101, and/or third-party mapping information identifying the address of The Cheesecake Factory that the speaker 100 and user 101 attended on a specific date, as non-limiting examples.

Figure 14B:
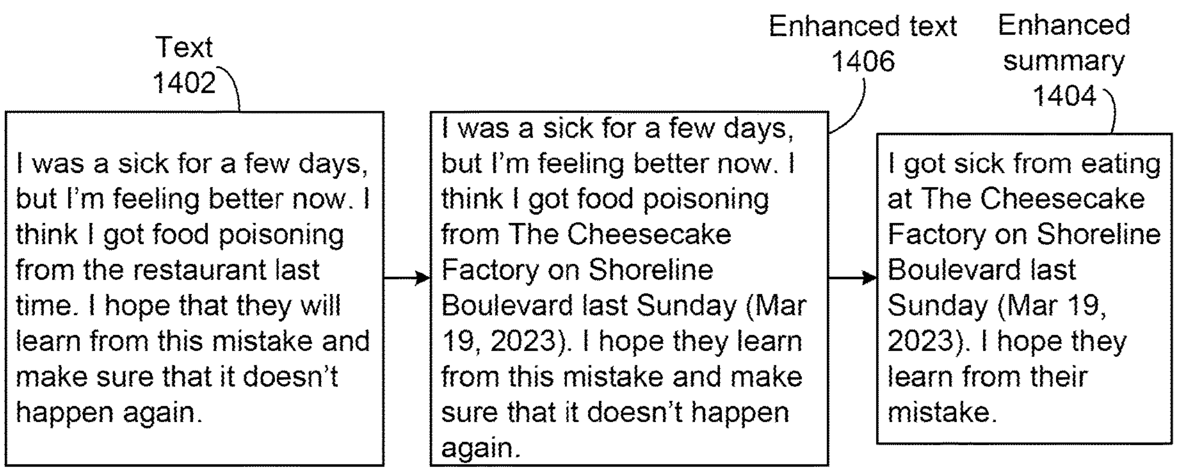
FIG. 14B shows text, enhanced text, and an enhanced summary of the text according to an example.

FIG. 14B shows text 1402, enhanced text 1406, and the enhanced summary 1404 of the text 1402 according to an example. In this example, the summary stream manager 902 generated the enhanced text, "I was sick for a few days, but I'm feeling better now. I think I got food poisoning from The Cheesecake Factory on Shoreline Boulevard last Sunday (Mar. 19, 2023). I hope that they will learn from this mistake and make sure that it doesn't happen again," based on the text 1402 and contextual data 908. In the example shown in FIG. 14B, the term identifier 916 determined that the general term is, "the restaurant last time." Based on contextual data 908 such as previous electronic messages between the user 101 and the speaker 100, location history of the user 101, calendar items associated with the user 101, and/or third-party mapping information identifying the address of The Cheesecake Factory that the speaker 100 and user 101 attended on a specific date, the context interpreter 918 determined that the specific term is, "The Cheesecake Factory on Shoreline Boulevard last Sunday (Mar. 19, 2023)." In the example shown in FIG. 14B, the term replacer 920 replaced the general term, "the restaurant last time," with the specific term, "The Cheesecake Factory on Shoreline Boulevard last Sunday (Mar. 19, 2023)." The specific term, "The Cheesecake Factory on Shoreline Boulevard last Sunday (Mar. 19, 2023)," has a narrower meaning than the general term, "the restaurant last time." The specific term, "The Cheesecake Factory on Shoreline Boulevard last Sunday (Mar. 19, 2023)," is a specific example of the general term, "the restaurant last time," where, without contextual information, many restaurants could fall within the broad meaning of, "the restaurant last time." In the example shown in FIG. 14B, the text revisor 922 ensured the correctness and/or readability of the enhanced text 1406. In the example shown in FIG. 14B, the summarizer 936 generated the enhanced summary 1404 based on the enhanced text 1406.

Figure 14C:
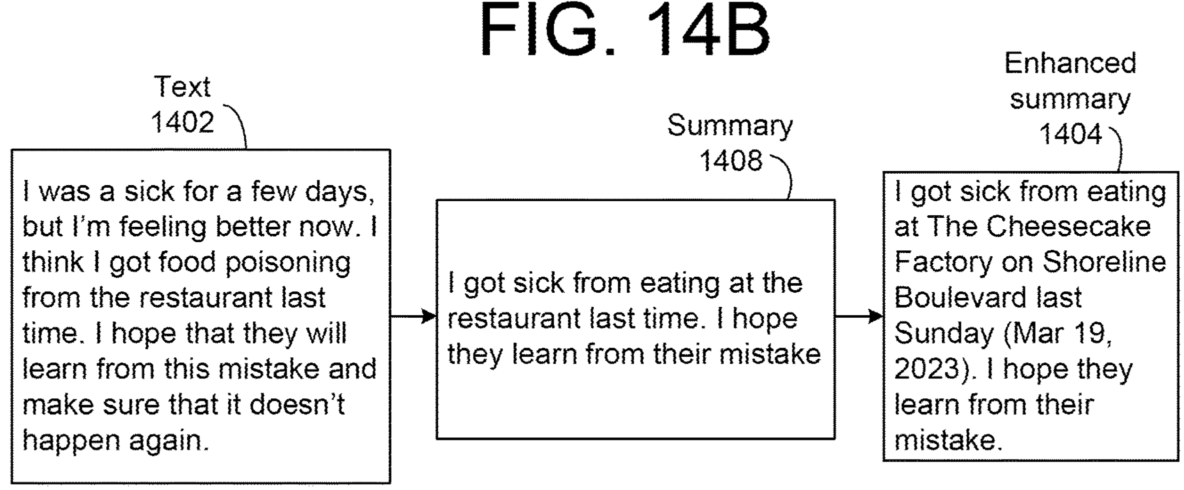
FIG. 14C shows text, a summary of the text, and an enhanced summary of the text according to an example.

FIG. 14C shows the text 1402, a summary 1408 of the text 1402, and the enhanced summary 1404 of the text 1402 according to an example. In this example, the summarizer 936 generated the summary 1408, "I got sick from eating at the restaurant last time. I hope they learn from their mistake," based on the text 1402. In this example shown in FIG. 14C, the summary stream manager 902 generated the enhanced summary 1404 based on the summary 1408 and contextual information and/or data by replacing the general term, "the restaurant last time," with the specific term, "The Cheesecake Factory on Shoreline Boulevard last Sunday (Mar. 19, 2023)," in a similar manner to the replacement of the general term with the specific term described above with respect to FIG. 14B.

Figure 15A:
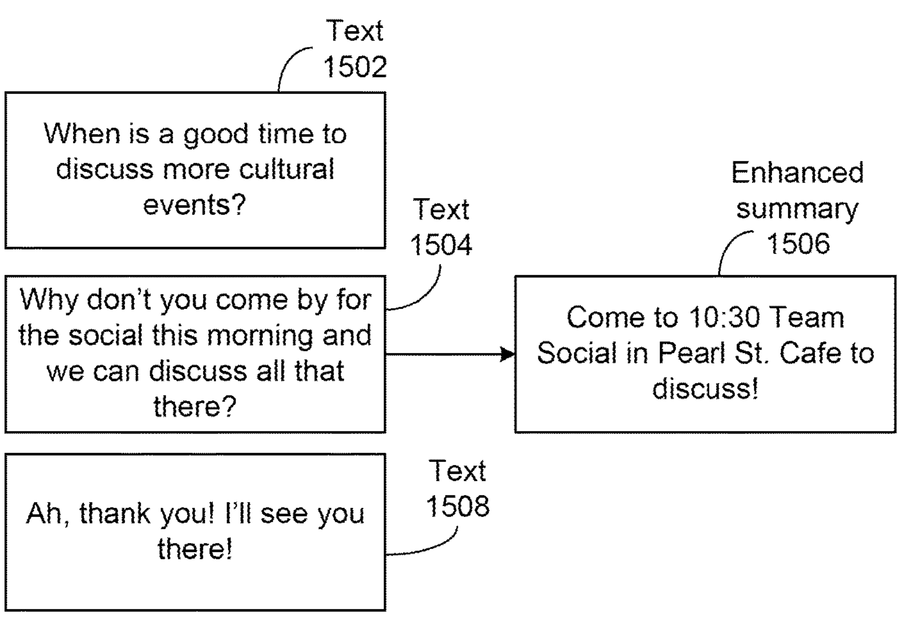
FIG. 15A shows text and an enhanced summary of the text according to an example.

FIG. 15A shows text 1504 and an enhanced summary 1506 of the text 1502 according to an example. In this example, the text 1504 from which the enhanced summary 1506 is generated is included in a conversation and/or chat. In this example, the conversation and/or summary includes text 1502, "When is a good time to discuss more cultural events?," the text 1504, "Why don't you come by for the social this morning and we can discuss all that there?," and text 1508, "Ah, thank you! I'll see you there!"

In the example shown in FIG. 15A, the summary stream manager 902 generated the enhanced summary 1506 based on the text 1504 and contextual information and/or data. In this example, the summary stream manager 902 replaced the general term, "the social this morning," with the specific term, "10:30 Team Social in Pear St. Cafe." The summary stream manager 902 may have replaced the general term with the specific term based on contextual information stored in the contextual data 908 such as calendar items, previous electronic messages, and/or location history, as non-limiting examples.

Figure 15B:
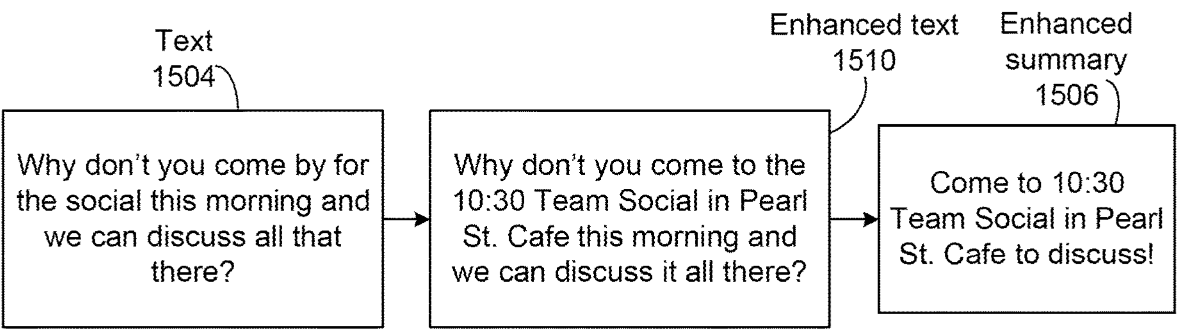
FIG. 15B shows text, enhanced text, and an enhanced summary of the text according to an example.

FIG. 15B shows the text 1504, enhanced text 1510, and the enhanced summary 1506 of the text 1504 according to an example. In this example, the summary stream manager 902 generated the enhanced text 1510 from the text 1504 by replacing the general term, "the social this morning," with the specific term, "10:30 Team Social in Pear St. Cafe." In this example, the term identifier 916 identified the general term as, "the social this morning." In this example, the context interpreter 918 generated the specific term, "10:30 Team Social in Pear St. Cafe," based on calendar items, electronic messages, and/or location history stored in the contextual data 908, as non-limiting examples. In this example, the term replacer 920 replaced the general term, "the social this morning," with the specific term, "10:30 Team Social in Pear St. Cafe." In this example, the text revisor 922 ensured the grammatical correctness and/or readability of the enhanced text 1510. In this example, the summarizer 936 generated the enhanced summary 1506 based on the enhanced text 1510.

Figure 15C:
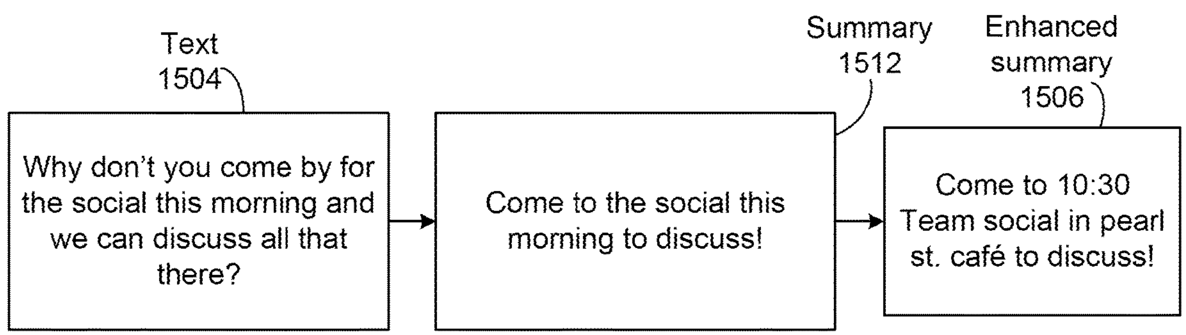
FIG. 15C shows text, a summary of the text, and an enhanced summary of the text according to an example.

FIG. 15C shows the text 1504, a summary 1512 of the text 1504, and an enhanced summary of the text according to an example. In this example, the summarizer 936 generates the summary 1512, "Come to the social this morning to discuss!," based on the text 1504. In this example, the summary stream manager 902 replaces the general term, "the social this morning," with the specific term, "10:30 Team Social in Pear St. Cafe," in a similar manner as described above with respect to FIG. 15B, to generate the enhanced summary 1506.

Figures 16A, 16B, 16C:
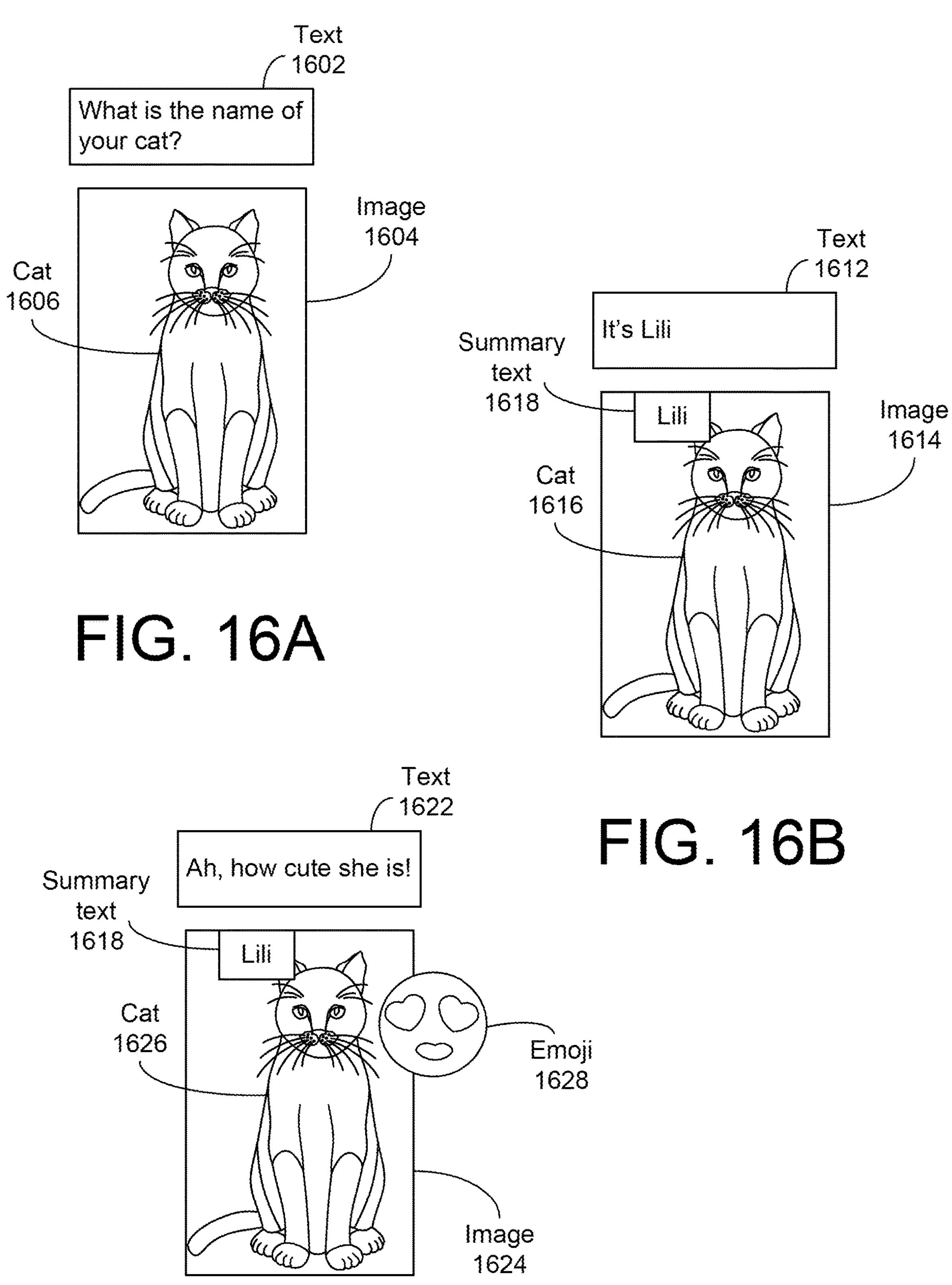
FIG. 16A shows an image and text according to an example.
FIG. 16B shows an image, text, and summary text according to an example.
FIG. 16C shows an image, text, summary text, and an emoji according to an example.

FIG. 16A shows an image 1604 and text 1602 according to an example. In this example, a first user is chatting with a second user within an application that shares both text 1602 and the image 1604. In this example, the first user sends the text 1602, "What's the name of your cat?," while the second user shares the image 1604 (which can be a photograph that includes a cat 1606).

FIG. 16B shows an image 1614, text 1612, and summary text 1618 according to an example. In this example, the second user responds to the text 1602 with text 1612, "It's Lili." In this example, the summarizer 936 summarizes the text 1612 as summary text 1618, "Lili." In this example, the summary stream manager 902 modifies the image 1604 to generate a new image 1614 that includes the summary text 1618. The new image 1614 includes a cat 1616 that may or may not be identical to the cat 1606 shown in the image 1604 of FIG. 16A. In this example, the summary text 1618 is incorporated into the new image 1614.

FIG. 16C shows an image 1624, text 1622, summary text 1618, and an emoji 1628 according to an example. In this example, the text 1622 is, "Ah, how cute she is!" In this example, the summarizer 936 summarizes the text 1622 as an emoji. In this example, the summarizer 936 summarizes the text 1622 as an emoji that is a smiling face with hearts covering eyes in the face, representing cuteness. In this example, the summary stream manager 902 modifies the new image 1614 to generate a new image 1624 that includes the emoji 1628 as well as the summary text 1618. The new image 1624 includes a cat 1626 that may or not be identical to the cats 1606, 1616 shown in the images 1604, 1614 of FIGS. 16A and 16B, respectively.

Example 21: A method performed by a computing system, the method comprising: generating text based on audio data, the text including a general term; and replacing, within the text, the general term with a specific term based on contextual data to generate enhanced text; and generating a summary of the audio data based on the enhanced text.

Example 22: A method performed by a computing system, the method comprising: generating text based on audio data, the text including a general term; determining a specific term based on the general term and contextual data; and generating a summary based on the text and contextual data other than the text generated based on the audio data.

Example 23: A method performed by a computing system, the method comprising: generating text based on audio data, the text including a general term; generating a summary based on the text, the summary including the general term; and replacing, within the summary, the general term with a specific term based on contextual data to generate an enhanced summary.

Example 24: The method of any of examples 21-23, wherein the summary includes fewer words than the text.

Example 25: The method of any of examples 21-24, wherein the specific term has a narrower meaning than the general term.

Example 26: The method of any of examples 21-25, wherein the specific term includes more words than the general term.

Example 27: The method of any of examples 21-26, wherein the contextual data is stored data that is relevant to the general term.

Example 28: The method of any of examples 21-27, wherein the contextual data is stored data that describes the general term.

Example 29: The method of any of examples 21-38, wherein the contextual data is associated with a user of the computing system.

Example 30: The method of any of examples 21-39, wherein the contextual data includes a calendar item associated with a user of the computing system.

Example 31: The method of any of examples 21-30, wherein the contextual data includes an electronic communication associated with a user of the computing system.

Example 32: The method of any of examples 21-32, wherein the contextual data includes a location history associated with a user of the computing system.

Example 33: The method of any of examples 21-32, wherein the contextual data includes a present location of the computing system.

Example 34: The method of any of examples 21-33, wherein the contextual data includes an image captured by the computing system.

Example 35: The method of any of examples 21-34, wherein the contextual data includes an object recognized by the computing system.

Example 36: The method of any of examples 21-35, wherein the contextual data includes motion measured by the computing system.

Example 37: The method of any of examples 21-36, wherein the contextual data includes an activity recognized by the computing system.

Example 38: The method of any of the examples 21-37, wherein the computing system is a head-mounted device.

Example 39: The method of any of examples 21-38, further comprising presenting the summary on a display.

Example 40: A non-transitory computer-readable storage medium comprising instructions stored thereon that, when executed by at least one processor, are configured to cause a computing system to perform the method of any examples 21-39.

Example 41: A computing system comprising: at least one processor; and a non-transitory computer-readable storage medium comprising instructions stored thereon that, when executed by the at least one processor, are configured to cause the computing system to perform the method of any of examples 21-39.

Figure 17:
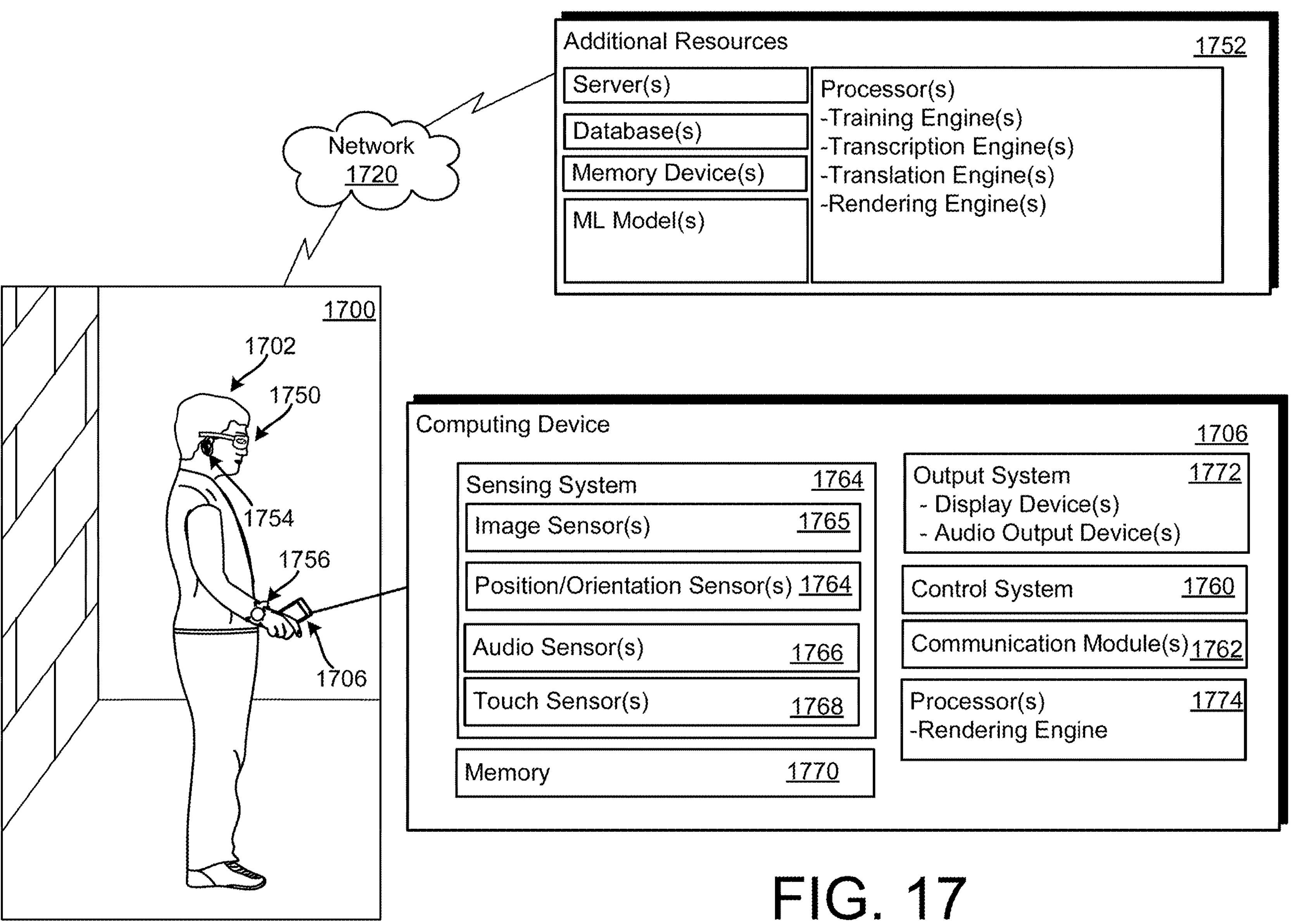
FIG. 17 is a third person view of a user in an ambient computing environment.

FIG. 17 is a third person view of a user 1702 (analogous to the user 101 of FIGS. 1 and 9) in an ambient environment 1700, with one or more external computing systems shown as additional resources 1752 that are accessible to the user 1702 via a network 1720. FIG. 17 illustrates numerous different wearable devices that are operable by the user 1702 on one or more body parts of the user 1702, including a first wearable device 1750 in the form of glasses worn on the head of the user, a second wearable device 1754 in the form of ear buds worn in one or both ears of the user 1702, a third wearable device 1756 in the form of a watch worn on the wrist of the user, and a computing device 1706 held by the user 1702. In FIG. 17, the computing device 1706 is illustrated as a handheld computing device, but may also be understood to represent any personal computing device, such as a table or personal computer.

In some examples, the first wearable device 1750 is a head-mounted device in the form of a pair of smart glasses including, for example, a display, one or more images sensors that can capture images of the ambient environment, audio input/output devices, user input capability, computing/processing capability and the like. Additional examples of the first wearable device 1750 are provided below, with respect to FIGS. 18A and 18B.

In some examples, the second wearable device 1754 is in the form of an ear worn computing device such as headphones, or earbuds, that can include audio input/output capability, an image sensor that can capture images of the ambient environment 1700, computing/processing capability, user input capability and the like. In some examples, the third wearable device 1756 is in the form of a smartwatch or smart band that includes, for example, a display, an image sensor that can capture images of the ambient environment, audio input/output capability, computing/processing capability, user input capability and the like. In some examples, the handheld computing device 1706 can include a display, one or more image sensors that can capture images of the ambient environment, audio input/output capability, computing/processing capability, user input capability, and the like, such as in a smartphone. In some examples, the example wearable devices 1750, 1754, 1756 and the example handheld computing device 1706 can communicate with each other and/or with external computing system(s) 1752 to exchange information, to receive and transmit input and/or output, and the like. The principles to be described herein may be applied to other types of wearable devices not specifically shown in FIG. 17 or described herein.

The user 1702 may choose to use any one or more of the devices 1706, 1750, 1754, or 1756, perhaps in conjunction with the external resources 1752, to implement any of the implementations described above with respect to FIGS. 1-16C. For example, the user 1702 may use an application executing on the device 1706 and/or the smartglasses 1750 to receive, transcribe, and display the transcription stream 130 of FIG. 1 and/or the summary stream 134 of FIG. 1.

As referenced above, the device 1706 may access the additional resources 1752 to facilitate the various summarization techniques described herein, or related techniques. In some examples, the additional resources 1752 may be partially or completely available locally on the device 1706. In some examples, some of the additional resources 1752 may be available locally on the device 1706, and some of the additional resources 1752 may be available to the device 1706 via the network 1720. As shown, the additional resources 1752 may include, for example, server computer systems, processors, databases, memory storage, and the like. In some examples, the processor(s) may include training engine(s), transcription engine(s), translation engine(s), rendering engine(s), and other such processors. In some examples, the additional resources may include ML model(s), such as the various ML models of the architectures of FIGS. 1, 3, 9, and/or 11.

The device 1706 may operate under the control of a control system 1760. The device 1706 can communicate with one or more external devices, either directly (via wired and/or wireless communication), or via the network 1720. In some examples, the one or more external devices may include various ones of the illustrated wearable computing devices 1750, 1754, 1756, another mobile computing device similar to the device 1706, and the like. In some implementations, the device 1706 includes a communication module 1762 to facilitate external communication. In some implementations, the device 1706 includes a sensing system 1764 including various sensing system components. The sensing system components may include, for example, one or more image sensors 1765, one or more position/orientation sensor(s) 1764 (including for example, an inertial measurement unit, an accelerometer, a gyroscope, a magnetometer and other such sensors), one or more audio sensors 1766 that can detect audio input, one or more touch input sensors 1768 that can detect touch inputs, and other such sensors. The device 1706 can include more, or fewer, sensing devices and/or combinations of sensing devices.

Captured still and/or moving images may be displayed by a display device of an output system 1772, and/or transmitted externally via a communication module 1762 and the network 1720, and/or stored in a memory 1770 of the device 1706. The device 1706 may include one or more processor(s) 1774. The processors 1774 may include various modules or engines configured to perform various functions. In some examples, the processor(s) 1774 may include, e.g, training engine(s), transcription engine(s), translation engine(s), rendering engine(s), and other such processors. The processor(s) 1774 may be formed in a substrate configured to execute one or more machine-executable instructions or pieces of software, firmware, or a combination thereof. The processor(s) 1774 can be semiconductor-based including semiconductor material that can perform digital logic. The memory 1770 may include any type of storage device or non-transitory computer-readable storage medium that stores information in a format that can be read and/or executed by the processor(s) 1774. The memory 1770 may store applications and modules that, when executed by the processor(s) 1774, perform certain operations (such as the operations described herein). In some examples, the applications and modules may be stored in an external storage device and loaded into the memory 1770.

Although not shown separately in FIG. 17, it will be appreciated that the various resources of the computing device 1706 may be implemented in whole or in part within one or more of various wearable devices, including the illustrated smartglasses 1750, earbuds 1754, and smartwatch 1756, which may be in communication with one another to provide the various features and functions described herein. For example, the memory 1770 may be used to implement the transcription buffers 128, 928 and/or the summary buffers 132, 932.

In FIG. 17, any audio and/or video output may be used to provide the types of summaries described herein, and associated features. For example, described techniques may be implemented in any product in which improving speech-to-text would be helpful and in which high-quality summaries would be beneficial. Beyond head-worn displays, wearables, and mobile devices, described techniques may be used in remote conferencing and web apps (including, e.g., providing captions/summaries within webconferencing software and/or pre-recorded videos).

Described techniques may also be useful in conjunction with translation capabilities, e.g., of the additional resources 1752. For example, the user 1702 may listen to a conversation from a separate speaker (corresponding to the speaker 100 of FIGS. 1 and 9), who may be proximate to, or removed from, the user 1702), where the speaker may be speaking in a first language. A translation engine of the processors of the additional resources 1752 may provide automated translation of the dialogue into a native language of the user 1702, and also may summarize the translated dialogue using techniques described herein.

The architecture of FIG. 17 may be used to implement or access one or more large language models (LLMs), which may be used to implement a summarizer for use in the preceding examples. For example, the Pathways Language Model (PaLM) and/or the Language Model for Dialogue Application (LaMDA), both provided by Google, Inc., may be used.

Figure 18A:
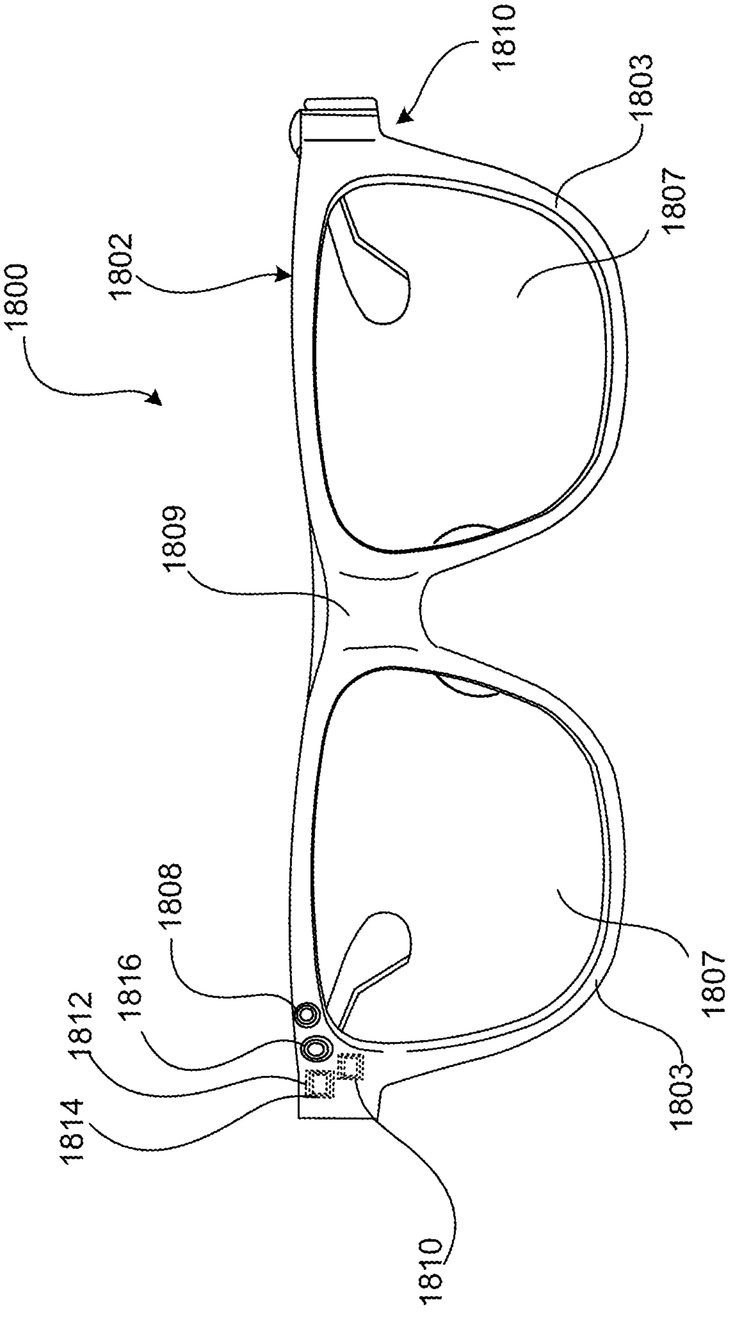
FIGS. 18A and 18B illustrate front and rear views of an example implementation of a pair of smartglasses.
Figure 18B:
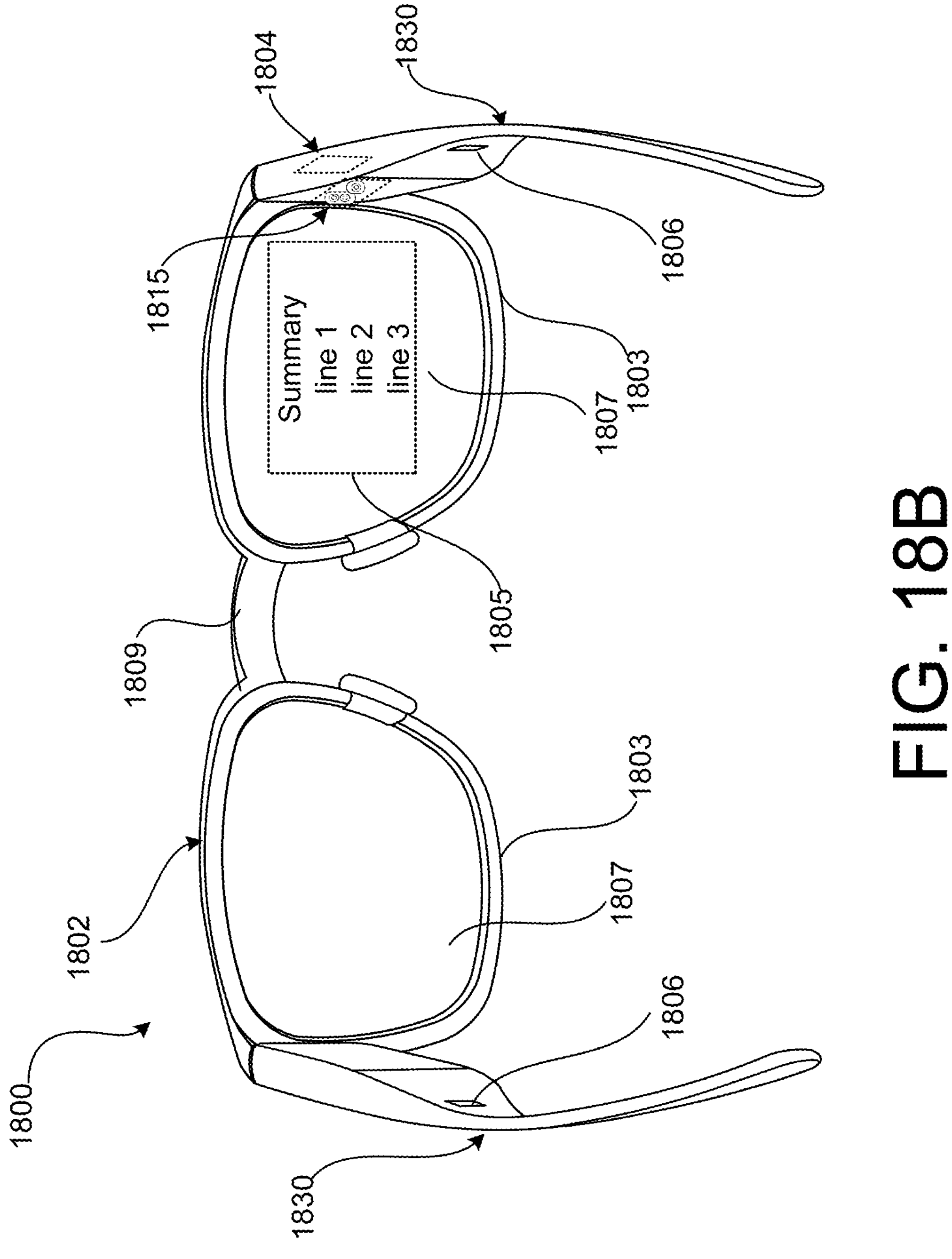

An example head mounted wearable device 1800 (or head-mounted device) in the form of a pair of smart glasses is shown in FIGS. 18A and 18B, for purposes of discussion and illustration. The example head mounted wearable device 1800 includes a frame 1802 having rim portions 1803 surrounding glass portion, or lenses 1807, and arm portions 1830 coupled to a respective rim portion 1803. In some examples, the lenses 1807 may be corrective/prescription lenses. In some examples, the lenses 1807 may be glass portions that do not necessarily incorporate corrective/prescription parameters. A bridge portion 1809 may connect the rim portions 1803 of the frame 1802. In the example shown in FIGS. 18A and 18B, the wearable device 1800 is in the form of a pair of smart glasses, or augmented reality glasses, simply for purposes of discussion and illustration.

In some examples, the wearable device 1800 includes a display device 1804 that can output visual content, for example, at an output coupler providing a visual display area 1805, so that the visual content is visible to the user. In the example shown in FIGS. 18A and 18B, the display device 1804 is provided in one of the two arm portions 1830, simply for purposes of discussion and illustration. Display devices 1804 may be provided in each of the two arm portions 1830 to provide for binocular output of content. In some examples, the display device 1804 may be a see-through near eye display. In some examples, the display device 1804 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 1807, next to content (for example, digital images, user interface elements, virtual content, and the like) output by the display device 1804. In some implementations, waveguide optics may be used to depict content on the display device 1804.

The example wearable device 1800, in the form of smart glasses as shown in FIGS. 18A and 18B, includes one or more of an audio output device 1806 (such as, for example, one or more speakers), an illumination device 1808, a sensing system 1810, a control system 1812, at least one processor 1814, and an outward facing image sensor 1816 (for example, a camera). In some examples, the sensing system 1810 may include various sensing devices and the control system 1812 may include various control system devices including, for example, the at least one processor 1814 operably coupled to the components of the control system 1812. In some examples, the control system 1812 may include a communication module providing for communication and exchange of information between the wearable device 1800 and other external devices. In some examples, the head mounted wearable device 1800 includes a gaze tracking device 1815 to detect and track eye gaze direction and movement. Data captured by the gaze tracking device 1815 may be processed to detect and track gaze direction and movement as a user input. In the example shown in FIGS. 18A and 18B, the gaze tracking device 1815 is provided in one of two arm portions 1830, simply for purposes of discussion and illustration. In the example arrangement shown in FIGS. 18A and 18B, the gaze tracking device 1815 is provided in the same arm portion 1830 as the display device 1804, so that user eye gaze can be tracked not only with respect to objects in the physical environment, but also with respect to the content output for display by the display device 1804. In some examples, gaze tracking devices 1815 may be provided in each of the two arm portions 1830 to provide for gaze tracking of each of the two eyes of the user. In some examples, display devices 1804 may be provided in each of the two arm portions 1830 to provide for binocular display of visual content.

The wearable device 1800 is illustrated as glasses, such as smartglasses, augmented reality (AR) glasses, or virtual reality (VR) glasses. More generally, the wearable device 1800 may represent any head-mounted device (HMD), including, e.g., a hat, helmet, or headband. Even more generally, the wearable device 1800 and the computing device 1806 may represent any wearable device(s), handheld computing device(s), or combinations thereof.

Use of the wearable device 1800, and similar wearable or handheld devices such as those shown in FIG. 17, enables useful and convenient use case scenarios of implementations of the systems, methods, functions, and/or techniques described herein. For example, such wearable and handheld devices may be highly portable and therefore available to the user 1802 in many different scenarios. At the same time, available display areas of such devices may be limited. For example, the display area 1805 of the wearable device 1800 may be a relatively small display area, constrained by an overall size and form factor of the wearable device 1800.

Consequently, the user 1802 may benefit from use of the various summarization techniques described herein. For example, the user 1802 may engage in interactions with separate speakers, such as a lecturer or a participant in a conversation. The user 1802 and the separate speaker may have varying degrees of interactivity or back-and-forth, and two or more additional speakers may be present, as well.

Using described techniques, the user 1802 may be provided with dynamic, real-time summarizations during all such interactions, as the interactions are happening. For example, the speaker may speak for a short time or a longer time, in conjunction with (e.g., in response to) dialogue provided by the user 1802. During all such interactions, the user 1802 may be provided with useful and convenient summaries of words spoken by the separate speaker(s).

For example, as shown in FIG. 18B, the display area 1805 may be used to display lines of a summary, such as the summary 106 or the summary stream 134. When the summary stream 134 is provided in the display area 1805, the lines of the summary may scroll through the display area 1805, as new lines of the summary are received. In this way, the user 1802 may be provided with contextual summaries, while still being able to interact with an external environment.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship with each other.

In some implementations, one or more input devices in addition to the computing device (e.g., a mouse, a keyboard) can be rendered in a display of a head-mounted device such as the devices 138, 938. The rendered input devices (e.g., the rendered mouse, the rendered keyboard) can be used as rendered in the display.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method performed by a computing system, the method comprising:

generating text from audio data received by the computing system via a microphone;

determining a value associated with an end portion of the text to include in a summary of the text based on:

a length of a portion of the audio data from which the text was generated and which ends with the end portion; and a time value associated with the end portion, the end portion including a word from the text;

determining, based on the value satisfying a condition, to summarize the portion of the audio data from which the text was generated and ends with the end portion; and generating, by a model, the summary of the text based on the portion of the audio data from which the text was generated and ends with the end portion.

2. The method of claim 1, wherein the length of the audio data from which the text was generated and which ends with the end portion includes a time duration of the portion of the audio data.

3. The method of claim 1, wherein the length of the audio data from which the text was generated and which ends with the end portion includes a number of words included in the text transcribed from the portion of the audio data.

4. The method of claim 1, wherein the length of the audio data from which the text was generated and which ends with the end portion is based on the text transcribed from the portion of the audio data.

5. The method of claim 1, wherein the time value associated with the end portion includes a duration of a pause after the end portion.

6. The method of claim 1, wherein the time value associated with the end portion includes a duration of time between the end portion and a subsequent portion of the text that immediately follows the end portion.

7. The method of claim 1, wherein the determination of the value is further based on a punctuation mark included in the text, the punctuation mark immediately following the end portion.

8. The method of claim 1, wherein the determination of the value is further based on a determination that the end portion was spoken by a first person, and a subsequent portion that immediately follows the end portion was spoken by a second person, the second person being different than the first person.

9. The method of claim 1, wherein the determination of the value is further based on a determination that the text that is unsummarized and ends with the end portion is related to a first topic and that text that is subsequent to the end portion is related to a second topic, the first topic being different than the second topic.

10. The method of claim 1, wherein the determination of the value is further based on a low confidence level of transcribing speech subsequent to the text that is unsummarized and ends with the end portion.

11. The method of claim 1, wherein the computing system is a head-mounted device.

12. The method of claim 1, further comprising presenting the summarized text on a display.

13. The method of claim 1, further comprising:

determining, by the model, a specific term based on a general term and contextual data, the general term being included in the summary of the text, the contextual data including information associated with a user other than the text generated based on the audio data, the specific term including additional information than was included in the text; and generating an enhanced summary based on the summary of the text and the specific term.

14. The method of claim 1, wherein the model is a sequence-to-sequence generative large learning model.

15. The method of claim 1, wherein the summary of the text includes a hyperlink that includes an address of a webpage that presents information about a person, place, or thing referred to by the text.

16. A method performed by a computing system, the method comprising:

generating text from audio data received by the computing system via a microphone;

determining, by a model, that a proposed end portion of the text is an end portion of the text based on a duration of a pause after the proposed end portion satisfying a pause duration threshold, the pause duration threshold being less for greater lengths of the text that end with the proposed end portion and the pause duration threshold being greater for lesser lengths of the text that end with the proposed end portion; and generating, by the model, a summary of the text based on the portion of the audio data from which the text was generated and ends with the end portion, the summary of the text including a reference to a webpage that presents information about a person, place, or thing referred to by the text.

17. The method of claim 16, wherein the text that ends with the proposed end portion is unsummarized.

18. The method of claim 16, wherein:

the determining includes determining that the proposed end portion of the text is the end portion of the text based on the duration of the pause after the proposed end portion satisfying the pause duration threshold, and the method further includes the model summarizing the text based on the determining that the proposed end portion of the text is the end portion of the text.

19. A method performed by a computing system, the method comprising:

storing contextual data, the contextual data including textual information associated with a user;

generating text based on audio data received by the computing system via a microphone associated with the user, the text including a general term;

searching the contextual data for a specific term to replace the general term, the specific term including additional information than was included in the text; and generating, by a model, a summary based on the text and the specific term.

20. The method of claim 19, wherein the summary includes fewer words than the text.

* * * * *